United States Patent
Shim

(10) Patent No.: US 12,279,058 B2
(45) Date of Patent: Apr. 15, 2025

(54) IMAGE SENSOR INCLUDING A CAPACITOR HAVING A BOOSTING CONTROL SIGNAL TRANSITIONED FROM A FIRST LEVEL TO A LOWER SECOND LEVEL

(71) Applicant: SAMSUNG ELECTRONICS CO., LTD., Suwon-si (KR)

(72) Inventor: Eun Sub Shim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 220 days.

(21) Appl. No.: 18/118,307

(22) Filed: Mar. 7, 2023

(65) Prior Publication Data

US 2024/0089626 A1    Mar. 14, 2024

(30) Foreign Application Priority Data

Sep. 8, 2022    (KR) .................. 10-2022-0114313

(51) Int. Cl.
  H04N 5/335    (2011.01)
  H04N 25/709   (2023.01)
  H04N 25/78    (2023.01)

(52) U.S. Cl.
  CPC ........... *H04N 25/709* (2023.01); *H04N 25/78* (2023.01)

(58) Field of Classification Search
  None
  See application file for complete search history.

(56) References Cited

U.S. PATENT DOCUMENTS

| | | | |
|---|---|---|---|
| 9,881,968 B2* | 1/2018 | Storm | H01L 27/14638 |
| 10,110,783 B2* | 10/2018 | Webster | H04N 3/1506 |
| 10,887,536 B2 | 1/2021 | Lim et al. | |
| 11,050,966 B2 | 6/2021 | Mori et al. | |
| 11,172,153 B2* | 11/2021 | Oh | H04N 25/78 |
| 11,342,366 B2 | 5/2022 | Kwag | |
| 11,637,980 B2* | 4/2023 | Shim | H04N 25/78 |
| | | | 348/222.1 |
| 2021/0029316 A1 | 1/2021 | Lee et al. | |
| 2021/0289154 A1 | 9/2021 | Johnson et al. | |
| 2023/0369375 A1* | 11/2023 | Lim | H04N 25/79 |

FOREIGN PATENT DOCUMENTS

KR    102176000 B1    11/2020

* cited by examiner

*Primary Examiner* — Gary C Vieaux
(74) *Attorney, Agent, or Firm* — Fish & Richardson P.C.

(57) ABSTRACT

An image sensor includes: a pixel including a boosting capacitor with one electrode connected to a first node to which a charge generated from a photoelectric element is transmitted, and outputting a pixel voltage based on the first node; a row driver outputting a reset-signal that resets the first node, a boosting control-signal applied to the other electrode, and a transmission-signal transmitting the charge to the first node; a read-out-circuit receiving the pixel voltage as a first-signal before the transmission-signal is output to the pixel, and receiving the pixel voltage as a second-signal after the transmission-signal is output to the pixel. A controller controlling the row driver to change the boosting control-signal from a first-level to a second-level lower than the first-level after changing the reset-signal from an enable to a disable, and controlling the read-out-circuit to receive the first-signal and the second-signal during which the boosting control-signal is at the second-level.

20 Claims, 31 Drawing Sheets t103-t104 t104-t105 t105-t106 t106-t107 t107-t108 t108-t109 t307-t308 t308-t309 t309-t310 t310-t311 t311-t312 t312-t313 t313-t314 t314-t315

IMAGE SENSOR INCLUDING A CAPACITOR HAVING A BOOSTING CONTROL SIGNAL TRANSITIONED FROM A FIRST LEVEL TO A LOWER SECOND LEVEL

CROSS-REFERENCE TO RELATED APPLICATION

This application claims priority to and the benefit of Korean Patent Application No. 10-2022-0114313 filed in the Korean Intellectual Property Office on Sep. 8, 2022, the entire contents of which are incorporated herein by reference.

BACKGROUND

(a) Field

The present disclosure relates to an image sensor.

(b) Description of the Related Art

An image sensor is a device for capturing a two-dimensional or three-dimensional image of an object. The image sensor generates an image of the object using a photovoltaic element that reacts according to the intensity of light reflected from the object.

Recently, the demand for image sensors having improved performance in various fields is increasing. A CMOS (Complementary Metal-Oxide Semiconductor) image sensor is an image pickup element manufactured using a CMOS process, and compared to a CCD (Charge-Coupled Device) image sensor, their merits are that a manufacturing cost is low, power consumption is low, and high integration is attainable.

Recently, with developments in the computer industry and the communication industry, the demand for the image sensors having improved integration and performance in the various fields such as for digital cameras, camcorders, a PCS (Personal Communication Systems), game devices, security cameras, medical micro cameras, a robots, etc. is increasing.

Recently, as image sensors are down-sized, various methods to increase power efficiency have been proposed.

SUMMARY

An exemplary embodiment provides an image sensor that controls the driving voltage of a pixel.

Another exemplary embodiment provides an image sensor having an improved optical charge transmission rate.

An image sensor according to an exemplary embodiment includes: a pixel array including a pixel including a photoelectric element and a boosting capacitor with one electrode connected to a first node to which a charge generated from the photoelectric element is transmitted, and outputting a pixel voltage according to a voltage of the first node; a row driver outputting a reset signal that resets the voltage of the first node as a power source voltage, a boosting control signal applied to the other electrode of the boosting capacitor, and a transmission signal transmitting the charge to the first node; a read-out circuit receiving the pixel voltage as a first input signal before the transmission signal is output to the pixel, receiving the pixel voltage as a second input signal after the transmission signal is output to the pixel, and outputting image data by using the first input signal and the second input signal; and a controller controlling the row driver so as to change the boosting control signal from a first level to a second level lower than the first level after changing the reset signal from an enable level to a disable level, and controlling the read-out circuit so as to receive the first input signal and the second input signal within a section in which the boosting control signal is maintained at the second level.

The controller may control the row driver so as to change the boosting control signal from the first level to the second level after changing the reset signal from the enable level to the disable level within a shutter section resetting a charge generated in the photoelectric element and a charge accumulated in the first node.

The controller may further control the row driver so as to output the boosting control signal with a third level higher than the first level during which the transmission signal is output to the pixel.

The controller may further control the row driver so as to output the boosting control signal at the third level during which the transmission signal is output to the pixel within a shutter section resetting a charge generated in the photoelectric element and a charge accumulated in the first node.

The controller may control the row driver so as to output the boosting control signal at the second level after changing the reset signal from the enable level to the disable level in the shutter section.

The pixel may further include a floating diffuser connected to the first node, the row driver may further output a gain control signal controlling a capacitance of the floating diffuser, and the controller may control the row driver so as to change the gain control signal from an enable level to a disable level within a section in which the boosting control signal is maintained at the second level after changing the reset signal from the enable level to the disable level.

The read-out circuit may receive the pixel voltage as a third input signal before the transmission signal is output to the pixel at a first section in which the gain control signal is an enable level, receive the pixel voltage as a fourth input signal after the transmission signal is output to the pixel at a second section in which the gain control signal is an enable level, and output image data by using the third input signal and the fourth input signal.

The controller may further control the row driver to output the boosting control signal with the third level during which the second transmission signal is output to the pixel.

An image sensor according to an exemplary embodiment includes: a photoelectric element;

A first transistor connecting the photoelectric element and a first node in response to a transmission signal; a second transistor applying a power source voltage to the first node in response to a reset signal; a first floating diffuser connected to the first node; a first capacitor including one electrode connected to the first node and the other electrode to which a first boosting control signal is input; and a third transistor generating a pixel signal and outputting the pixel signal in response to the voltage of the first node, wherein the first boosting control signal is transitioned from a first level to a second level lower than the first level after the second transistor is turned off.

The first boosting control signal may be at a third level higher than the first level in the section in which the first transistor is turned on.

A first switch transistor connected between the first node and the second transistor, and a second floating diffuser connected to a second node between the first switch transistor and the second transistor may be further included, and the first boosting control signal may be transitioned from the first level to the second level after the second transistor is turned off and before the first switch transistor is turned off. The first boosting control signal may be at a third level higher than the first level at the section in which the first transistor is turned on.

One terminal of the second floating diffuser may be connected to the second node, and the other terminal of the second floating diffuser to which a second boosting control signal is input, while the second boosting control signal may be transitioned from the first level to the second level after the second transistor is turned off and before the first switch transistor is turned off.

The second boosting control signal may be a third level higher than the first level in the section in which the first switch transistor is turned on.

A second switch transistor connected between the second node and the second transistor, and a third floating diffuser connected to a third node between the second switching transistor and the second transistor may be further included, while the first boosting control signal may be transitioned to the second level after the second transistor is turned off and before the first switch transistor and the second switch transistor are turned off.

One terminal of the third floating diffuser may be connected to the third node, the other terminal of the third floating diffuser to which a third boosting control signal is input, and the third boosting control signal may be transitioned from the first level to the second level after the second transistor is turned off and before the first switch transistor and the second switch transistor are turned off.

The third boosting control signal may be a third level higher than the first level from the second level at a section in which the first transistor is turned on.

One terminal of the second floating diffuser may be connected to the second node, and the other terminal of the second floating diffuser to which a second boosting control signal is input, while the second boosting control signal may be transitioned from the first level to the second level after the second transistor is turned off and before the first switch transistor is turned off.

An image sensor according to an exemplary embodiment includes: a photoelectric element; a first transistor that connects the photoelectric element and a first node in response to a transmission signal; a second transistor that applies a power source voltage to the first node in response to a reset signal; a first floating diffuser connected to the first node; a first switch transistor connected between the first node and the second transistor; a second floating diffuser including one terminal connected to a second node between the first switch transistor and the second transistor, and the other terminal to which a boosting control signal is input; and a third transistor that generates a pixel signal in response to the voltage of the first node and outputs the pixel signal, wherein the boosting control signal is transitioned from a first level to a second level lower than the first level after the second transistor is turned off, and before the first switch transistor is turned off.

The boosting control signal may be transitioned from the second level to a third level higher than the first level during the section in which the first transistor is turned on after the first switch transistor is turned on.

DETAILED DESCRIPTION OF THE PREFERRED EMBODIMENTS

Figure 1:
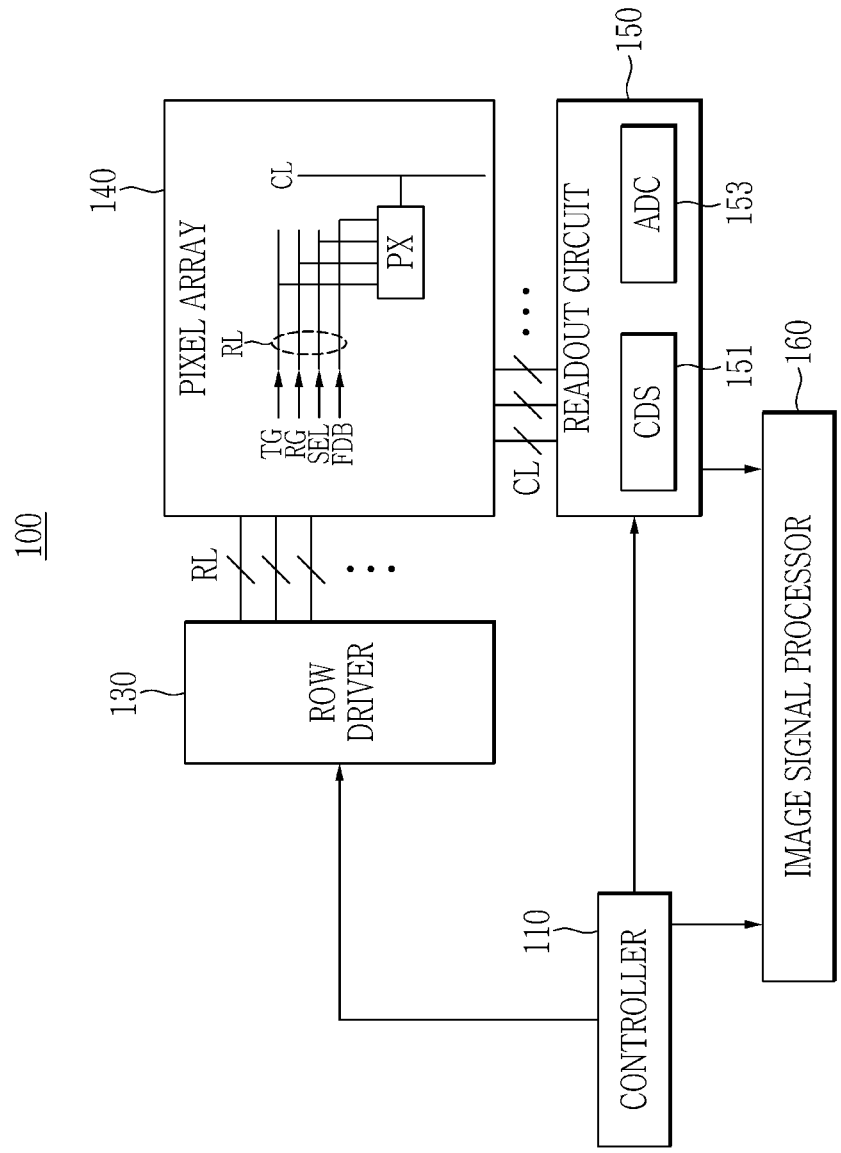
FIG. 1 is an example block diagram of an image sensor according to an exemplary embodiment.

In the following detailed description, only certain exemplary embodiments of the present invention have been shown and described, simply by way of illustration. As those skilled in the art would realize, the described exemplary embodiments may be modified in various different ways, all without departing from the spirit or scope of the present invention.

Accordingly, the drawings and description are to be regarded as illustrative in nature and not restrictive. Like reference numerals designate like elements throughout the specification. In a flowchart described with reference to the drawings, an order of operations may be changed, several operations may be merged, some operations may be divided, and specific operations may not be performed or omitted.

In addition, expressions written in the singular may be construed in the singular or plural unless an explicit expression such as "one" or "single" is used. Terms including ordinal numbers such as first, second, and the like will be used only to describe various components, and are not to be interpreted as limiting these components. These terms may be used for the purpose of distinguishing one constituent element from other constituent elements.

FIG. 1 is an example block diagram of an image sensor according to an exemplary embodiment.

Referring to FIG. 1, an image sensor 100 may generate an image signal by converting light received from the exterior into an electrical signal. The image sensor 100 may be mounted on an electronic device having an image sensing or optical sensing function. For example, the image sensor 100 may be mounted to electric devices such as a camera, a smartphone, a wearable device, an Internet of Things (IoT) device, a home appliance, a tablet personal computer (PC), a personal digital assistant (PDA), or a portable multimedia player (PMP), a navigation device, a drone, and an advanced driver assistance systems (ADAS). Alternatively, the image sensor 100 may be mounted on an electronic device provided as a component in a vehicle, furniture, manufacturing equipment, a door, various measurement devices, and the like. The image sensor 100 may operate by a rolling shutter method for sequentially driving a plurality of row lines RL, a global shutter method for driving all pixels at once, etc., but is not limited thereto and may be applied to any structure that performs a shutter operation.

An image sensor 100 according to an exemplary embodiment of the present invention may include a controller 110, a row driver 130, a pixel array 140, a read-out circuit 150, and an image signal processor 160.

The controller 110 may perform overall control each constituent element 130, 140, and 150 included in the image sensor 100. The controller 110 may control an operation timing of each constituent element 130, 140, and 150 by using control signals. The controller 110 may generate a signal that is a reference for the operation timing of the components of the image sensor 100. The controller 110 may control the timing of the row driver 130 and the read-out circuit 150. The controller 110 may provide a control signal to control the timing of the row driver 130 and the read-out circuit 150.

According to the an exemplary embodiment, the controller 110 may adjust the driving voltage of the pixel circuit in the pixel array 130 through the row driver 130. The driving voltage may be a voltage applied to the gate of the driving transistor in the pixel circuit as described later. Also, the controller 110 may adjust a floating diffuser (FD) capacitance of the pixel circuit in the pixel array 130 through the row driver 130.

The pixel array 140 may include a plurality of pixels PX, and a plurality of row lines RL and a plurality of column lines CL respectively connected to a plurality of pixels PX. In some exemplary embodiments, each pixel PX may include at least one photoelectric element (also referred to as a photo-sensing element). The photoelectric element may sense incident light and convert the incident light into an electrical signal according to the amount of light, that is, generate an analog pixel signal. The level of the analog pixel signal output from the photoelectric element may be proportional to the amount of charge output from the photoelectric element. That is, the level of the analog pixel signal output from the photoelectric element may be proportional to the amount of light received into the pixel array 140.

The row lines RL extend in the first direction and may be connected to the pixels PX that are disposed along the first direction. For example, the row lines RL may transmit a control signal output from the row driver 130 to an element (e.g., a transistor) included in the pixel PX. The column line CL extends in a second direction intersecting the first direction, and may be connected to the pixels PX that are disposed along the second direction. The column line CL may transmit the pixel voltage output from the pixels PX to the read-out circuit 150.

The row driver 130 may generate the control signal for driving the pixel array 140 and may provide the control signal to a plurality of pixels PX of the pixel array 140 through a plurality of row lines RL. For example, the control signal may include a transmission signal TG, a reset signal RG, a selection signal SEL, a gain control signal DCG, and a boosting control signal FDB. In some exemplary embodiments, the row driver 130 may control the pixel PX to detect light incident into the row line unit. The row line unit may include at least one row line RL.

In some exemplary embodiments, the row driver 130 may adjust the voltage of the floating node connected to the gate of the driving transistor by changing the voltage of the boosting control signal 1-DB. In addition, the row driver 130 may control the capacitance of the floating diffuser connected to the floating node by selecting the floating diffuser connected to the floating node through the gain control signal DCG.

The read-out circuit 150 may convert an analog pixel voltage output through the column line CL from the pixel PX connected to the row line RL selected by the selection signal SEL into a pixel value. The pixel value may be image data having a plurality of bits, and may be a value representing the amount of light.

In detail, the read-out circuit 150 may include a correlated double sampler (CDS) 151 and an analog-to-digital converter (ADC) 153. The correlated double sampler 151 may have a first input terminal and a second input terminal. The correlated double sampler 151 may receive a ramp voltage from the controller 110 at the first input terminal. The correlated double sampler 151 may receive the pixel voltage from the pixel array 140 at the second input terminal. The correlated double sampler 151 may detect the pixel signal by performing correlated double sampling on the ramp voltage input to the first input terminal and the pixel voltage input to the second input terminal.

The analog digital converter 153 may be connected to the output terminal of the correlated double sampler 151. The analog digital converter 153 may convert the pixel signal detected by the correlated double sampler 151 into image data that is a digital signal and output it.

The image signal processor 160 may perform the image signal processing on the image data output by the read-out circuit 150. For example, the image signal processor 160 may receive a plurality of image data and generate one image by synthesizing the received image signals. In some exemplary embodiments, the image signal processor 160 may be positioned externally of the image sensor 100.

Figure 2:
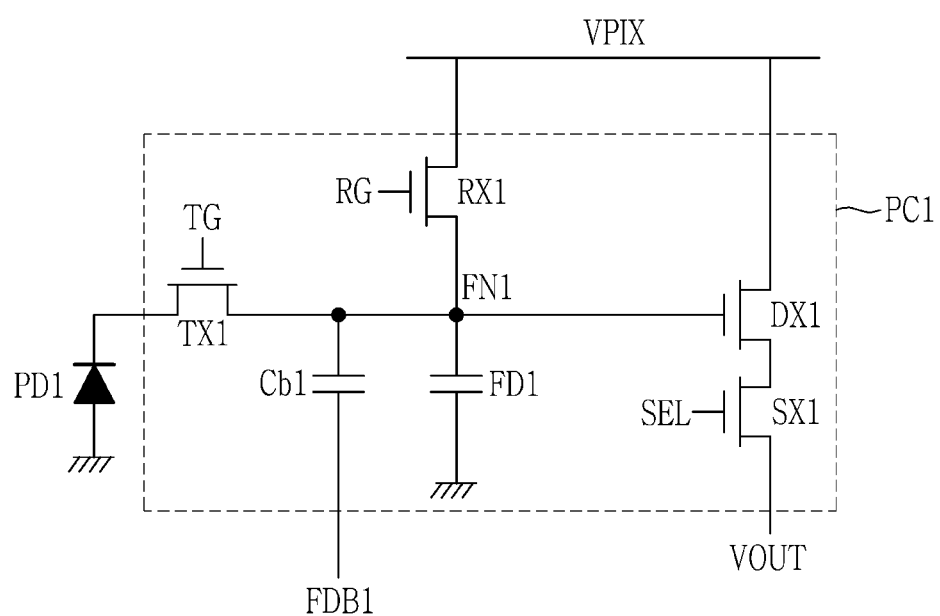
FIG. 2 is a circuit diagram of a pixel according to an exemplary embodiment.

FIG. 2 is a circuit diagram of a pixel according to an exemplary embodiment.

The pixel PX1 according to an exemplary embodiment may include a photoelectric element PD1 that generates a charge in response to light and a pixel circuit PC1 that outputs an electrical signal by processing the charge generated by the photoelectric element PD1.

The photoelectric element PD1 may react with light to generate electrons or holes as main charge carriers. The cathode of the photoelectric element PD1 may be connected to the floating node FN1 through the transmission transistor TX1, and the anode of the photoelectric element PD1 may be grounded.

The pixel circuit PC1 may include a floating diffuser FD1, a boosting capacitor Cb1, a reset transistor RX1, a driving transistor DX1, a selection transistor SX1, and a transmission transistor TX1. The transistors RX1, DX1, SX1, and TX1 in the pixel circuit PC1 may operate in response to control signals, for example a transmission signal TG, a selection signal SEL, and a reset signal RG provided from the row driver 130.

The transmission transistor TX1 is connected between the photoelectric element PD1 and the floating node FN1, and may be controlled by the transmission signal TG. When the transmission transistor TX1 is turned on, the charge generated by the photoelectric element PD1 may be transferred to the floating node FN1.

The voltage of the floating node FN1 may be determined according to the charge accumulated in the floating diffuser FD1. The conversion gain, which is the ratio of which a charge is converted into a voltage, may be inversely proportional to the size of the capacitance of the floating diffuser FD1.

The gate of the driving transistor DX1 is connected to the floating node FN1. Here, the driving voltage may be the voltage of the floating node FN1. The driving transistor DX1 may operate as a source-follower amplifier that outputs a voltage signal corresponding to the voltage of the floating node FN1. The driving transistor DX1 may output the pixel voltage VOUT to the column line CL through the selection transistor SX1 in response to the voltage of the floating node FN1.

The selection transistor SX1 is connected between the driving transistor DX1 and the column line CL, and may be controlled by the selection signal SEL. When the selection transistor SX1 is turned on, the pixel voltage VOUT output from the driving transistor DX1 may be output to the read-out circuit 150 (in FIG. 1) through the column line CL connected to the selection transistor SX1.

The reset transistor RX1 is connected between the power source voltage line supplying the power source voltage VPIX and the floating node FN1, and may be controlled by the reset signal RG. When the reset transistor RX1 is turned on, the power source voltage VPIX may be transferred to the floating node FN1 through the reset transistor RX1 to reset the floating node FN1. When the floating node FN1 is reset, the floating node FN1 may have a voltage of a potential lower or higher than the power source voltage VPIX. Hereinafter, when the floating node FN1 is reset, the voltage of the floating node FN1 is referred to as a reset voltage. The driving transistor DX1 may output the pixel voltage VOUT through the column line CL in response to the reset voltage of the floating node FN1. In addition, when the photo charge generated by the photoelectric element PD1 is stored in the floating node FN1, the voltage of the floating node FN1 is referred to as a signal voltage.

Since the charge corresponding to the reset voltage or the charge corresponding to the signal voltage may be accumulated in the floating diffuser FD1, the floating diffuser FD1 may be modeled as a kind of a capacitor having an arbitrary capacitance. The boosting capacitor Cb1 may be coupled in parallel with the floating diffuser FD1 in the floating node FN1. The boosting control signal FDB1 may be output to one electrode of the boosting capacitor Cb1. The boosting control signal FDB1 may control the voltage applied to the floating node FN1.

On the other hand, for better understanding and ease of description, it is assumed that the control signal of high level H is an enable signal higher than the threshold voltage of the transistors RX1, DX1, SX1, and TX1 and the control signal low level L is a disable signal lower than the threshold voltage of the transistors RX1, DX1, SX1, and TX1. In the present disclosure, the terms of high level H or low level L are used as examples of logic levels.

Also, hereinafter, the boosting control signal FDB1 may operate with a first level and a second level, or the boosting control signal FDB1 may operate with a first level, a second level, and a third level. Here, the second level may be a voltage greater than the first level, and the third level may be a voltage greater than the second level.

Figure 3:
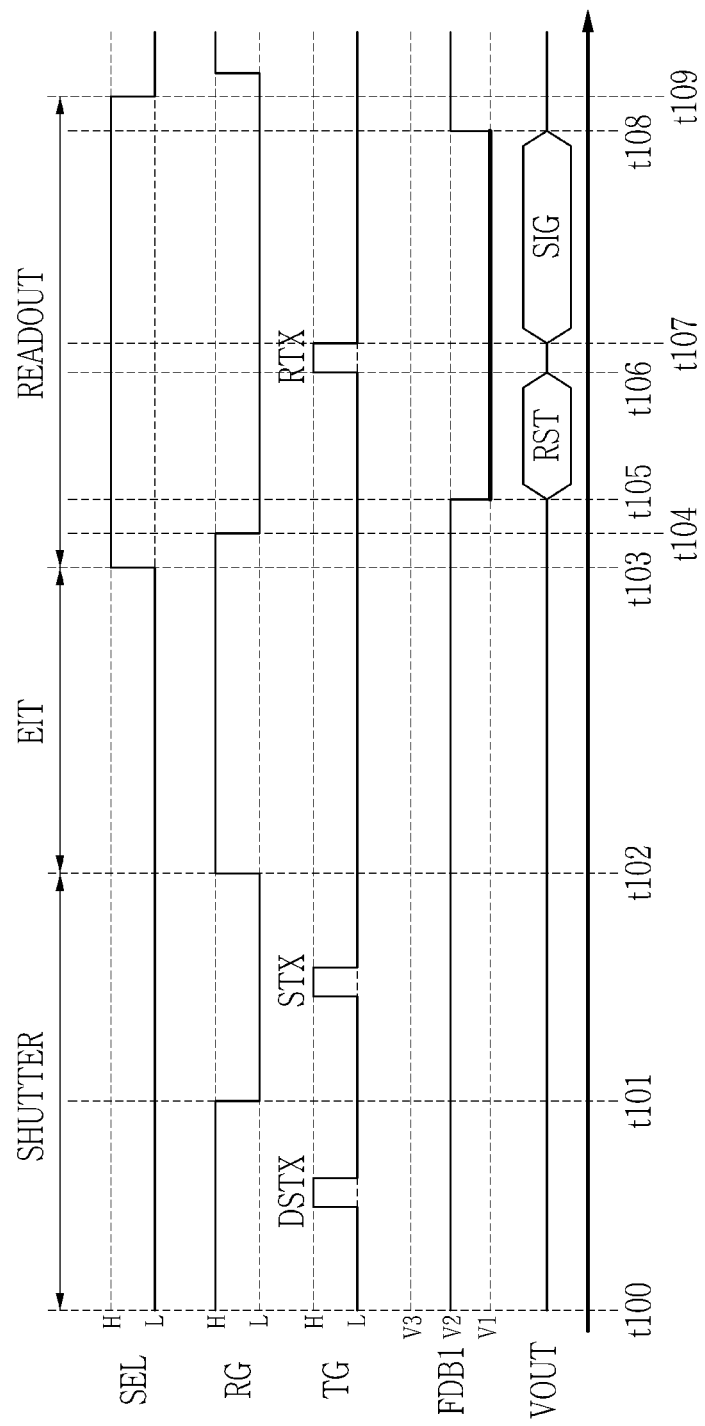
FIG. 3 is a timing diagram for explaining an operation of an image sensor according to FIG. 2.

FIG. 3 is a timing diagram for explaining an operation of an image sensor according to FIG. 2.

In FIG. 3, a scan section for driving a plurality of pixels PX with a row line unit is shown. One scan section may include a shutter section SHUTTER (t100 to t102), a charge accumulation section EIT (Electron Integration Time) (t102 to t103), and a read-out section READOUT (t103 to t109).

In the shutter section SHUTTER, the charges accumulated in the floating node FN1 and the photoelectric element PD1 are reset.

In the section t100 to t101, the reset signal RG may maintain high level H. In the section t100, the reset signal RG of high level H may be applied to the gate of the reset transistor RX1, so that the reset transistor RX1 may be turned on. Accordingly, the power source voltage VPIX may be supplied to the floating node FN1.

In the section t100 to t101, the transmission signal TG may be transitioned to an arbitrary pulse DSTX form. The pulse form may be a form in which a signal of low level L is transitioned to high level H and then transitioned from high level H to low level L again after a predetermined time. When the transmission signal TG of high level H is applied to the gate of the transmission transistor TX1, the transmission transistor TX1 may be turned on. Accordingly, the power source voltage VPIX may be supplied to the floating node FN1 and the photoelectric element PD1.

In the section t101 to t102, the reset signal RG may maintain a low level L. The reset signal RG of low level L may be applied to the gate of the reset transistor RX1 to turn off the reset transistor RX1. Accordingly, the supply of the power source voltage VPIX to the floating node FN1 is cut off.

In the section t101 to t102, the transmission signal TG may be transitioned to an arbitrary pulse STX form. When the transmission signal TG of high level H is applied to the gate of the transmission transistor TX1, the transmission transistor TX1 may be turned on. Accordingly, the charge accumulated in the photoelectric element PD1 may be transmitted to the floating node FN1.

The photo charge generated in the photoelectric element PD1 may be transmitted to the floating node FN1 through the transmission signal TG of high level H provided at least twice to the gate of the transmission transistor TX1 in the form of the pulses DSTX and STX in the shutter section SHUTTER. The photo charge transmitted to the floating node FN1 may be removed through the power source voltage VPIX.

The charge accumulation section EIT is a section in which the photo charge is accumulated in the photoelectric element PD1.

In the section t102 to t103, the photo charge may be accumulated in the photoelectric element PD1 by the light incident on the pixel PX1.

In the section t102 to t103, the reset signal RG may maintain high level H. Accordingly, the power source voltage VPIX is supplied to the floating node FN1.

The read-out section READOUT is a section in which the pixel voltage VOUT generated by the pixel PX1 is transmitted to the read-out circuit 150.

FIG. 4 to FIG. 9 are views showing a change of a potential level of each channel region within one pixel according to an exemplary embodiment. The operation of the image sensor 100 in the read-out section READOUT is described with reference to FIG. 4 to FIG. 9.

In FIG. 4 to FIG. 9, according to the vertical direction, the potential of each channel increases as the size of D1 increases, and decreases as the size of D1 decreases. Also, the capacitance of each channel is expressed as a width along the direction D2.

At the section t103, the selection signal SEL may be transitioned to high level H. It is applied to the gate of the selection transistor SX1 of high level H so that the selection transistor SX1 may be turned on.

In the section t103 to t104, the reset signal RG may maintain high level H, the transmission signal TG may maintain low level L, and the boosting control signal FDB1 may maintain the second level V2.

Figure 4:
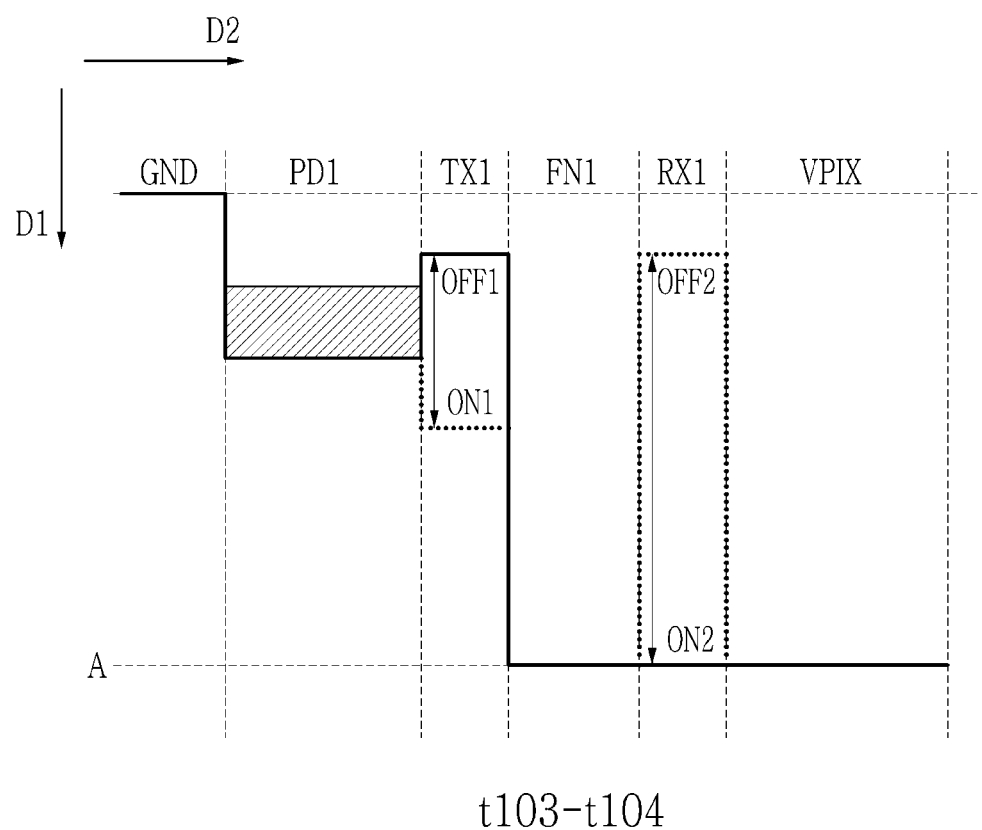
FIG. 4 to FIG. 9 are views showing a change of a potential level of each channel region within one pixel according to an exemplary embodiment.

This is described together with reference to FIG. 4 showing the potential level of each channel region in the pixel PX1 in the section t103 to t104.

FIG. 4 shows the potential level of each of a reference voltage GND, a photoelectric element PD1 region, a channel region of a transmission transistor TX1, a floating node FN1 region, a channel region of a reset transistor RX1, and a power source voltage VPIX.

The amount of the photo charge generated by the photoelectric element PD1 may correspond to the area of the shaded part in the photoelectric element PD1 region of FIG. 4. The potential level of the channel region of the transmission transistor TX1 may be varied between the first potential ON1 and the second potential OFF1 as shown in FIG. 4 in response to the logic level of the transmission signal TG. The potential level of the channel region of the reset transistor RX1 may be varied between the third potential ON2 and the fourth potential OFF2 as shown in FIG. 4 in response to the logic level of the reset signal RG. Also, the power source voltage VPIX may have a potential A. In FIG. 4, the second potential OFF1 and the fourth potential OFF2 are illustrated as the same potential, but the present invention is not limited thereto, and the second potential OFF1 and the fourth potential OFF2 may be different.

In the section t103 to t104, since the transmission transistor TX1 is turned off, the transmission transistor TX1 may have a second potential OFF1. Accordingly, the photo charge accumulated in the photoelectric element PD1 may not be transferred to the floating node FN1. Meanwhile, since the reset transistor RX1 is turned on in the section t103 to t104, the reset transistor RX1 may have a third potential ON2. Accordingly, the floating node FN1 may have the same potential A as the power source voltage VPIX.

At the section t104, the reset signal RG may be transitioned from high level H to low level L. The reset signal RG of low level L may be applied to the gate of the reset transistor RX1 to turn off the reset transistor RX1.

In sections t104 to t105, the reset signal RG and the transmission signal TG may maintain low level L, and the boosting control signal FDB1 may maintain the second level V2.

Figure 5:
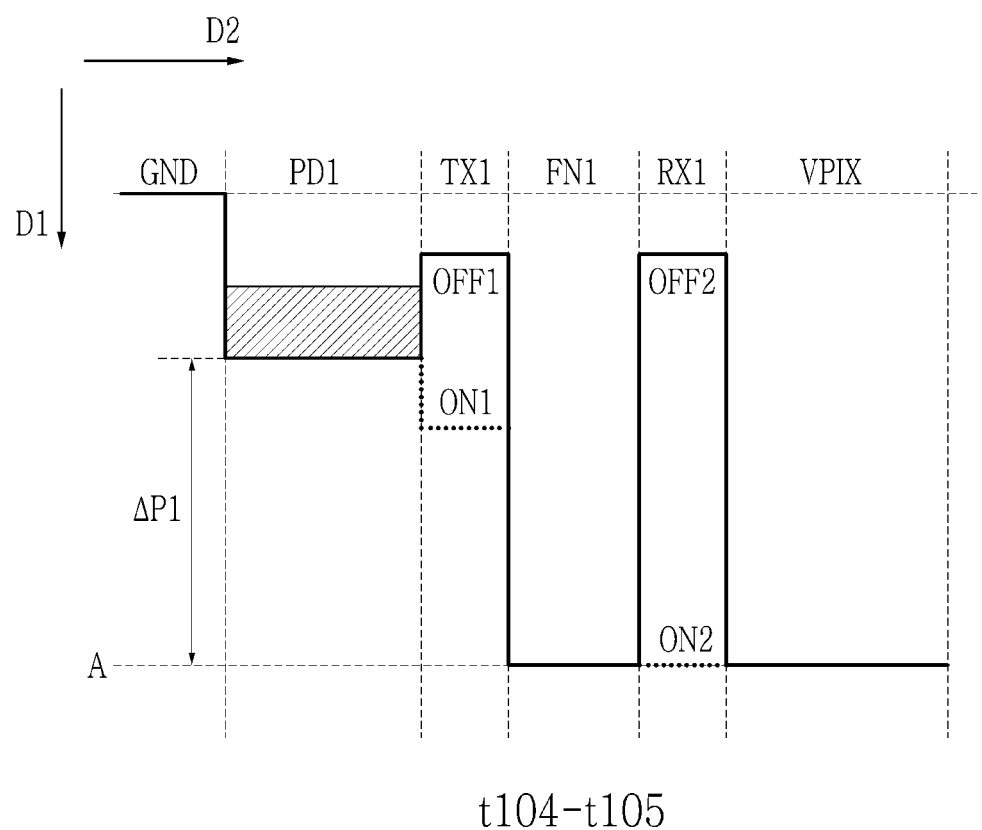

This is described together with reference to FIG. 5 showing the potential level of each channel region within the pixel PX1 in the section t104 to t105.

Referring to FIG. 5, in sections t104 to t105, since the transmission transistor TX1 maintains the second potential OFF1, the photo charge accumulated in the photoelectric element PD1 may not be transferred to the floating node FN1. Meanwhile, since the reset transistor RX1 is turned off in sections t104 to t105, the reset transistor RX1 may have a fourth potential OFF2. Accordingly, the supply of the power source voltage VPIX to the floating node FN1 is cut off. In this case, the difference between the base potential of the photoelectric element PD1 and the potential of the floating node FN1 may be ΔP1.

At the section t105, the boosting control signal FDB1 may be transitioned from the second level V2 to the first level V1. The boosting control signal FDB1 may maintain the first level V1 from the section t105 to the section t108.

In sections t105 to t106, the reset signal RG and the transmission signal TG may maintain the low level L, and the boosting control signal FDB1 may maintain the first level V1.

Figure 6:
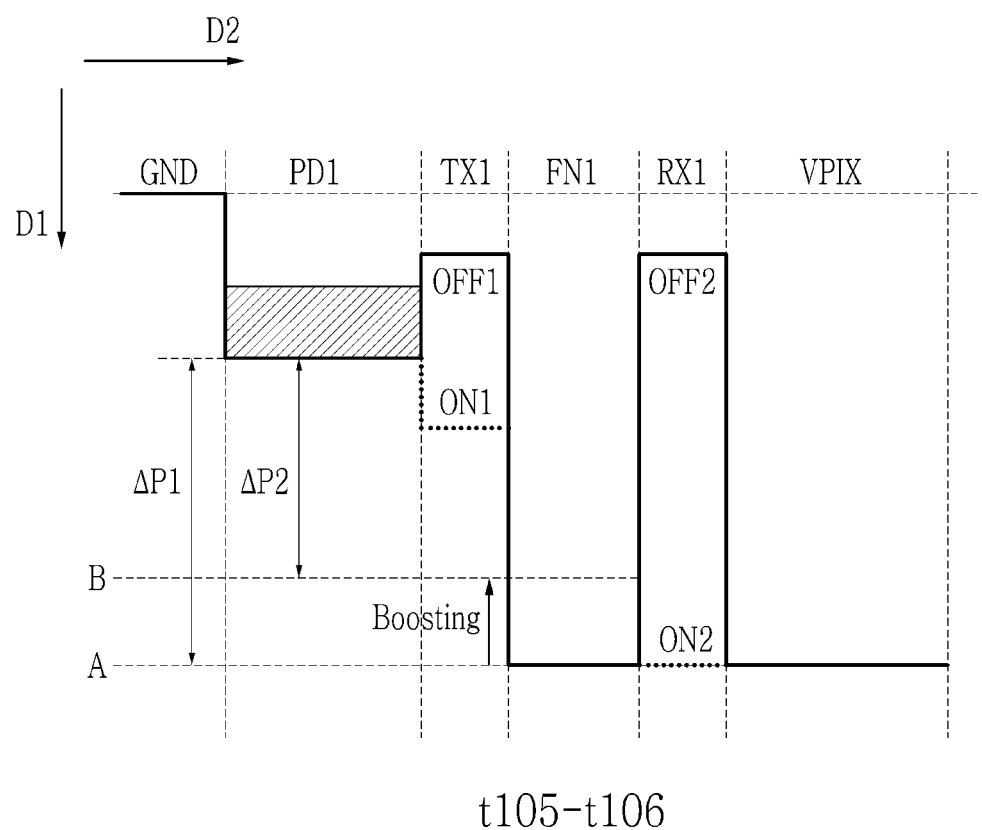

This is described together with reference to FIG. 6 showing the potential level of each channel region within the pixel PX1 in sections t105 to t106.

Referring to FIG. 6, the boosting control signal FDB1 may boost the floating node FN1 to a lower potential than the power source voltage VPIX through the boosting capacitor Cb1. As described above, the boosting control signal FDB1 may control the voltage applied to the floating node FN1 through the boosting capacitor Cb1. The boosting control signal FDB1 may boost the floating node FN1 to a potential lower than the power source voltage VPIX by using the charge charged in the boosting capacitor Cb1 in the section t103 to t104. This may be to use a characteristic that the both terminal voltage of the capacitor does not change instantaneously unless the delta current is supplied. Here, the degree of the boosting of the floating node FN1 may be determined by the capacitance of the boosting capacitor Cb1 and the degree of the change of the boosting control signal FDB1. Preferably, the degree of the boosting of the floating node FN1 may be about 200 mV.

At the section t105, as the boosting control signal FDB1 is transitioned to the first level V1, in the sections t105 to t106, the floating node FN1 may have the lower potential B than the potential A of the power source voltage VPIX. The potential B of the floating node FN1 when the boosting control signal FDB1 is the first level V1 may be lower than the potential A of the floating node FN1 when the boosting control signal FDB1 is at the second level V2. That is, an absolute value of the base potential level of the floating node FN1 may decrease. At this time, when the boosting control signal FDB1 is at the first level V1, the difference between the potential of the photoelectric element PD1 and the potential of the floating node FN1 may be ΔP2.

In sections t105 to t106, the voltage of the floating node FN1 may be the reset voltage. The potential of the floating node FN1 when the boosting control signal FDB1 of the first level V1 is applied may be lower than the potential of the floating node FN1 when the boosting control signal FDB1 of the second level V2 is applied. Accordingly, when the boosting control signal FDB1 of the first level V1 is applied, the lower voltage may be applied to the gate of the driving transistor DX1 compared to when the boosting control signal FDB1 of the second level V2 is applied to the floating node FN1. A pixel voltage VOUT corresponding to the reset voltage RST may be output to the column line CL through the driving transistor DX1.

In summary, the floating node FN1 may be controlled to have the low potential by transitioning the boosting control signal FDB1 to the first level V1 in sections t105 to t106 that outputs the reset voltage. Accordingly, the reset voltage when the boosting control signal FDB1 is used may be lower than the reset voltage when the boosting control signal FDB1 is not used.

Before the reset signal RG is transitioned to a low level (i.e., when the reset transistor RX1 is turned on), since the floating node FN1 is connected to the power source voltage VPIX, the boosting by the boosting control signal FDB1 may be difficult to change the potential of floating node FN1. However, at section t104, after the reset signal RG is transitioned to the low level, since the boosting control signal FDB1 is transitioned to the first level V1, the boosting by the boosting control signal FDB1 may fully affect the potential of floating node FN1. Accordingly, after the reset signal RG is transitioned to the low level, since the boosting control signal FDB1 is transitioned to the first level V1, before the reset signal RG is transitioned to the low level, compared to the transition of the boosting control signal FDB1 to the first level V1, the potential of the floating node FN1 may be boosted more.

Next, at the section t106, the transmission signal TG may be transitioned in the form of a pulse RTX.

In sections t106 to t107, the reset signal RG may maintain the low level L, the transmission signal TG may maintain a high level H, and the boosting control signal FDB1 may maintain the first level V1.

Figure 7:
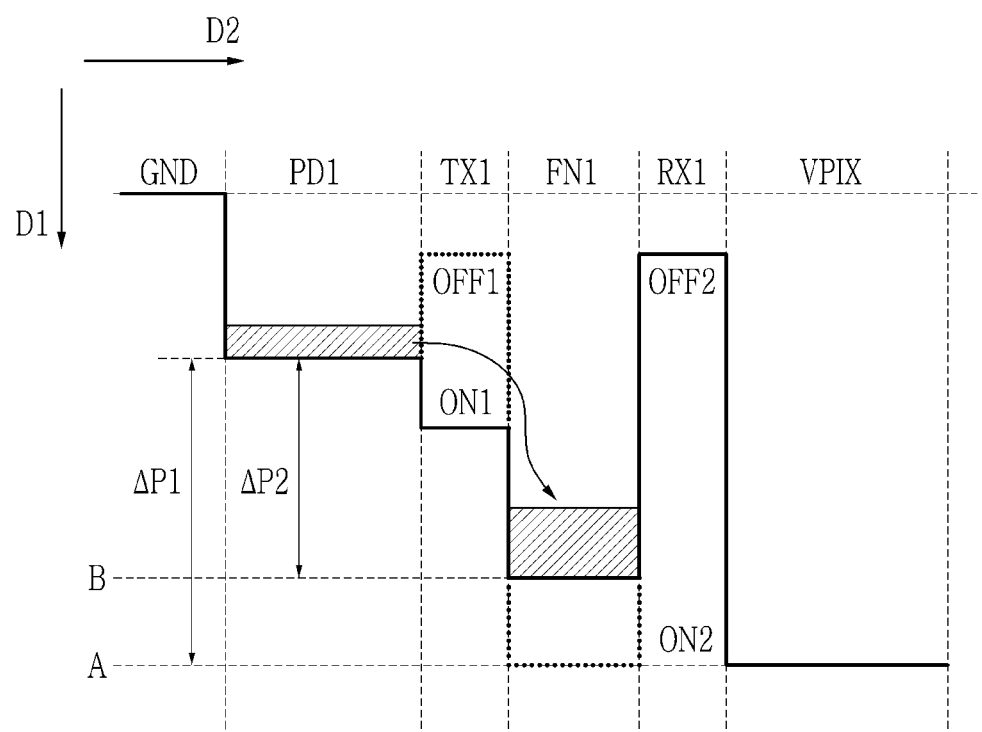

This is described together with reference to FIG. 7 showing the potential level of each channel region within the pixel PX1 in sections t106 to t107.

Referring to FIG. 7, in sections t106 to t107, since the transmission transistor TX1 is turned on, it may have the first potential ON1. Accordingly, the photo charge accumulated in the photoelectric element PD1 may be transmitted to the floating node FN1 through the channel region of the transmission transistor TX1. Meanwhile, since the reset transistor RX1 is turned off in sections t106 to t107, the reset transistor RX1 may have a fourth potential OFF2. Accordingly, the supply of the power source voltage VPIX to the floating node FN1 may be cut off.

The photo charge transmission rate may mean a ratio of photo charge transferred to the floating node FN1 to the charge generated by the photoelectric element PD1. As the difference between the potential of the photoelectric element PD1 region and the potential of the floating node FN1 region increases, the photo charge transmission rate from the photoelectric element PD1 to the floating node FN1 may increase. In addition, as the size of the floating diffuser connected to the floating node FN1 increases, the photo charge transmission rate may be high. That is, the stronger the force of the floating node FN1 to attract the photo charge accumulated in the photoelectric element PD1 is, the higher the photo charge transmission rate may be.

Since the size of the floating diffuser FD1 connected to the floating node FN1 does not change, the photo charge transmission rate when the boosting control signal FDB1 is first level V1 may be lower than the photo charge transmission rate when the boosting control signal FDB1 is second level V2. Accordingly, the photo charge generated in the photoelectric element PD1 may be better transmitted to the floating node FN1 when the boosting control signal FDB1 is at the second level V2 than when the boosting control signal FDB1 is at the first level V1.

At the section t107, the transmission signal TG may be transitioned from high level H to low level L.

In sections t107 to t108, the reset signal RG and the transmission signal TG may maintain the low level L, and the boosting control signal FDB1 may maintain the first level V1.

Figure 8:
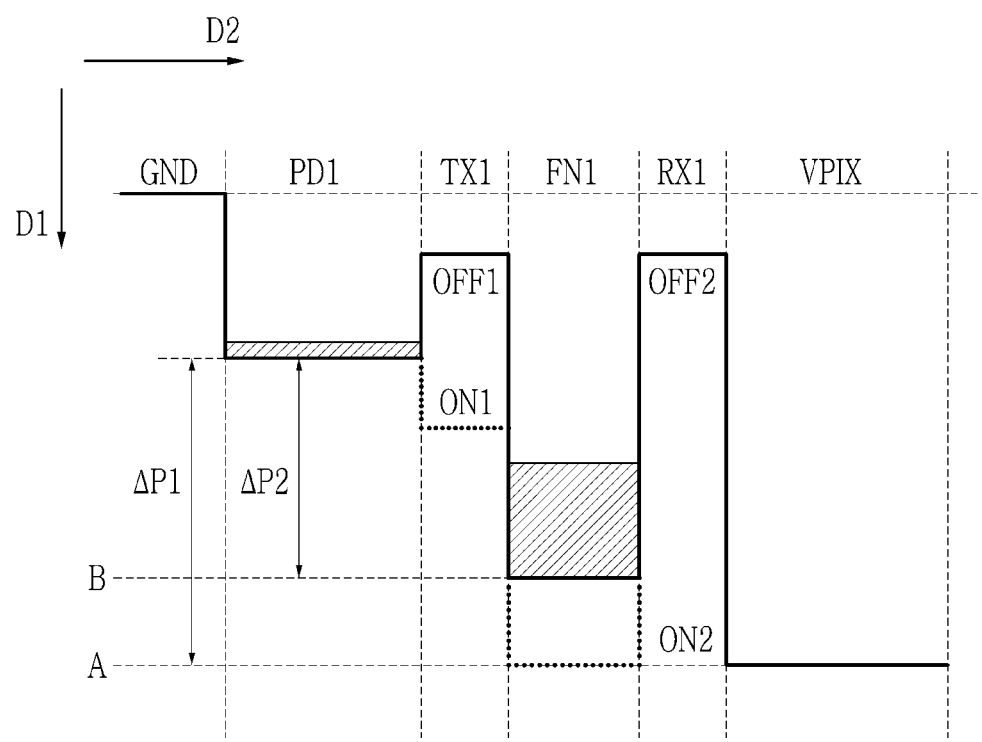

This is described together with reference to FIG. 8 showing the potential level of each channel region within the pixel PX1 at sections t107 to t108.

Referring to FIG. 8, in sections t107 to t108, the transmission transistor TX1 is turned off, and then it may have the second potential OFF1. Accordingly, the charge accumulated in the photoelectric element PD1 may not be transferred to the floating node FN1. Meanwhile, in sections t107 to t108, the reset transistor RX1 may be turned off, so that it may have a fourth potential OFF2. Accordingly, the supply of the power source voltage VPIX to the floating node FN1 may be cut off.

In the case of the pixel PX1 having the low photo charge transmission rate, all photo charges generated in the photoelectric element PD1 may not be transmitted to the floating node FN1. As shown in FIG. 8, the photoelectric element PD1 may have the photo charges that have not been transferred to the floating node FN1. The image sensor 100 may not output an accurate image signal due to the photo charge remaining in the photoelectric element PD1.

In sections t107 to t108, the voltage of the floating node FN1 may be a signal voltage. As described above, when the boosting control signal FDB1 of the first level V1 is applied, the lower voltage may be applied to the gate of the driving transistor DX1 than when the boosting control signal FDB1 of the second level V2 is applied to the floating node FN1. At this time, the pixel voltage VOUT corresponding to the signal voltage SIG may be output to the column line CL through the driving transistor DX1.

In summary, at both sections t105 to t106 that outputs the reset voltage and the sections t107 to t108 that output the signal voltage, the boosting control signal FDB1 is transitioned to the first level V1 to control the floating node FN1 to have the low potential. Accordingly, the reset voltage and the signal voltage when the boosting control signal FDB1 is used may be lower than the reset voltage and the signal voltage when the boosting control signal FDB1 is not used. That is, by using the boosting control signal FDB1, the driving transistor DX1 may sample the pixel voltage VOUT within the lower operating range.

The read-out circuit 150 may generate the image data by performing the correlation double sampling operation on the pixel voltage VOUT corresponding to the reset voltage in sections t105 to t106 and the pixel voltage VOUT corresponding to the signal voltage in sections t107 to t108.

At section t108, the boosting control signal FDB1 may be transitioned from the first level V1 to the second level V2.

In sections t108 to t109, the reset signal RG and the transmission signal TG may maintain the low level L, and the boosting control signal FDB1 may maintain the second level V2.

Figure 9:
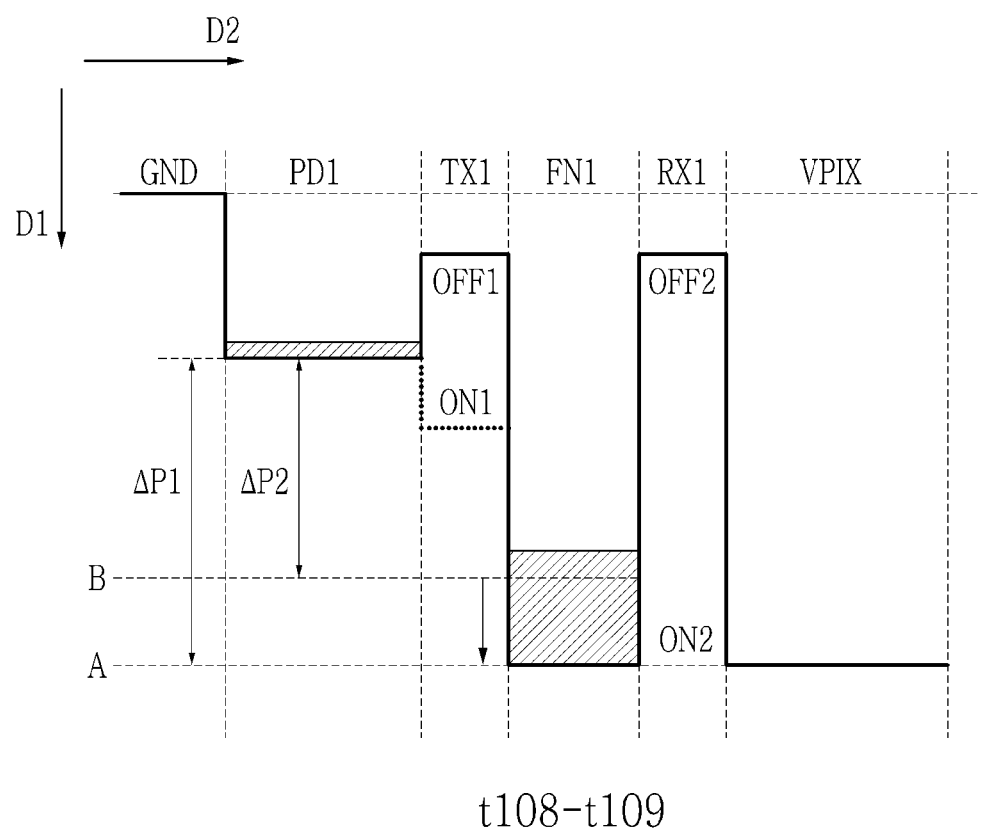

This is described together with reference to FIG. 9 showing the potential level of each channel region in the pixel PX1 in sections t108 to t109.

Referring to FIG. 9, as the boosting control signal FDB1 is transitioned to the second level V2, the floating node FN1 may have the potential A. Even if the potential of the floating node FN1 is changed, the amount of the photo charge accumulated in the floating node FN1 may be maintained to be the same as the amount of photo charge accumulated in the floating node FN1 in sections t107 to t108.

The image sensor 100 may read the pixel voltage by repeating the above-described scan section a plurality of times.

Figure 10:
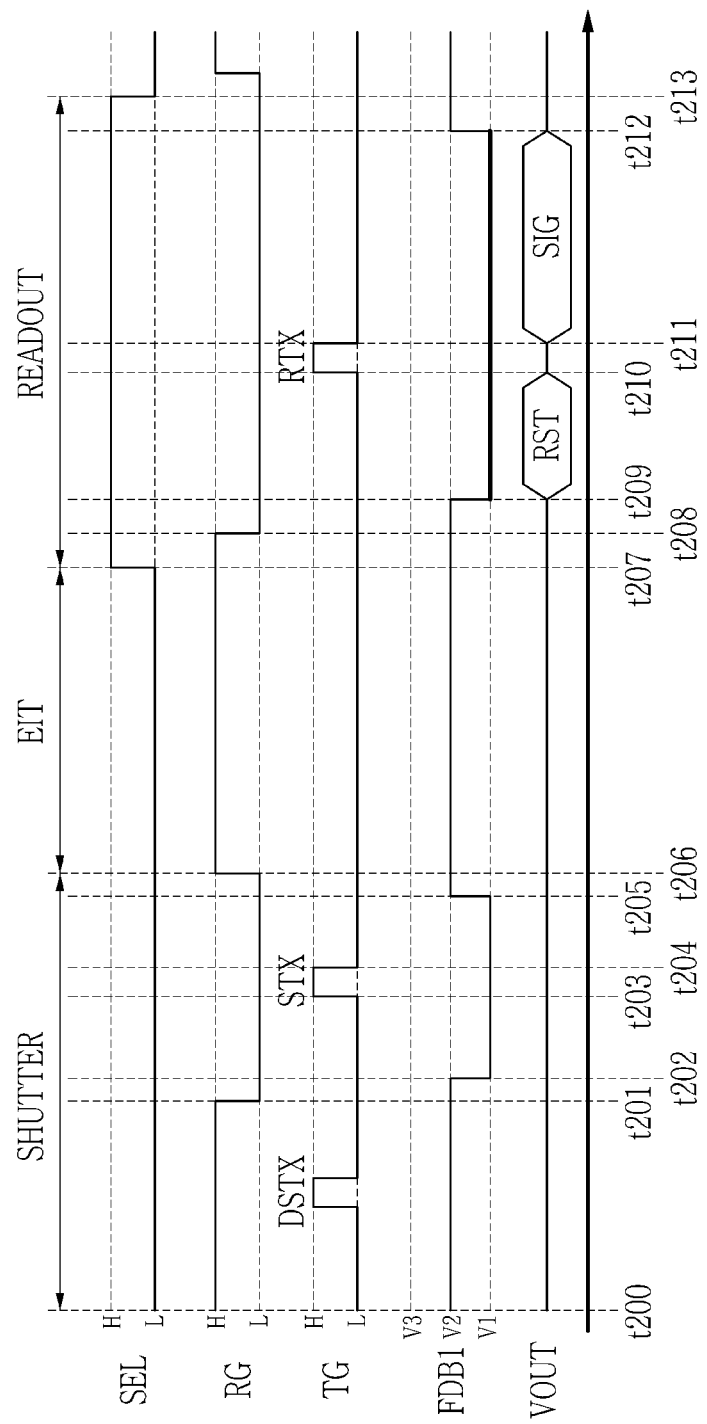
FIG. 10 is another timing diagram for explaining an operation of an image sensor according to an exemplary embodiment.

FIG. 10 is another timing diagram for explaining an operation of an image sensor according to an exemplary embodiment of the present invention.

In FIG. 10, a scan section for driving a plurality of pixels with a row line unit is shown. One scan section may include a shutter section SHUTTER (t200 to t206), a charge accumulation section EIT (t206 to t207), and a read-out section READOUT (t207 to t213).

On the other hand, the waveform of the selection signal SEL, the reset signal RG, the transmission signal TG, and the boosting control signal FDB1 in the charge accumulation section EIT and the read-out section READOUT of FIG. 10 is the same as the waveform of the selection signal SEL, the reset signal RG, the transmission signal TG, and the boosting control signal FDB1 in the charge accumulation section EIT and the read-out section READOUT shown in FIG. 3 so that the description in FIG. 3 may be also applied to FIG. 10.

In the shutter section SHUTTER, the charges accumulated in the floating node FN1 and the photoelectric element PD1 may be reset.

Specifically, in sections t200 to t201, the reset signal RG may maintain the high level H. The reset signal RG of the high level H may be applied to the gate of the reset transistor RX1 to turn on the reset transistor RX1. Accordingly, the power source voltage VPIX may be supplied to the floating node FN1.

In sections t200 to t201, the transmission signal TG may be transitioned to an arbitrary pulse DSTX form. When the high level H transmission signal TG is applied to the gate of the transmission transistor TX1, the transmission transistor TX1 may be turned on. Accordingly, the power source voltage VPIX may be supplied to the floating node FN1 and the photoelectric element PD1.

At section t201, the reset signal RG may be transitioned to the low level L. The reset signal RG of the low level L may be applied to the gate of the reset transistor RX1, so that the reset transistor RX1 may be turned off. Accordingly, the supply of the power source voltage VPIX to the floating node FN1 is cut off.

At section t202, the boosting control signal FDB1 may be transitioned from the second level V2 to the first level V1. The boosting control signal FDB1 may maintain the first level V1 from the section t202 to the section t205. Accordingly, the floating node FN1 may have a potential lower than the potential of the power source voltage VPIX.

In the image sensor, as the amount that the photo charge generated by the photoelectric element PD1 in the read-out section READOUT is transferred to the floating node FN1 and the amount that the photo charge generated by the photoelectric element PD1 in the shutter section SHUTTER is transferred to the floating node FN1 are similar. The higher the number, the higher the probability of reading the undistorted reset voltage and signal voltage. For example, when the amount that the photo charge generated by the photoelectric element PD1 in the shutter section SHUTTER is transferred to the floating node FN1 is higher than the amount that the photo charge generated by the photoelectric element PD1 in the read-out section READOUT is transferred to the floating node FN1, a dead zone in which the image data does not exist in the frame may occur. In addition, if the amount that the photo charge generated by photoelectric element PD1 in the shutter section SHUTTER is transmitted to the floating node FN1 is less than the amount that the photo charge generated by photoelectric element PD1 is transmitted to the floating node FN1 in the read-out section READOUT, an after-image may occur in the current frame by the photo charge accumulated in the photoelectric element PD1 in the previous frame. That is, the image sensor may generate more accurate image data as the photo charge transmission rate in the shutter section SHUTTER and the photo charge transmission rate in the read-out section READOUT are similar.

Accordingly, the row driver 130 may control the boosting control signal FDB1 so that the potential of the floating node FN1 of sections t209 to t210 before transferring the charge accumulated in the photoelectric element PD1 in the read-out section READOUT to the floating node FN1, and the potential of the floating node FN1 of sections t202 to t203 before transferring the charge accumulated in the photoelectric element PD1 in the shutter section to the floating node FN1 are the same. Also, the row driver 130 may control the boosting control signal FDB1 so that the potential of the floating node FN1 of sections t211 to t212 after transferring the charge accumulated in the photoelectric element PD1 in the read-out section READOUT to the floating node FN1, and the potential of the floating node FN1 of sections t204 to t205 after transferring the charge accumulated in the photoelectric element PD1 in the shutter section to the floating node FN1, are the same.

In sections t202 to t205, the transmission signal TG may be transitioned to an arbitrary pulse STX form. When the transmission signal TG of high level H is applied to the gate of the transmission transistor TX1, the transmission transistor TX1 may be turned on. Accordingly, the charge accumulated in the photoelectric element PD1 may be transmitted to the floating node FN1.

At section t205, the boosting control signal FDB1 may be transitioned from the first level V1 to the second level V2.

Next, at section t206, the reset signal RG may be transitioned from the low level L to the high level H.

The charge accumulation section EIT is a section in which the charges are accumulated in the photoelectric element PD1.

The read-out section READOUT is a section in which the pixel voltage VOUT generated by the pixel PX1 is transmitted to the read-out circuit 150.

The image sensor 100 may read the pixel voltage VOUT by repeating the above-described scan section a plurality of times.

Figure 11:
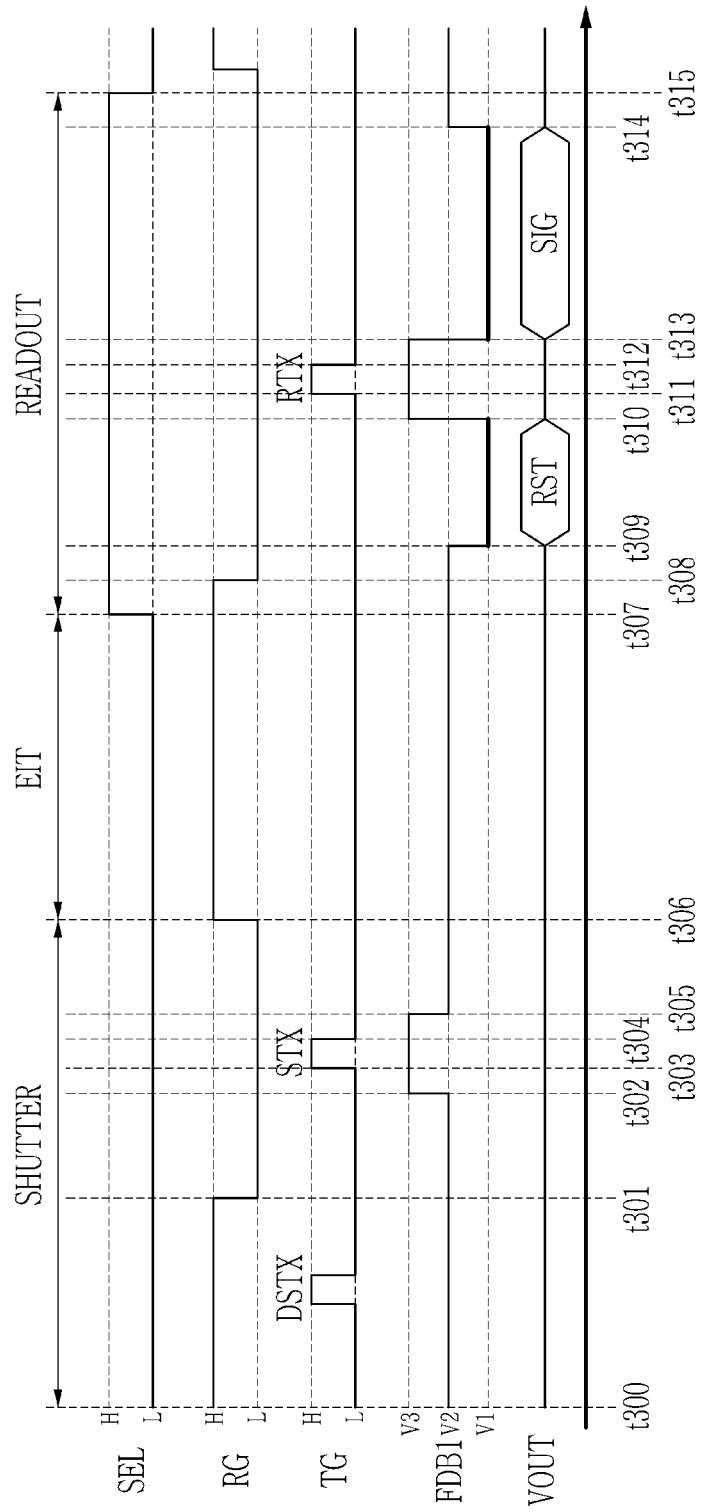
FIG. 11 is another timing diagram for explaining the operation of an image sensor according to an exemplary embodiment.

FIG. 11 is another timing diagram for explaining the operation of an image sensor according to another exemplary embodiment of the present invention.

In FIG. 11, a scan section for driving a plurality of pixels with a row line unit is shown. One scan section may include a shutter section SHUTTER (t300 to t306), a charge accumulation section EIT (t306 to t307), and a read-out section READOUT (t307 to t315).

In the shutter section SHUTTER, the charge accumulated in the floating node FN1 and the photoelectric element PD1 is reset.

Specifically, in sections t300 to t301, the reset signal RG may maintain the high level H. The reset signal RG of the high level H may be applied to the gate of the reset transistor RX1, so that the reset transistor RX1 may be turned on. Accordingly, the power source voltage VPIX may be supplied to the floating node FN1.

In sections t300 to t301, the transmission signal TG may be transitioned to an arbitrary pulse DSTX form. When the transmission signal TG of the high level H is applied to the gate of the transmission transistor TX1, the transmission transistor TX1 may be turned on. Accordingly, the power source voltage VPIX may be supplied to the floating node FN1 and the photoelectric element PD1.

At section t301, the reset signal RG may be transitioned to the low level L. The reset signal RG of the low level L may be applied to the gate of the reset transistor RX1, so that the reset transistor RX1 may be turned off. Accordingly, the supply of the power source voltage VPIX to the floating node FN1 is cut off.

At section t302, the boosting control signal FDB1 may be transitioned to the third level V3. The boosting control signal FDB1 may maintain the third level V3 from section t302 to the section t305.

At section t303, the transmission signal TG may have an arbitrary pulse STX form and may be transitioned from the low level L to the high level H. Thereafter, at section t304, the transmission signal TG may be transitioned from the high level H to the low level L.

As described above, in order to read the undistorted reset voltage and signal voltage, it is preferable that the photo charge transmission rate in the shutter section SHUTTER and the photo charge transmission rate in the read-out section READOUT are similar. Accordingly, the boosting control signal FDB1 may be operated so that the potential of the floating node FN1 of sections t310 to t311 before transferring the charge accumulated in the photoelectric element PD1 in the read-out section READOUT to the floating node FN1, and the potential of the floating node FN1 of sections t302 to t303 before transferring the charge accumulated in the photoelectric element PD1 in the shutter section to the floating node FN1 are the same. Also, the boosting control signal FDB1 may be operated so that the potential of the floating node FN1 of sections t312 to t313 after transferring the charge accumulated in the photoelectric element PD1 in the read-out section READOUT to the floating node FN1, and the potential of the floating node FN1 of sections t304 to t305 after transferring the charge accumulated in the photoelectric element PD1 in the shutter section to the floating node FN1, are the same. The change of the potential level of each channel region generated within the pixel PX1 depending on the change of the boosting control signal FDB1 is described later with reference to FIG. 12 to FIG. 17.

At section t305, the boosting control signal FDB1 may be transitioned from the third level V3 to the second level V2.

The charge accumulation section EIT is a section in which the charges are accumulated in the photoelectric element PD1.

In sections t306 to t307, the charge may be accumulated in the photoelectric element PD1 by the light incident on the pixel PX1.

Also, at section t306, the reset signal RG may be transitioned from low level L to high level H. Accordingly, the power source voltage VPIX may be supplied to the floating node FN1.

The read-out section READOUT is a section in which the pixel voltage VOUT generated by the pixel PX1 is transmitted to the read-out circuit 150.

The operation of the image sensor of the read-out section READOUT is described together with reference to FIG. 12 to FIG. 19. FIG. 12 to FIG. 19 are views showing a change of potential level of each channel region within one pixel according to an exemplary embodiment of the present invention.

In FIG. 12 to FIG. 19, according to the vertical direction, the potential of each channel increases as the size of D1 increases, and decreases as the size of D1 decreases. Also, the capacitance of each channel is expressed as a width along the direction D2.

First, at section t307, the selection signal SEL may be transitioned to high level H. It is applied to the gate of the selection transistor SX1 of the high level H so that the selection transistor SX1 may be turned on.

In sections t307 to t308, the reset signal RG may be the high level H, and the transmission signal TG and the boosting control signal FDB1 may maintain the second level V2.

Figure 12:
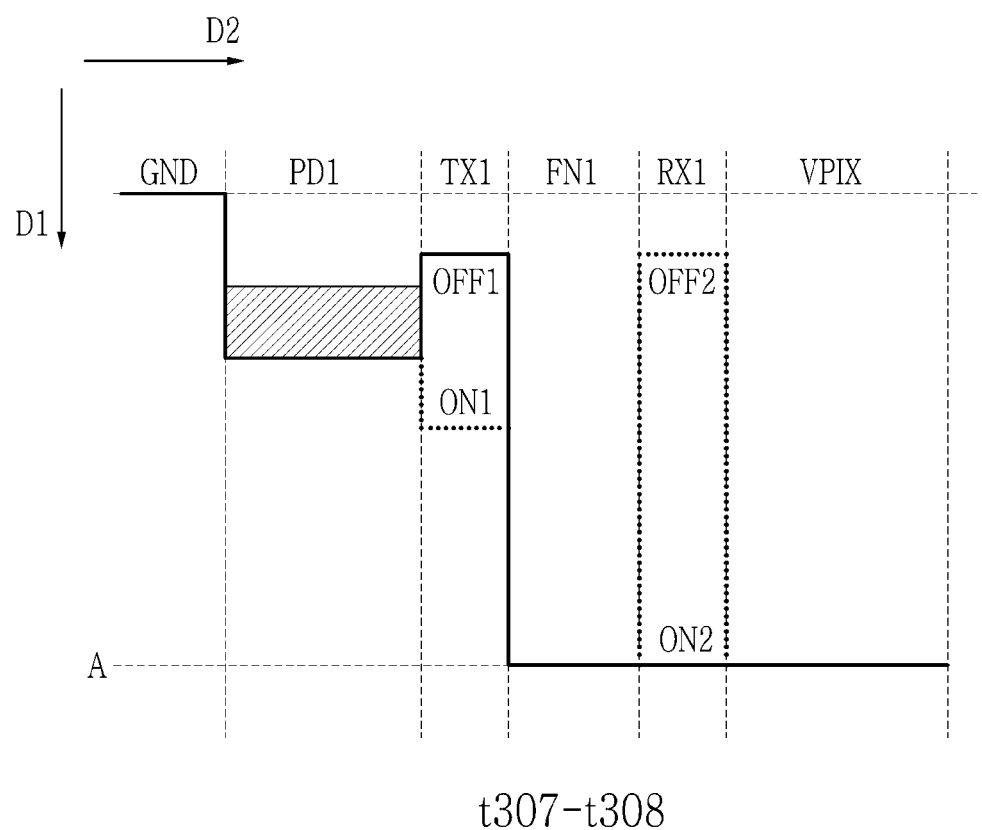
FIG. 12 to FIG. 19 are views showing a change of a potential level of each channel region within one pixel according to an exemplary embodiment.

This is described together with reference to FIG. 12 showing the potential level of each channel region within the pixel PX1 in sections t307 to t308.

FIG. 12 shows the potential level of each of a reference voltage GND, a photoelectric element PD1 region, a channel region of a transmission transistor TX1, a floating node FN1 region, a channel region of a reset transistor RX1, and a power source voltage VPIX.

The amount of photo charge generated by the photoelectric element PD1 may correspond to the area of the shaded part in the photoelectric element PD1 region of FIG. 12. The potential level of the channel region of the transmission transistor TX1 may be varied between the first potential ON1 and the second potential OFF1 as shown in FIG. 12 in response to the logic level of the transmission signal TG. The potential level of the channel region of the reset transistor RX1 may be varied between the third potential ON2 and the fourth potential OFF2 as shown in FIG. 12 in response to the logic level of the reset signal RG. Also, the power source voltage VPIX may have a potential A. In FIG. 12, the second potential OFF1 and the fourth potential OFF2 are illustrated as the same potential, but the present invention is not limited thereto, and the second potential OFF2 and the fourth potential OFF2 may be different.

At sections t307 to t308, since the transmission transistor TX1 is turned off, the transmission transistor TX1 may have a second potential OFF1. Accordingly, the photo charge accumulated in the photoelectric element PD1 may not be transferred to the floating node FN1. Meanwhile, since the reset transistor RX1 is turned on in sections t307 to t308, the reset transistor RX1 may have a third potential ON2. Accordingly, the floating node FN1 may have the same potential A as the power source voltage VPIX.

At section t308, the reset signal RG may be transitioned from the high level H to the low level L. The reset signal RG of the low level L may be applied to the gate of the reset transistor RX1 to turn off the reset transistor RX1.

In sections t308 to t309, the reset signal RG and the transmission signal TG may maintain the low level L, and the boosting control signal FDB1 may maintain the second level V2.

Figure 13:
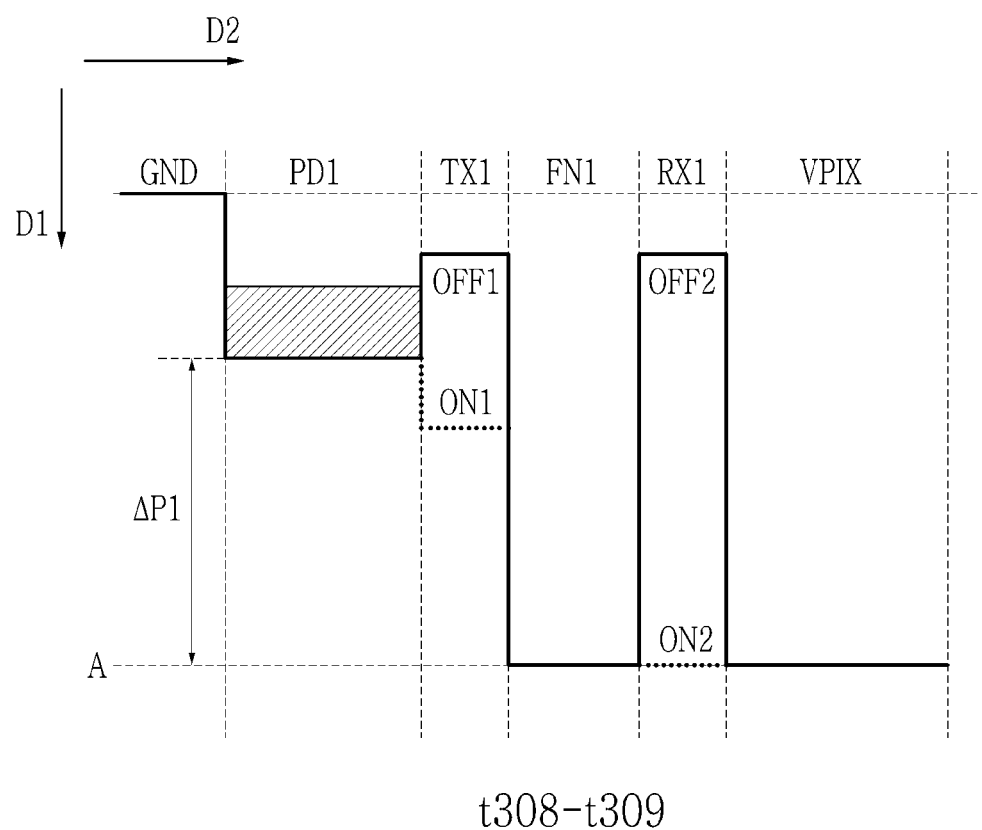

This is described together with reference to FIG. 13 showing the potential level of each channel region within the pixel PX1 in sections t308 to t309.

Referring to FIG. 13, in sections t308 to t309, the transmission transistor TX1 maintains the second potential OFF1, so the photo charge accumulated in the photoelectric element PD1 may not be transferred to the floating node FN1. Meanwhile, since the reset transistor RX1 is turned off in sections t308 to t309, the reset transistor RX1 may have a fourth potential OFF2. Accordingly, the supply of the power source voltage VPIX to the floating node FN1 is cut off. In this case, the difference between the base potential of the photoelectric element PD1 and the potential of the floating node FN1 may be ΔP1.

At section t309, the boosting control signal FDB1 may be transitioned from the second level V2 to the first level V1. The boosting control signal FDB1 may maintain the first level V1 from section t309 to the section t310.

In sections t309 to t310, the reset signal RG and the transmission signal TG may maintain the low level L, and the boosting control signal FDB1 may maintain the first level V1.

Figure 14:
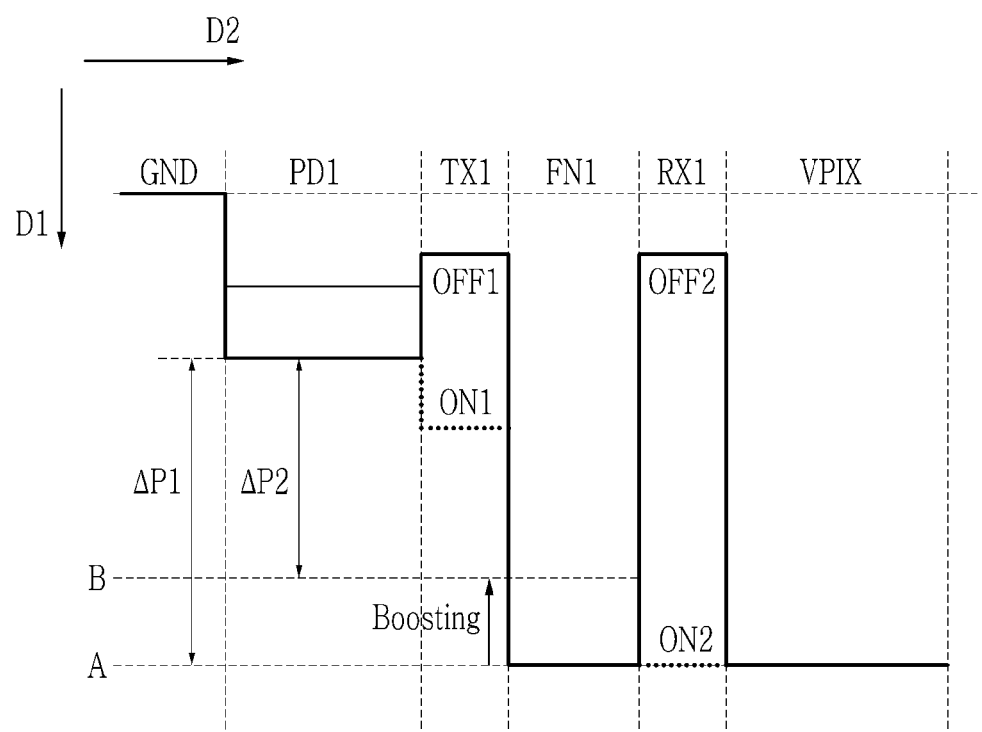

This is described together with reference to FIG. 14 showing the potential level of each channel region within the pixel PX1 in sections t309 to t310.

Referring to FIG. 14, the boosting control signal FDB1 may boost the floating node FN1 to the lower potential than the power source voltage VPIX through the boosting capacitor Cb1. The boosting control signal FDB1 may boost the floating node FN1 to the potential lower than the power source voltage VPIX by using the charge charged in the boosting capacitor Cb1 in sections t306 to t307.

For example, at section t309, as the boosting control signal FDB1 is transitioned to the first level V1, in sections t309 to t310, the floating node FN1 may have the lower potential B than the potential A of the power source voltage VPIX. The potential B of the floating node FN1 when the boosting control signal FDB1 is at the first level V1 may be lower than the potential A of the floating node FN1 when the boosting control signal FDB1 is at the second level V2. That is, the absolute value of the base potential level of the floating node FN1 may decrease. At this time, when the boosting control signal FDB1 is the first level V1, the difference between the potential level of the photoelectric element PD1 and the potential level of the floating node FN1 may be ΔP2.

In sections t309 to t310, the voltage of the floating node FN1 may be the reset voltage. The potential of the floating node FN1 when the boosting control signal FDB1 of the first level V1 is applied may be lower than the potential of the floating node FN1 when the boosting control signal FDB1 of the second level V2 is applied. Accordingly, when the boosting control signal FDB1 of the first level V1 is applied, the lower voltage may be applied to the gate of the driving transistor DX1 than when the boosting control signal FDB1 of the second level V2 is applied to the floating node FN1. The pixel voltage VOUT corresponding to the reset voltage RST may be output to the column line CL through the driving transistor DX1.

Next, at section t310, the boosting control signal FDB1 may be transitioned to the third level V3. The boosting control signal FDB1 may maintain the third level V3 from section t310 to section t313.

In sections t310 to t311, the reset signal RG and the transmission signal TG may maintain the low level L, and the boosting control signal FDB1 may maintain the third level V3.

Figure 15:
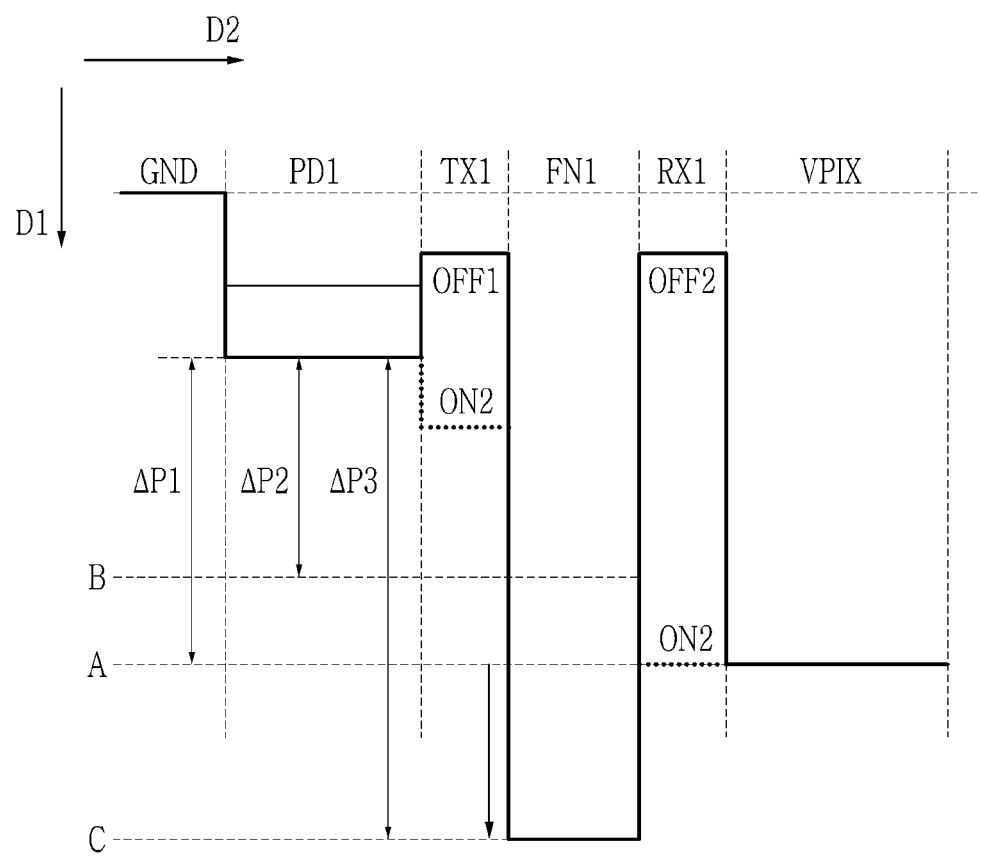

This is described together with reference to FIG. 15 showing the potential level of each channel region within the pixel PX1 in sections t310 to t311.

Referring to FIG. 15, at section t310, as the boosting control signal FDB1 is transitioned to the third level V3, the floating node FN1 may have the potential C higher than the potential A of the power source voltage VPIX. The potential C of the floating node FN1 when the boosting control signal FDB1 is at the third level V3 may be higher than the potential A of the floating node FN1 when the boosting control signal FDB1 is at the second level V2. That is, the absolute value of the base potential level of the floating node FN1 may increase. At this time, when the boosting control signal FDB1 is at a third level V3, the difference between the potential level of the photoelectric element PD1 and the potential of the floating node FN1 may be ΔP3.

Since the capacity of the floating node FN1 does not change, the photo charge transmission rate of the floating node FN1 when the boosting control signal FDB1 is at the third level V3 may be higher than the photo charge transmission rate of the floating node FN1 when the boosting control signal FDB1 is at the second level V2. Accordingly, the photo charge generated in the photoelectric element PD1 may be better transmitted to the floating node FN1 when the boosting control signal FDB1 is at the third level V3 than when the boosting control signal FDB1 is at the second level V2.

Next, at section t311, the transmission signal TG may be transitioned to the high level H. The transmission signal TG of the high level H may be applied to the gate of the transmission transistor TX1 to turn on the transmission transistor TX1.

In sections t311 to t312, the reset signal RG may maintain the low level L, the transmission signal TG may maintain the high level H, and the boosting control signal FDB1 may maintain the third level V3.

Figure 16:
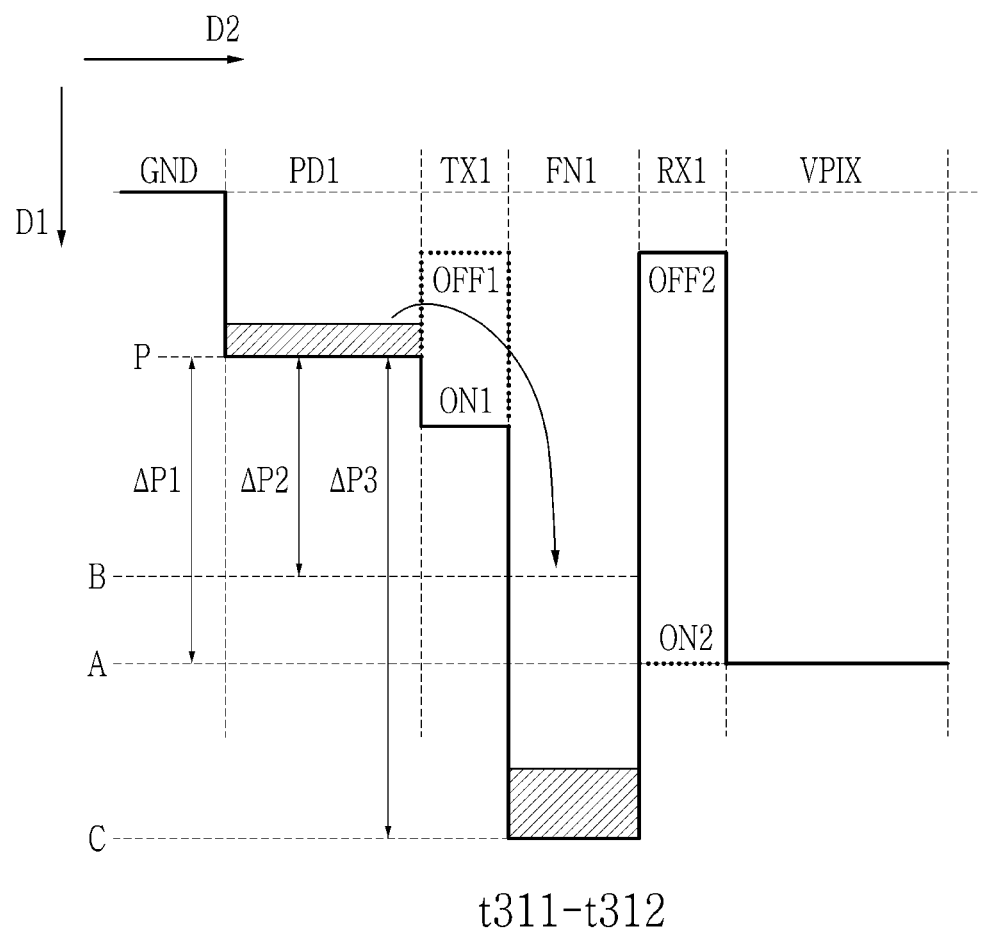

This is described together with reference to FIG. 16 showing the potential level of each channel region within the pixel PX1 in sections t311 to t312.

Referring to FIG. 16, in sections t311 to t312, the transmission transistor TX1 may be turned on to have the first potential ON1. Accordingly, the photo charge accumulated in the photoelectric element PD1 may be transmitted to the floating node FN1 through the channel region of the transmission transistor TX1. Meanwhile, in sections t311 to t312, the reset transistor RX1 is turned off, so it may have a fourth potential OFF2. Accordingly, the connection between the floating node FN1 and the power source voltage VPIX is disconnected.

At section t312, the transmission signal TG may be transitioned from high level H to low level L.

In sections t312 to t313, the reset signal RG and the transmission signal TG may maintain low level L, and the boosting control signal FDB1 may maintain the third level V3.

Figure 17:
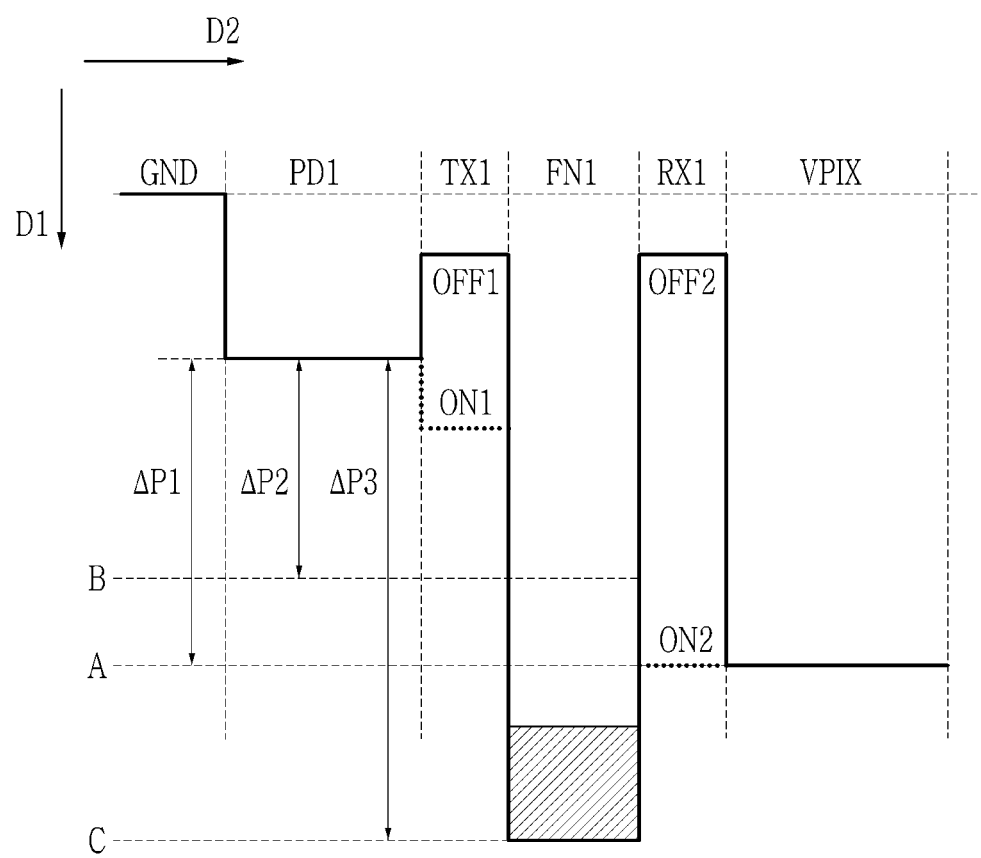

This is described together with reference to FIG. 17 showing the potential level of each channel region within the pixel PX1 in sections t312 to t313.

Referring to FIG. 17, in sections t312 to t313, the transmission transistor TX1 may be turned off to have the second potential OFF1. Accordingly, the charge accumulated in the photoelectric element PD1 may not be transferred to the floating node FN1. Meanwhile, in sections t312 to t313, the reset transistor RX1 may be turned off, so that it may have a fourth potential OFF2. Accordingly, the supply of the power source voltage VPIX to the floating node FN1 is cut off.

As shown in FIG. 17, in sections t306 to t307, most of the photo charge generated in the photoelectric element PD1 may be transferred to the floating node FN1 in sections t311 to t312 and may be accumulated in the floating node FN1.

Next, at section t313, the boosting control signal FDB1 may be transitioned from the third level V3 to the first level V1.

In sections t313 to t314, the reset signal RG and the transmission signal TG may maintain the low level L, and the boosting control signal FDB1 may maintain the first level V1.

Figure 18:
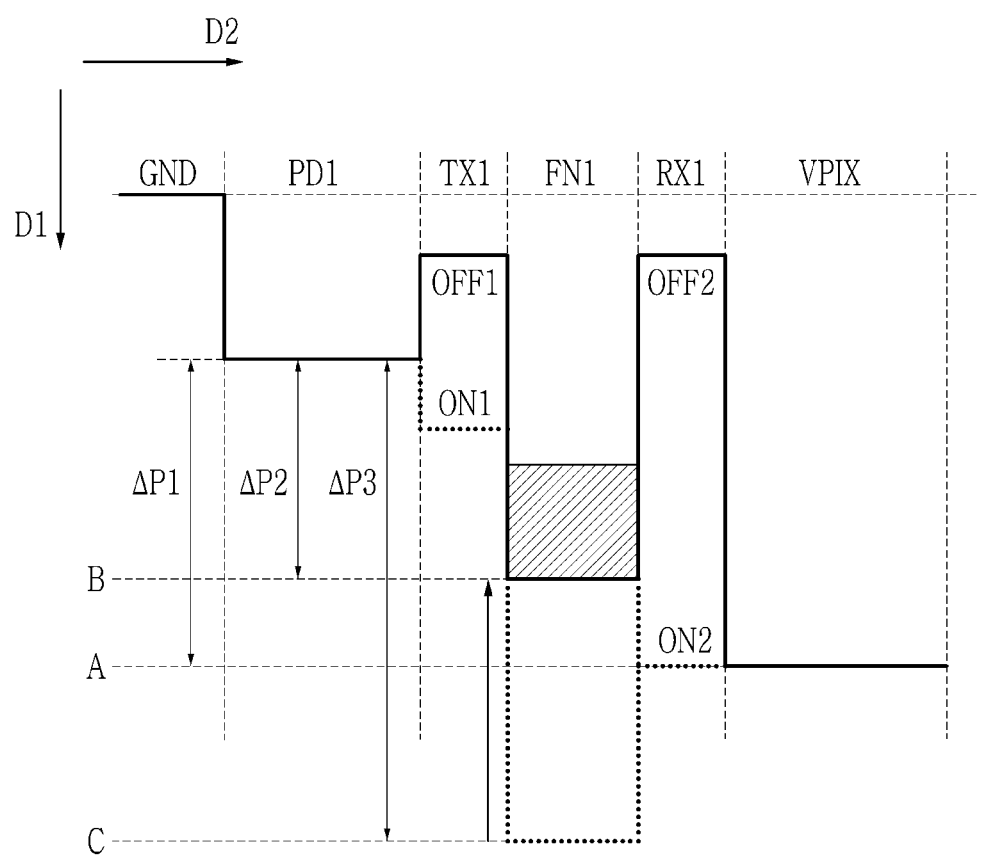

This is described together with reference to FIG. 18 showing the potential level of each channel region within the pixel PX1 in sections t313 to t314.

Referring to FIG. 18, at section t313, as the boosting control signal FDB1 is transitioned to the first level V1, since the potential level of the floating node FN1 is lowered, the floating node FN1 may have the potential B.

In sections t313 to t314, the voltage of the floating node FN1 may be a signal voltage. As described above, when the boosting control signal FDB1 of the first level V1 is applied, the lower voltage may be applied to the gate of the driving transistor DX1 than when the boosting control signal FDB1 of the second level V2 is applied to the floating node FN1. At this time, the pixel voltage VOUT corresponding to the signal voltage SIG may be output to the column line CL through the driving transistor DX1.

The read-out circuit 150 may generate the image data by performing the correlation double sampling operation on the pixel voltage VOUT corresponding to the reset voltage in sections t309 to t310 and the pixel voltage VOUT corresponding to the signal voltage in sections t313 to t314.

Thereafter, at section t314, the boosting control signal FDB1 may be transitioned from the first level V1 to the second level V2.

In sections t314 to t315, the reset signal RG and the transmission signal TG may maintain the low level L, and the boosting control signal FDB1 may maintain the second level V2.

Figure 19:
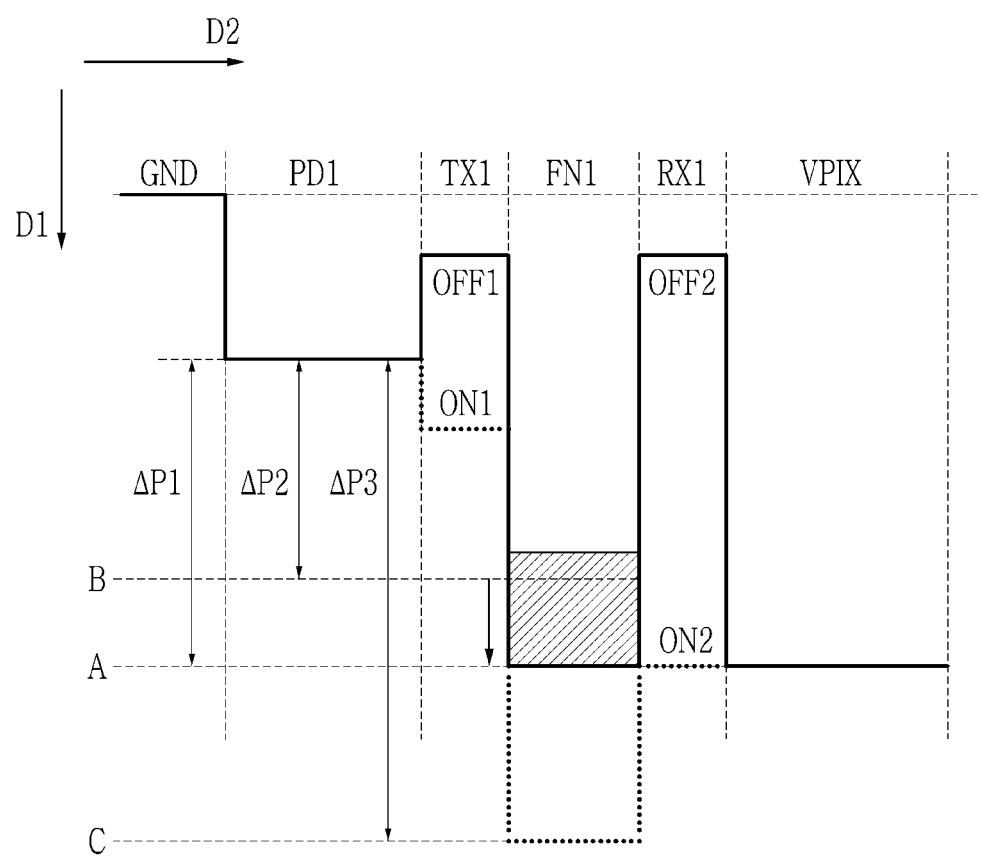

This is described together with reference to FIG. 19 showing the potential level of each channel region within the pixel PX1 in sections t314 to t315.

Referring to FIG. 19, as the boosting control signal FDB1 is transitioned to the second level V2, the floating node FN1 may have the potential A. Even if there is the change in the potential of the floating node FN1, the amount of the photo charge accumulated in the floating node FN1 may be maintained to be the same as the amount of the photo charge accumulated in the floating node FN1 in sections t312 to t313 and the amount of the photo charge accumulated in the floating node FN1 in sections t313 to t314.

In summary, by transitioning the boosting control signal FDB1 to the first level V1 in sections t309 to t310 that outputs the reset voltage and the sections t313 to t314 that outputs the signal voltage, it is possible to control the floating node FN1 to have a low potential. Accordingly, the reset voltage and the signal voltage when the boosting control signal FDB1 is used, may be lower than the reset voltage and the signal voltage when the boosting control signal FDB1 is not used. That is, by using the boosting control signal FDB1, the driving transistor DX1 may sample the pixel voltage VOUT within the lower operating range.

However, when transitioning the boosting control signal FDB1 to the first level V1, as the potential difference between the photoelectric element PD1 and the floating node FN1 is decreased, the photo charge transmission rate from the photoelectric element PD1 to the floating node FN1 may be reduced. Accordingly, the photo charge generated in the photoelectric element PD1 may not be transmitted to the floating node FN1. Therefore, when the photo charge generated by the photoelectric element PD1 is transmitted to the floating node FN1 through the transmission transistor TX1, by transitioning the boosting control signal FDB1 to the third level V3, by increasing the potential of the floating node FN1, it is possible to increase the photo charge transmission rate from the photoelectric element PD1 to the floating node FN1.

Figure 20:
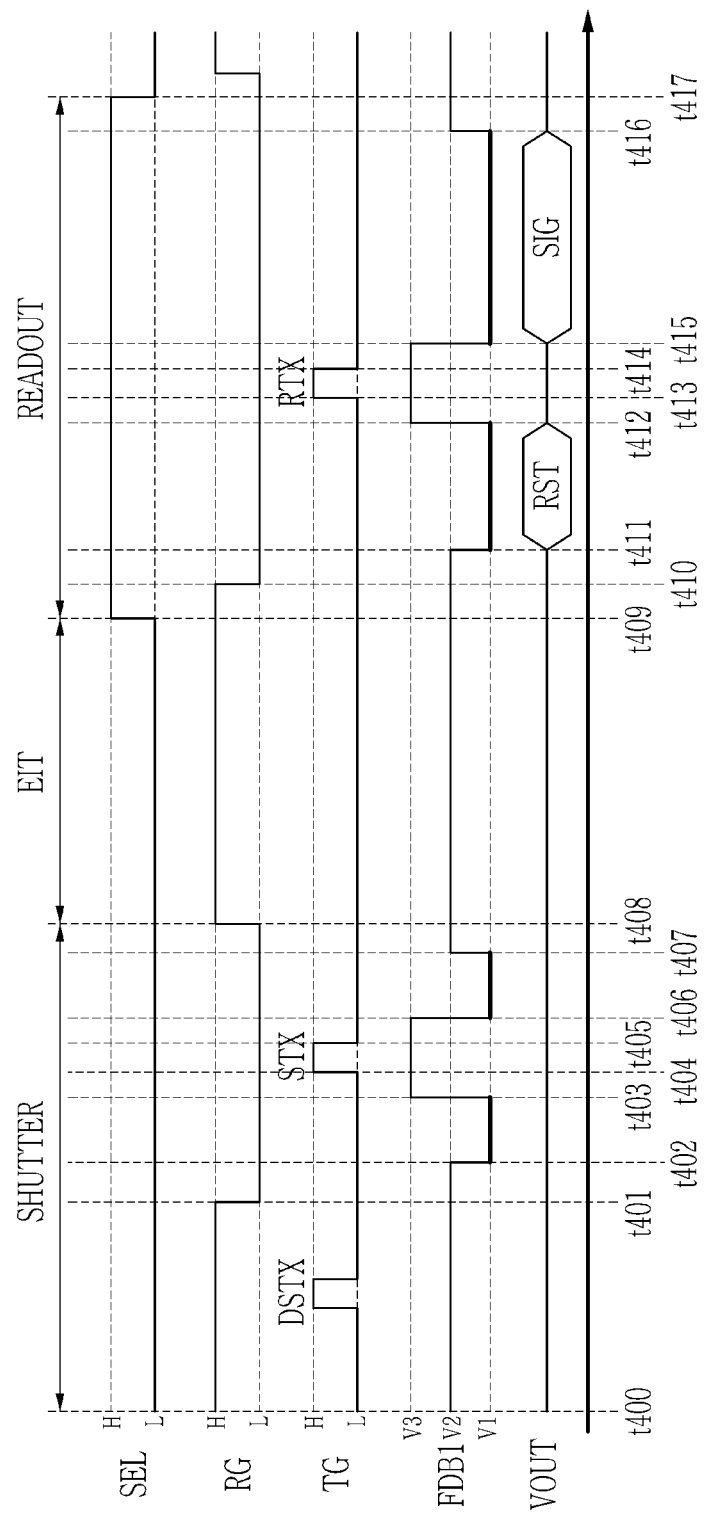
FIG. 20 is another timing diagram for explaining an operation of an image sensor according to an exemplary embodiment.

FIG. 20 is another timing diagram for explaining an operation of an image sensor according to an exemplary embodiment of the present invention.

FIG. 20 shows a scan section for driving a plurality of pixels by a row line unit. One scan section may include a shutter section SHUTTER (t400 to t408), a charge accumulation section EIT (t408 to t409), and a read-out section READOUT (t409 to t417).

On the other hand, in the charge accumulation section EIT and the read-out section READOUT of FIG. 20, the waveform of the selection signal SEL, the reset signal RG, the transmission signal TG, and the boosting control signal FDB1 is the same as the waveform of the selection signal SEL, the reset signal RG, the transmission signal TG, and the boosting control signal FDB1 in the charge accumulation section EIT and the read-out section READOUT shown in FIG. 11, so that the description in FIG. 11 may also be applied in FIG. 20.

In the shutter section SHUTTER, the charge accumulated in the floating node FN1 and the photoelectric element PD1 may be reset.

Specifically, in sections t400 to t401, the reset signal RG may maintain the high level H. The reset signal RG of the high level H may be applied to the gate of the reset transistor RX1, so that the reset transistor RX1 may be turned on. Accordingly, the power source voltage VPIX may be supplied to the floating node FN1.

In sections t400 to t401, the transmission signal TG may be transitioned to an arbitrary pulse DSTX form. When the transmission signal TG of the high level H is applied to the gate of the transmission transistor TX1, the transmission transistor TX1 may be turned on. Accordingly, the power source voltage VPIX may be supplied to the floating node FN1 and the photoelectric element PD1.

At section t401, the reset signal RG may be transitioned to the low level L. The reset signal RG of the low level L may be applied to the gate of the reset transistor RX1, so that the reset transistor RX1 may be turned off. Accordingly, the supply of the power source voltage VPIX to the floating node FN1 is cut off.

As described above, it is preferable that the photo charge transmission rate in the shutter section SHUTTER and the photo charge transmission rate in the read-out section READOUT are similar. Accordingly, the boosting control signal FDB1 may be operated so that the potential of the floating node FN1 of sections t411 to t413 before transferring the charge accumulated in the photoelectric element PD1 in the read-out section READOUT to the floating node FN1, and the potential of the floating node FN1 of sections t402 to t404 before transferring the charge accumulated in the photoelectric element PD1 in the shutter section to the floating node FN1 are the same. Also, the boosting control signal FDB1 may be operated so that the potential of the floating node FN1 of sections t414 to t416 after transferring the charge accumulated in the photoelectric element PD1 in the read-out section READOUT to the floating node FN1, and the potential of the floating node FN1 of sections t405 to t407 after transferring the charge accumulated in the photoelectric element PD1 in the shutter section to the floating node FN1, are the same.

Specifically, at section t402, the boosting control signal FDB1 may be transitioned from the second level V2 to the first level V1. Accordingly, the floating node FN1 may have a potential lower than the potential of the power source voltage VPIX.

At section t403, the boosting control signal FDB1 may be transitioned from the first level V1 to the third level V3. Accordingly, the floating node FN1 may have a potential higher than the potential of the power source voltage VPIX.

At section t404, the transmission signal TG may be transitioned to high level H in the form of the pulse STX. When the transmission signal TG of the high level H is applied to the gate of the transmission transistor TX1, the transmission transistor TX1 may be turned on. Accordingly, the charge accumulated in the photoelectric element PD1 may be transmitted to the floating node FN1.

At section t405, the transmission signal TG may be transitioned to the low level L.

Thereafter, at section t406, the boosting control signal FDB1 may be transitioned from the third level V3 to the first level V1.

Then, at section t407, the boosting control signal FDB1 may be transitioned from the first level V1 to the second level V2.

The charge accumulation section EIT is a section in which the charges are accumulated in the photoelectric element PD1.

The read-out section READOUT is a section in which the pixel voltage VOUT generated by the pixel PX1 is transmitted to the read-out circuit 150.

The image sensor 100 may read the pixel voltage by repeating the above-described scan section a plurality of times.

Figure 21:
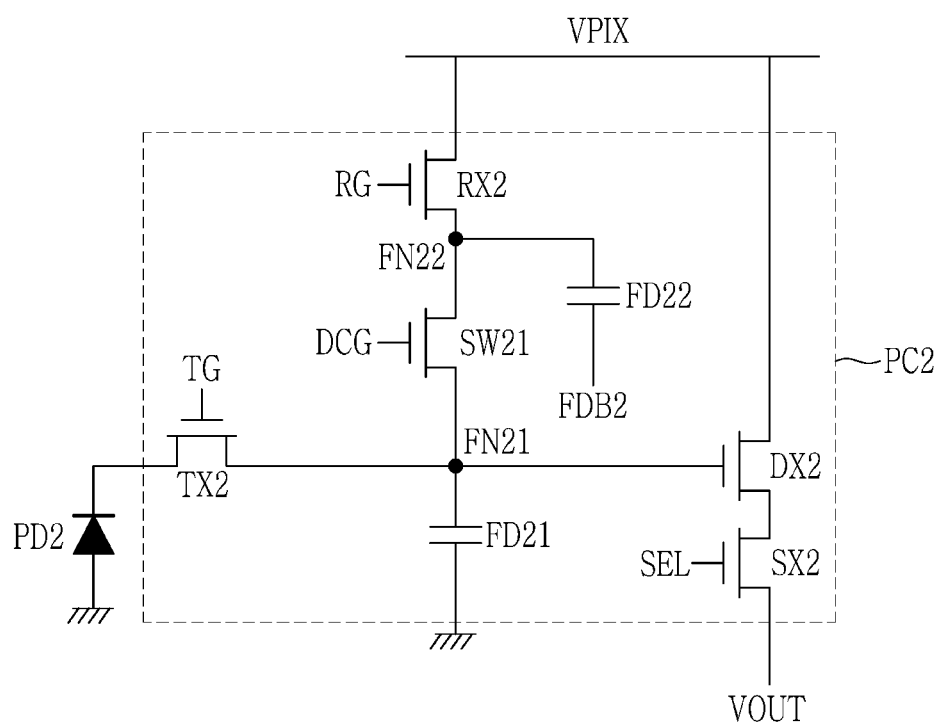
FIG. 21 is a circuit diagram of a pixel according to an exemplary embodiment.

FIG. 21 is a circuit diagram of a pixel according to an exemplary embodiment.

The pixel PX2 according to an exemplary embodiment may include a photoelectric element PD2 that generates a charge in response to light and a pixel circuit PC2 that outputs an electrical signal by processing the charge generated by the photoelectric element PD2.

The photoelectric element PD2 may react with light to generate electrons or holes as main charge carriers. The cathode of the photoelectric element PD2 may be connected to the floating node FN21 through the transmission transistor TX2, and the anode of the photoelectric element PD2 may be grounded.

The pixel circuit PC2 may include a first floating diffuser FD21, a second floating diffuser FD22, a reset transistor RX2, a switch transistor SW21, a driving transistor DX2, a selection transistor SX2, a transmission transistor TX2, and the like. The transistors RX2, SW21, DX2, SX2, and TX2 in the pixel circuit PC2 may operate in response to the control signals provided from row driver 130, for an example, a reset signal RG, a gain control signal DCG, a transmission signal TG, and a selection signal SEL. Each of the first floating diffuser FD21 and the second floating diffuser FD22 may have a predetermined capacitance and store the charge generated by the photoelectric element PD2.

The transmission transistor TX2 is connected between the photoelectric element PD2 and the floating node FN21, and may be controlled by the transmission signal TG. When the transmission transistor TX2 is turned on, the charge generated by the photoelectric element PD2 may be transmitted to the floating node FN21.

The voltage of the floating node FN21 may be determined according to the charge accumulated in the first floating diffuser FD21.

The gate of the driving transistor DX2 may be connected to the floating node FN21. The driving transistor DX2 may operate as a source-follower amplifier that outputs the voltage signal corresponding to the voltage of the floating node FN21. The driving transistor DX2 may output the pixel voltage VOUT to the column line CL through the selection transistor SX2 in response to the voltage of the floating node FN21.

The selection transistor SX2 may be connected between the driving transistor DX2 and the column line CL and be controlled by the selection signal SEL. When the selection transistor SX2 is turned on, the pixel voltage VOUT output from the driving transistor DX2 may be output to the read-out circuit (150 of FIG. 1) through the column line CL connected to the selection transistor SX2.

The switch transistor SW21 may be connected between the floating node FN21 and the floating node FN22 and be controlled by a gain control signal DCG.

When the switch transistor SW21 is turned off, the floating node FN21 has the capacitance of the first floating diffuser FD21. At this time, since the magnitude of the capacitance connected to the floating node FN21 is small, the image sensor 100 may generate the image signal in a high conversion gain (HCG) mode.

When the switch transistor SW21 is turned on, the second floating diffuser FD22 may be connected to the floating node FN21. Since the first floating diffuser FD21 and the second floating diffuser FD22 are connected to the floating node FN21, the capacitance of the floating node FN21 may be increased by the capacitance of the second floating diffuser FD22 compared to a time before the switch transistor SW21 is turned on. When the switch transistor SW21 is turned on, the image sensor 100 may generate the image signal by operating in a low conversion gain (LCG) mode, in which the amount of the charge that may be processed in the pixel is larger than in the HCG mode.

The reset transistor RX2 may be connected between the power source voltage line supplying the power source voltage VPIX and the floating node FN22 and be controlled by the reset signal RG. When the switch transistor SW21 is turned on and the reset transistor RX2 is turned on, the power source voltage VPIX may be transmitted to the floating node FN21 through the reset transistor RX2 to reset the floating node FN21. When the floating node FN21 is reset, the floating node FN21 may have a voltage or a potential lower or higher than the power source voltage VPIX. Hereinafter, when the floating node FN21 is reset, the voltage of the floating node FN21 is referred to as a reset voltage. The driving transistor DX2 may output the pixel voltage VOUT through the column line CL in response to the reset voltage of the floating node FN21. In addition, when the photo charge generated by the photoelectric element PD2 is stored in the floating node FN21, the voltage of the floating node FN21 is referred to as a signal voltage.

The boosting control signal FDB2 may be output to one end of the second floating diffuser FD22. The boosting control signal FDB2 may control the voltage applied to the floating node FN22.

Meanwhile, for better understanding and ease of description, it is assumed that the control signal high level H is an enable signal higher than the threshold voltage of the transistors RX2, DX2, SX2, TX2, and SW21 and the control signal low level L is a disable signal lower than the threshold voltage of the transistors RX2, DX2, SX2, TX2, and SW21.

In addition, in the following, the boosting control signal FDB2 may operate with a first level and a second level, or the boosting control signal FDB2 may operate with a first level, a second level, and a third level. Here, the second level may be a voltage greater than the first level, and the third level may be a voltage greater than the second level.

Figure 22:
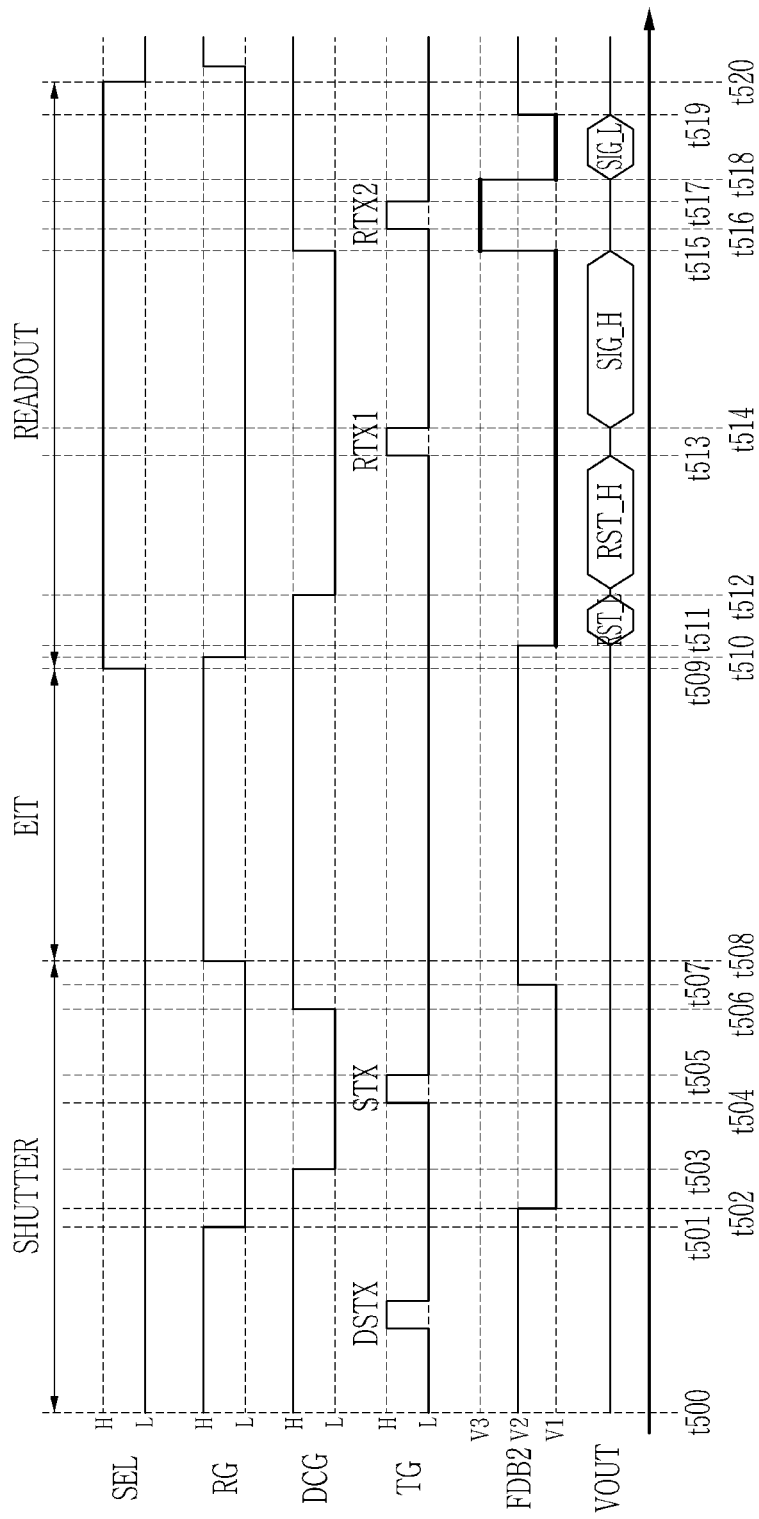
FIG. 22 is a timing diagram for explaining an operation of an image sensor according to FIG. 21.

FIG. 22 is a timing diagram for explaining an operation of an image sensor according to FIG. 21.

FIG. 22 shows the scan section for driving a plurality of pixels by a row line unit. One scan section may include a shutter section SHUTTER (t500 to t508), a charge accumulation section (Electron Integration Time, EIT) (t508 to t509), and a read-out section READOUT (t509 to t520).

In sections t500 to t501, the reset signal RG may maintain the high level H. At section t500, the reset signal RG of the high level H may be applied to the gate of the reset transistor RX2, so that the reset transistor RX2 may be turned on. In sections t500 to t501, the gain control signal DCG may also maintain the high level H. The gain control signal DCG of the high level H may be applied to the switch transistor SW21 to turn on the switch transistor SW21. Accordingly, the first floating diffuser FD21 and the second floating diffuser FD22 are connected to the floating node FN21, and the power source voltage VPIX may be supplied to the floating node FN21.

In sections t500 to t501, the transmission signal TG may be transitioned to an arbitrary pulse DSTX form. When the transmission signal TG of the high level H is applied to the gate of the transmission transistor TX2, the transmission transistor TX2 may be turned on. Accordingly, the power source voltage VPIX may be supplied to the floating node FN21 and the photoelectric element PD2.

At section t501, the reset signal RG may be transitioned to the low level L. The reset signal RG of the low level L may be applied to the gate of the reset transistor RX2, so that the reset transistor RX2 may be turned off. Accordingly, the supply of the power source voltage VPIX to the floating node FN21 and the floating node FN22 is cut off.

At section t502, the boosting control signal FDB2 may be transitioned from the second level V2 to the first level V1. The boosting control signal FDB2 may maintain the first level V1 from section t502 to section t507. Accordingly, the floating node FN21 may have a potential lower than the potential of the power source voltage VPIX.

At section t503, the gain control signal DCG may be transitioned to the low level L. Accordingly, only the first floating diffuser FD21 is connected to the floating node FN21.

At section t504, the transmission signal TG may be transitioned from the low level L to the high level H in an arbitrary pulse STX form. When the transmission signal TG of the high level H is applied to the gate of the transmission transistor TX2, the transmission transistor TX2 may be turned on. Accordingly, the charge accumulated in the photoelectric element PD2 may be transferred to the floating node FN21.

At section t505, the transmission signal TG may be transitioned from the high level H to the low level L.

At section t506, the gain control signal DCG may be transitioned to the high level H. Accordingly, the first floating diffuser FD21 and the second floating diffuser FD22 may be connected to the floating node FN21.

Thereafter, at section t507, the boosting control signal FDB2 may be transitioned from the first level V1 to the second level V2.

The photo charge generated by the photoelectric element PD2 may be transmitted to the floating node FN21 through the high level H transmission signal TG provided at least twice to the gate of the transmission transistor TX2 in the form of pulses DSTX and STX within the shutter section SHUTTER. The photo charge transmitted to the floating node FN21 may be removed through the power source voltage VPIX.

The charge accumulation section EIT is a section in which the charges are accumulated in the photoelectric element PD2.

In sections t508 to t509, the charge may be accumulated in the photoelectric element PD2 by the light incident on the pixel PX2.

At section t508, the reset signal RG may be transitioned from the low level L to the high level H.

In sections t508 to t509, the reset signal RG and the gain control signal DCG may maintain the high level H, and the boosting control signal FDB2 may maintain the second level V2. Accordingly, the first floating diffuser FD21 and the second floating diffuser FD22 may be connected to the floating node FN21, and the power source voltage VPIX may be supplied to the floating node FN21.

The read-out section READOUT is a section in which the pixel voltage VOUT generated by the pixel PX2 is transmitted to the read-out circuit 150.

First, at section t509, the selection signal SEL may be transitioned to high level H. It is applied to the gate of the selection transistor SX2 of the high level H so that the selection transistor SX2 may be turned on.

In sections t509 to t510, the reset signal RG and the gain control signal DCG may maintain the high level H, the boosting control signal FDB1 may maintain the second level V2, and the transmission signal TG may maintain the low level L.

At section t510, the reset signal RG may be transitioned from high level H to low level L. The reset signal RG of the low level L may be applied to the gate of the reset transistor RX2 to turn off the reset transistor RX2.

In sections t510 to t511, the gain control signal DCG may maintain the high level H, the reset signal RG and the transmission signal TG may maintain the low level L, and the boosting control signal FDB1 may maintain the second level V2.

In sections t510 to t511, since the first floating diffuser FD21 and the second floating diffuser FD22 are both connected to the floating node FN21, the pixel PX2 may operate in the LCG mode.

At section t511, the boosting control signal FDB2 may be transitioned to the first level V1.

In sections t511 to t512, the gain control signal DCG may maintain the high level H, the reset signal RG and the transmission signal TG may maintain the low level L, and the boosting control signal FDB2 may maintain the first level V1. Accordingly, the potential level of the floating node FN21 may be reduced more than the potential level of the power source voltage VPIX.

In sections t511 to t512, the voltage of the floating node FN21 may be a reset voltage of the pixel PX2 operating in the LCG mode. The potential of the floating node FN21 when the boosting control signal FDB1 of the first level V1 is applied may be lower than the potential of the floating node FN21 when the boosting control signal FDB1 of the second level V2 is applied. Accordingly, a lower voltage may be applied to the gate of the driving transistor DX2 than when the boosting control signal FDB1 of the second level V2 is applied. The pixel voltage VOUT corresponding to the LCG reset voltage RST_L may be output to the column line CL through the driving transistor DX2.

Thereafter, at section t512, the gain control signal DCG may be transitioned to the low level L.

In sections t512 to t513, the gain control signal DCG, the reset signal RG, and the transmission signal TG may maintain the low level L, and the boosting control signal FDB1 may maintain the first level V1. Since only the first floating diffuser FD21 is connected to the floating node FN21, the pixel PX2 may operate in the HCG mode.

In sections t512 to t513, the voltage of the floating node FN21 may be a reset voltage of the pixel PX2 operating in the HCG mode. The pixel voltage VOUT corresponding to the HCG reset voltage RST_H may be output to the column line CL through the driving transistor DX2.

At section t513, the transmission signal TG may be transitioned in the form of the pulse RTX1.

In sections t513 to t514, the reset signal RG and the gain control signal DCG may maintain the low level L, the transmission signal TG may maintain the high level H, and the boosting control signal FDB1 may maintain the first level V1.

Since the transmission transistor TX2 is turned on, the photo charge generated in the photoelectric element PD2 may be transmitted to the floating node FN21. At this time, since the switch transistor SW21 is turned off, all photo charges generated in the photoelectric element PD2 may be accumulated in the first floating diffuser FD21.

At the section t514, the transmission signal TG may be transitioned to low level L.

In sections t514 to t515, the reset signal RG, the gain control signal DCG, and the transmission signal TG may maintain the low level L, and the boosting control signal FDB1 may maintain the first level V1.

In sections t514 to t515, the voltage of the floating node FN21 may be the signal voltage of the pixel PX2 operating in the HCG mode. The pixel voltage VOUT corresponding to the signal voltage SIG_H may be output to the column line CL through the driving transistor DX2.

In sections t514 to t515, the floating node FN21 has the potential level boosted by the boosting control signal FDB2 at section t511.

When the boosting control signal FDB1 has the first level V1, the photo charge transmission rate of the floating node FN21 from the photoelectric element PD2 may be lower than the photo charge transmission rate of the floating node FN21 from the photoelectric element PD2 when the boosting control signal FDB1 has the second level V2. Accordingly, most of the photo charge generated by the photoelectric element PD2 may not be transmitted to the floating node FN21. Meanwhile, in sections t514 to t515, the switch transistor SW21 is turned off, so the boosting control signal FDB2 may not affect the potential level of the floating node FN21.

At section t515, the gain control signal DCG may be transitioned to the high level H.

In sections t515 to t516, the reset signal RG and the transmission signal TG may maintain the low level L, the gain control signal DCG may maintain the high level H, and the boosting control signal FDB1 may maintain the first level V1. Since both the first floating diffuser FD21 and the second floating diffuser FD22 are connected to the floating node FN21, the pixel PX2 may operate in the LCG mode.

At section t516, the transmission signal TG may be transitioned to the high level H in the form of the pulse RTX2.

In sections t516 to t517, the reset signal RG may maintain the low level L, the gain control signal DCG and the transmission signal TG may maintain the high level H, and the boosting control signal FDB1 may maintain the first level V1.

Since the transmission transistor TX2 and the switch transistor SW21 are turned on, the photo charge generated by the photoelectric element PD2 may be accumulated in the floating node FN21 and the floating node FN22.

At section t517, the transmission signal TG may be transitioned to the low level L.

In sections t517 to t518, the reset signal RG and the transmission signal TG may maintain the low level L, the gain control signal DCG may maintain the high level H, and the boosting control signal FDB1 may maintain the third level V3.

At section t518, the boosting control signal FDB2 may be transitioned from the third level V3 to the first level V1.

In sections t518 to t519, the reset signal RG and the transmission signal TG may maintain the low level L, the gain control signal DCG may maintain the high level H, and the boosting control signal FDB1 may maintain the first level V1.

In sections t518 to t519, the voltage of the floating node FN21 may be the signal voltage of the pixel PX2 operating in the LCG mode. The pixel voltage VOUT corresponding to the signal voltage SIG_L may be output to the column line CL through the driving transistor DX2.

At section t519, the boosting control signal FDB2 may be transitioned from the first level V1 to the second level V2.

At section t520, the selection signal SEL may be transitioned from the high level H to the low level L.

The image sensor 100 may read the pixel voltage by repeating the above-described scan section a plurality of times.

In the shutter section SHUTTER, the waveform of the boosting control signal FDB2 is not limited to the waveform shown in FIG. 22, and the boosting control signal FDB1 may be maintained as the second level V2 without changing to the first level V1 and may have any suitable waveform to have the photo charge transmission amount similar to the photo charge transmission amount from the photoelectric element PD2 to the floating node FN21 in the read-out section READOUT.

Figure 23:
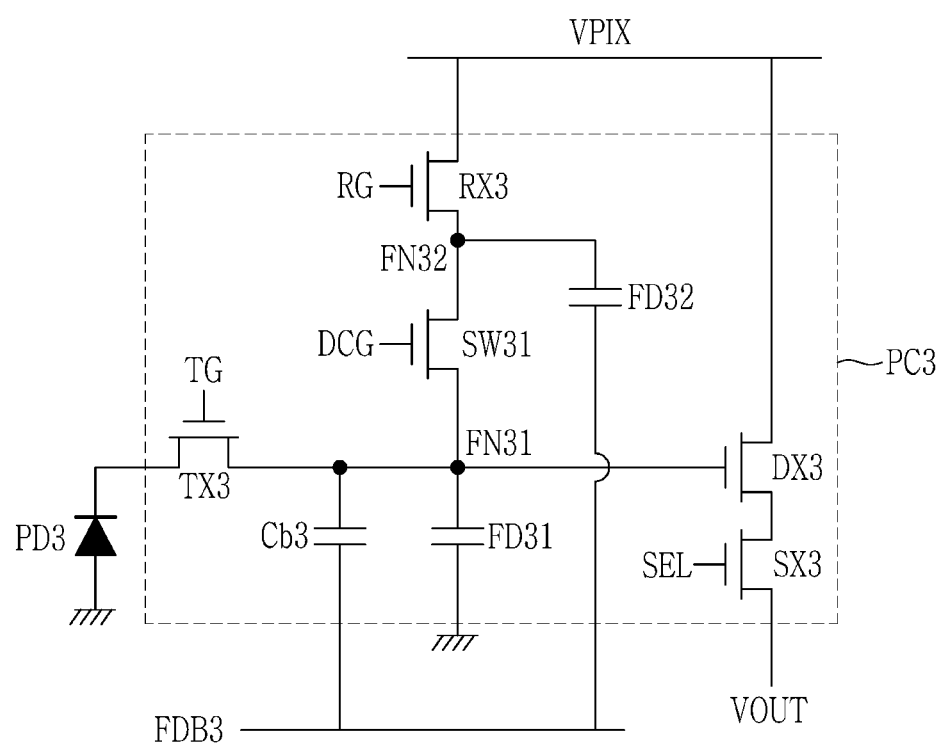
FIG. 23 is a circuit diagram of a pixel according to an exemplary embodiment.

FIG. 23 is a circuit diagram of a pixel according to an exemplary embodiment.

The pixel PX3 according to an exemplary embodiment may include a photoelectric element PD3 that generates a charge in response to light and a pixel circuit PC3 that outputs an electrical signal by processing the charge generated by the photoelectric element PD3.

The photoelectric element PD3 may react with light to generate electrons or holes as main charge carriers. The cathode of the photoelectric element PD3 may be connected to the floating node FN31 through the transmission transistor TX3, and the anode of the photoelectric element PD3 may be grounded.

The pixel circuit PC3 may include a first floating diffuser FD31, a second floating diffuser FD32, a reset transistor RX3, a switch transistor SW31, a driving transistor DX3, a selection transistor SX3, a transmission transistor TX3, and the like. The transistors RX3, SW31, DX3, SX3, and TX3 in the pixel circuit PC3 may operate in response to the control signals provided from a row driver 130, for example a reset signal RG, a gain control signal DCG, a transmission signal TG, and a selection signal SEL. Each of the first floating diffuser FD31 and the second floating diffuser FD32 has a predetermined capacitance and may store the charge generated by the photoelectric element PD3.

The transmission transistor TX3 may be connected between the photoelectric element PD3 and the floating node FN31 be and controlled by the transmission signal TG. When the transmission transistor TX3 is turned on, the charge generated by the photoelectric element PD3 may be transmitted to the floating node FN31.

The first floating diffuser FD31 and the second floating diffuser FD32 may accumulate the charge corresponding to the reset voltage or the charge corresponding to the signal voltage, so the first floating diffuser FD31 and the second floating diffuser FD32 may be modeled as a kind of capacitor with an arbitrary capacitances, respectively. The boosting capacitor Cb3 may be connected to the floating node FN31. The boosting control signal FDB3 may be output to one electrode of the boosting capacitor Cb3 and one terminal of the second floating diffuser FD32. The boosting control signal FDB3 may control the voltage applied to the floating node FN31 and the floating node FN32.

The voltage of the floating node FN31 may be determined according to the charge accumulated in the first floating diffuser FD31.

The switch transistor SW31 may be connected between the floating node FN31 and the floating node FN32 and be controlled by a gain control signal DCG.

When the switch transistor SW31 is turned off, the floating node FN31 has the capacitance of the first floating diffuser FD31. At this time, since the magnitude of the capacitance connected to the floating node FN31 is small, the image sensor 100 may generate the image signal in the HCG mode.

When the switch transistor SW31 is turned on, the second floating diffuser FD32 may be connected to the floating node FN31. Since the first floating diffuser FD31 and the second floating diffuser FD32 are coupled in parallel in the floating node FN31, the capacitance of the floating node FN31 may be increased by the capacitance of the second floating diffuser FD32 compared to a time before the switch transistor SW31 is turned on. At this time, since the magnitude of the capacitance connected to the floating node FN31 is larger than at a time before the switch transistor SW31 is turned on, the image sensor 100 may operate in the LCG mode with the larger amount of charge that may be processed in the pixel compared to the HCG mode to generate the image signal.

The gate of the driving transistor DX3 may be connected to the floating node FN31. The driving transistor DX3 may operate as a source-follower amplifier that outputs a voltage signal corresponding to the voltage of the floating node FN31. The driving transistor DX3 may output the pixel voltage VOUT to the column line CL through the selection transistor SX3 in response to the voltage of the floating node FN31.

The selection transistor SX3 may be connected between the driving transistor DX3 and the column line CL and controlled by the selection signal SEL. When the selection transistor SX3 is turned on, the pixel voltage VOUT output from the driving transistor DX3 may be output to the read-out circuit (150 in FIG. 1) through the column line CL connected to the selection transistor SX3.

The reset transistor RX3 may be connected between the power source voltage line supplying the power source voltage VPIX and the floating node FN32 and controlled by the reset signal RG. When the switch transistor SW31 is turned on and the reset transistor RX3 is turned on, the power source voltage VPIX may be transmitted to the floating node FN31 through the reset transistor RX3 so that the floating node FN31 may be reset. When the floating node FN31 is reset, the floating node FN31 may have a voltage of a potential lower or higher than the power source voltage VPIX.

Hereinafter, when the floating node FN31 is reset, the voltage of floating node FN31 is referred to as a reset voltage. The driving transistor DX3 may output the pixel voltage VOUT through the column line CL in response to the reset voltage of the floating node FN31. In addition, when the photo charge generated by the photoelectric element PD3 is stored in the floating node FN31, the voltage of the floating node FN31 is referred to as a signal voltage.

Meanwhile, for better understanding and ease of description, it is assumed that the control signal high level H is an enable signal higher than the threshold voltage of the transistors RX3, DX3, SX3, TX3, and SW31, and the control signal low level L is a disable signal lower than the threshold voltage of the transistors RX3, DX3, SX3, TX3, and SW31.

In addition, in the following, the boosting control signal FDB3 may operate with a first level and a second level, or the boosting control signal FDB3 may operate with a first level, a second level, and a third level. Here, the second level may be a voltage greater than the first level, and the third level may be a voltage greater than the second level.

Figure 24:
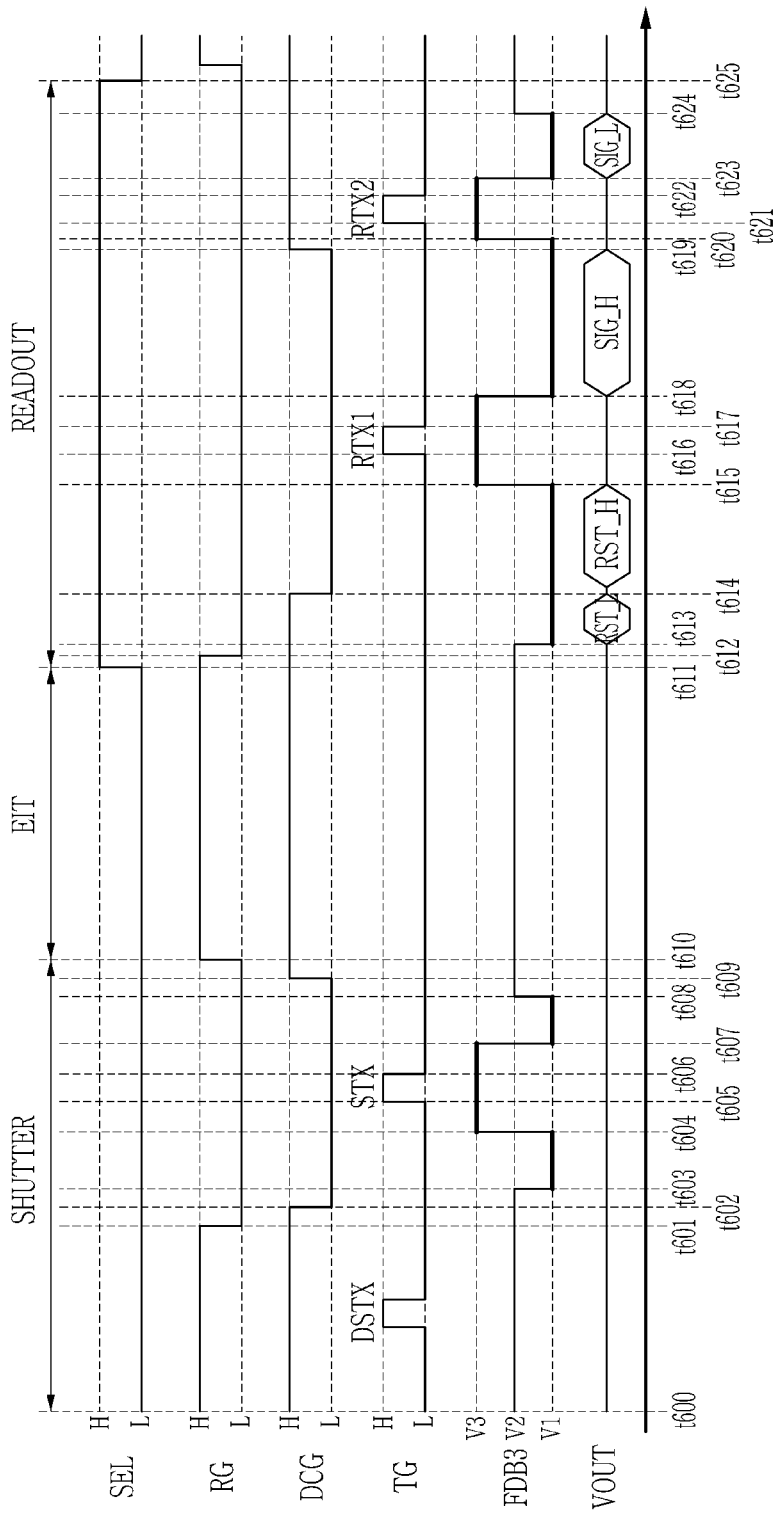
FIG. 24 is a timing diagram for explaining an operation of an image sensor according to FIG. 23.

FIG. 24 is a timing diagram for explaining an operation of an image sensor according to FIG. 23.

FIG. 24 shows the scan section for driving a plurality of pixels by a row line unit. One scan section may include a shutter section SHUTTER (t600 to t610), a charge accumulation section (Electron Integration Time, EIT) (t610 to t611), and a read-out section READOUT (t611 to t625).

In sections t600 to t601, the reset signal RG may maintain the high level H. At section t600, the reset signal RG of the high level H may be applied to the gate of the reset transistor RX3, so that the reset transistor RX3 may be turned on. In sections t600 to t601, the gain control signal DCG may also maintain high level H. The gain control signal DCG of the high level H may be applied to the switch transistor SW31, so that the switch transistor SW31 may be turned on. Accordingly, the first floating diffuser FD31 and the second floating diffuser FD32 may be connected to the floating node FN31, and the power source voltage VPIX may be supplied to the floating node FN31.

In sections t600 to t601, the transmission signal TG may be transitioned to an arbitrary pulse DSTX form. When the transmission signal TG of the high level H is applied to the gate of the transmission transistor TX3, the transmission transistor TX3 may be turned on. Accordingly, the power source voltage VPIX may be supplied to the floating node FN31 and the photoelectric element PD3.

At section t601, the reset signal RG may be transitioned to the low level L. The reset signal RG of the low level L may be applied to the gate of the reset transistor RX3, so that the reset transistor RX3 may be turned off. Accordingly, the supply of the power source voltage VPIX to the floating node FN31 and the floating node FN32 is cut off.

At section t602, the gain control signal DCG may be transitioned to the low level L. Accordingly, only the first floating diffuser FD31 is connected to the floating node FN31.

At section t603, the boosting control signal FDB3 may be transitioned from the second level V2 to the first level V1. Accordingly, the floating node FN31 may have a potential lower than the potential of the power source voltage VPIX.

At section t604, the boosting control signal FDB3 may be transitioned from the first level V1 to the third level V3. The boosting control signal FDB3 may maintain the third level V3 from section t604 to the section t607. Accordingly, the floating node FN31 may have a potential higher than the potential of the power source voltage VPIX.

At section t605, the transmission signal TG may be transitioned from the low level L to the high level H in an arbitrary pulse STX form. When the transmission signal TG of the high level H is applied to the gate of the transmission transistor TX3, the transmission transistor TX3 may be turned on. Accordingly, the charge accumulated in the photoelectric element PD3 may be transferred to the floating node FN31.

At section t606, the transmission signal TG may be transitioned from the high level H to the low level L.

At section t607, the boosting control signal FDB3 may be transitioned from the third level V3 to the first level V1. Accordingly, the floating node FN31 may have a potential lower than the potential of the power source voltage VPIX.

Thereafter, at section t608, the boosting control signal FDB3 may be transitioned from the first level V1 to the second level V2.

Then, at section t609, the gain control signal DCG may be transitioned to the high level H. Accordingly, the first floating diffuser FD31 and the second floating diffuser FD32 may be connected to the floating node FN31.

At section t610, the reset signal RG may be transitioned to the high level H.

The charge accumulation section EIT is a section in which the charges are accumulated in the photoelectric element PD3.

In sections t610 to t611, the charge may be accumulated in the photoelectric element PD3 by the light incident on the pixel PX3.

In sections t610 to t611, the reset signal RG and the gain control signal DCG may maintain the high level H, and the boosting control signal FDB3 may maintain the second level V2. Accordingly, the first floating diffuser FD31 and the second floating diffuser FD32 are connected to the floating node FN31, and the power source voltage VPIX may be supplied to the floating node FN31.

The read-out section READOUT is a section in which the pixel voltage VOUT generated by the pixel PX3 is transmitted to the read-out circuit 150.

First, at section t611, the selection signal SEL may be transitioned to the high level H. It is applied to the gate of the selection transistor SX3 of the high level H so that the selection transistor SX3 may be turned on.

In sections t611 to t612, the reset signal RG and the gain control signal DCG may maintain the high level H, the boosting control signal FDB1 may maintain the second level V2, and the transmission signal TG may maintain the low level L.

At section t612, the reset signal RG may be transitioned from the high level H to the low level L. The reset signal RG of the low level L may be applied to the gate of the reset transistor RX3 to turn off the reset transistor RX3.

In sections t612 to t613, the gain control signal DCG may maintain the high level H, the reset signal RG and the transmission signal TG may maintain the low level L, and the boosting control signal FDB3 may maintain the second level V2.

In sections t612 to t613, since the first floating diffuser FD31 and the second floating diffuser FD32 are both connected to the floating node FN31, the pixel PX3 may operate in the LCG mode.

At section t613, the boosting control signal FDB3 may be transitioned to the first level V1.

In sections t613 to t614, the gain control signal DCG may maintain the high level H, the reset signal RG and the transmission signal TG may maintain the low level L, and the boosting control signal FDB3 may maintain the first level V1. Accordingly, the potential level of the floating node FN31 may be reduced more than the potential level of the power source voltage VPIX.

In sections t613 to t614, the voltage of the floating node FN31 may be a reset voltage of the pixel PX3 operating in the LCG mode. The potential of the floating node FN31 when the boosting control signal FDB3 of the first level V1 is applied may be lower than the potential of the floating node FN31 when the boosting control signal FDB3 of the second level V2 is applied. Accordingly, a lower voltage may be applied to the gate of the driving transistor DX3 than when the boosting control signal FDB3 of the second level V2 is applied. The pixel voltage VOUT corresponding to the LCG reset voltage RST_L may be output to the column line CL through the driving transistor DX3.

Thereafter, at section t614, the gain control signal DCG may be transitioned to the low level L.

In sections t614 to t615, the gain control signal DCG, the reset signal RG, and the transmission signal TG may maintain the low level L, and the boosting control signal FDB3 may maintain the first level V1. Since only the first floating diffuser FD31 is connected to the floating node FN31, the pixel PX3 may operate in the HCG mode.

In sections t614 to t615, the voltage of the floating node FN31 may be the reset voltage of the pixel PX3 operating in the HCG mode. The pixel voltage VOUT corresponding to the HCG reset voltage RST_H may be output to the column line CL through the driving transistor DX3.

At section t615, the boosting control signal FDB3 may be transitioned from the first level V1 to the third level V3. Accordingly, the potential level of the floating node FN31 may increase more than the potential level of the power source voltage VPIX.

In sections t615 to t616, the reset signal RG, the gain control signal DCG, and the transmission signal TG may maintain the low level L, and the boosting control signal FDB1 may maintain the third level V3.

At section t616, the transmission signal TG may be transitioned in the form of the pulse RTX1.

In sections t616 to t617, the reset signal RG and the gain control signal DCG may maintain the low level L, the transmission signal TG may maintain the high level H, and the boosting control signal FDB1 may maintain the third level V3.

Since the transmission transistor TX3 is turned on, the photo charge generated by the photoelectric element PD3 may be transmitted to the floating node FN31. At this time, since the switch transistor SW31 is turned off, all photo charges generated by the photoelectric element PD3 may be accumulated in the first floating diffuser FD31.

In addition, since the boosting control signal FDB3 has the third level V3, the potential level of the floating node FN31 may be increased more than the potential level of the power source voltage VPIX. The photo charge transmission rate of the floating node FN31 from the photoelectric element PD3 when the boosting control signal FDB3 has the third level V3 may be higher than the photo charge transmission rate of the floating node FN31 from the photoelectric element PD3 when the boosting control signal FDB3 has the second level V2. Accordingly, most of the photo charge generated by the photoelectric element PD3 can be transferred to the floating node FN31.

At section t617, the transmission signal TG may be transitioned to low level L.

In sections t617 to t618, the reset signal RG, the gain control signal DCG, and the transmission signal TG may maintain the low level L, and boosting control signal FDB1 may maintain the third level V3.

At section t618, the boosting control signal FDB3 may be transitioned from the third level V3 to the first level V1.

In sections t618 to t619, the voltage of the floating node FN31 may be the signal voltage of the pixel PX3 operating in the HCG mode. The pixel voltage VOUT corresponding to the signal voltage SIG_H may be output to the column line CL through the driving transistor DX3.

At section t619, the gain control signal DCG may be transitioned to the high level H.

In sections t619 to t620, the reset signal RG and the transmission signal RG may maintain the low level L, the gain control signal DCG may maintain the high level H, and the boosting control signal FDB3 may maintain the first level V1. Since both the first floating diffuser FD31 and the second floating diffuser FD32 are connected to the floating node FN31, the pixel PX3 may operate in the LCG mode.

At section t620, the boosting control signal FDB3 may be transitioned from the first level V1 to the third level V3.

At section t621, the transmission signal TG may be transitioned in the form of the pulse RTX2.

In sections t621 to t622, the reset signal RG may maintain the low level L, the gain control signal DCG and the transmission signal TG may maintain the high level H, and the boosting control signal FDB3 may maintain the third level V3.

Since the transmission transistor TX3 and the switch transistor SW31 are turned on, the photo charge generated in the photoelectric element PD3 may be accumulated in the first floating diffuser FD31 and the second floating diffuser FD32.

At section t622, the transmission signal TG may be transitioned to the low level L.

In sections t622 to t623, the reset signal RG and the transmission signal TG may maintain the low level L, the gain control signal DCG may maintain the high level H, and the boosting control signal FDB3 may maintain the third level V3.

At sections t623, the boosting control signal FDB3 may be transitioned from the third level V3 to the first level V1.

In sections t623 to t624, the voltage of the floating node FN31 may be the signal voltage of the pixel PX3 operating in the LCG mode. The pixel voltage VOUT corresponding to the signal voltage SIG_L may be output to the column line CL through the driving transistor DX3.

At section t624, the boosting control signal FDB3 may be transitioned from the first level V1 to the second level V2.

At section t625, the selection signal SEL may be transitioned from the high level H to the low level L.

In the image sensor according to FIG. 23 and FIG. 24, as the boosting control signal FDB3 is connected to both the boosting capacitor Cb3 and the second floating diffuser FD32, even when the floating node FN32 is not connected to the floating node FN31 (when operating as the HCG), the photo charge transmission rate from the photoelectric element PD3 to the floating node FN31 may be increased when the reset voltage or the signal voltage is read.

In the shutter section SHUTTER, the waveform of the boosting control signal FDB3 is not limited to the waveform shown in FIG. 24 and may have any suitable waveform to have the photo charge transfer amount similar to the photo charge transfer amount from the photoelectric element PD3 to the floating node FN31 in the read-out section READ-OUT.

Figure 25:
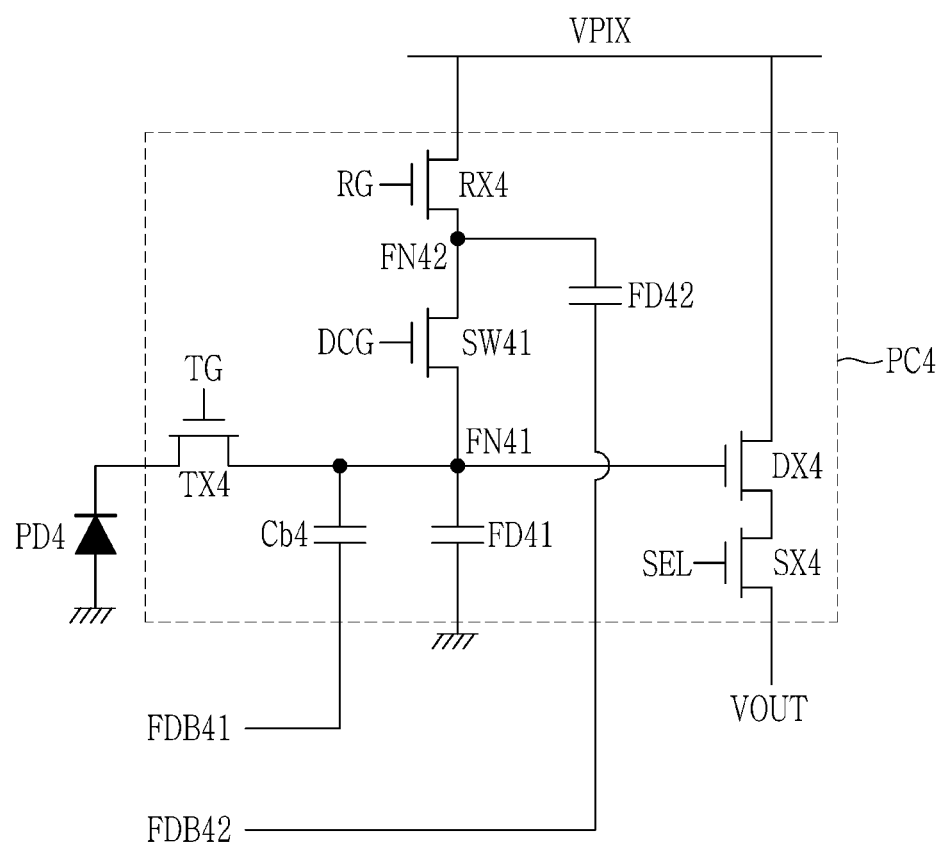
FIG. 25 is a circuit diagram of a pixel according to an exemplary embodiment.

FIG. 25 is a circuit diagram of a pixel according to an exemplary embodiment.

The pixel PX4 according to an exemplary embodiment may include a photoelectric element PD4 that generates a charge in response to light and a pixel circuit PC4 that processes the charge generated by the photoelectric element PD4 and outputs an electrical signal.

The photoelectric element PD4 may react with light to generate electrons or holes as main charge carriers. The cathode of the photoelectric element PD4 may be connected to the floating node FN41 through the transmission transistor TX4, and the anode of the photoelectric element PD4 may be grounded.

The pixel circuit PC4 may include a first floating diffuser FD41, a second floating diffuser FD42, a reset transistor RX4, a switch transistor SW41, a driving transistor DX4, a selection transistor SX4, and a transmission transistor TX4. The transistors RX4, SW41, DX4, SX4, and TX4 in the pixel circuit PC4 may operate in response to the control signals provided from a row driver 130, for example a reset signal RG, a gain control signal DCG, a transmission signal TG, and a selection signal SEL. Each of the first floating diffuser FD41 and the second floating diffuser FD42 has a predetermined capacitance and can store the charge generated by the photoelectric element PD4.

The transmission transistor TX4 is connected between the photoelectric element PD4 and the floating node FN41, and may be controlled by the transmission signal TG. When the transmission transistor TX4 is turned on, the charge generated by the photoelectric element PD4 can be transferred to the floating node FN41.

Since the charge corresponding to the reset voltage or the charge corresponding to the signal voltage may be accumulated in the first floating diffuser FD41 and the second floating diffuser FD42, the first floating diffuser FD41 and the second floating diffuser FD42 may be modeled as a kind of capacitor with arbitrary capacitances, respectively. The boosting capacitor Cb4 may be connected to the floating node FN1. The boosting control signal FDB41 may be output to one electrode of the boosting capacitor Cb4. The boosting control signal FDB41 may control the voltage applied to the floating node FN41. The boosting control signal FDB42 may be output to one terminal of the second floating diffuser FD42. The boosting control signal FDB42 may control the voltage applied to the floating node FN42.

The voltage of the floating node FN41 may be determined according to the charge accumulated in the first floating diffuser FD41.

The switch transistor SW41 may be connected between the floating node FN41 and the floating node FN42 and controlled by a gain control signal DCG.

When the switch transistor SW41 is turned off, the floating node FN41 has the capacitance of the first floating diffuser FD41. At this time, since the magnitude of the capacitance connected to the floating node FN41 is small, the image sensor 100 may generate the image signal in HCG mode.

When the switch transistor SW41 is turned on, the second floating diffuser FD42 may be connected to the floating node FN41. Since the first floating diffuser FD41 and the second floating diffuser FD42 are coupled in parallel in the floating node FN41, the capacitance of the floating node FN41 may be increased by the capacitance of the second floating diffuser FD42 compared to a time before the switch transistor SW41 is turned on. At this time, since the magnitude of the capacitance connected to the floating node FN41 is larger than at a time before the switch transistor SW41 is turned on, the image sensor 100 may operate in the LCG mode with the larger amount of charge that may be processed in the pixel compared to the HCG mode to generate the image signal.

The gate of the driving transistor DX4 may be connected to the floating node FN41. The driving transistor DX4 may operate as a source-follower amplifier that outputs a voltage signal corresponding to the voltage of the floating node FN41. The driving transistor DX4 may output the pixel voltage VOUT to the column line CL through the selection transistor SX4 in response to the voltage of the floating node FN41.

The selection transistor SX4 may be connected between the driving transistor DX4 and the column line CL and controlled by the selection signal SEL. When the selection transistor SX4 is turned on, the pixel voltage VOUT output from the driving transistor DX4 may be output to the read-out circuit (150 in FIG. 1) through the column line CL connected to the selection transistor SX4.

The reset transistor RX4 may be connected between the power source voltage line supplying the power source voltage VPIX and the floating node FN42, and controlled by the reset signal RG. When the switch transistor SW41 is turned on and the reset transistor RX4 is turned on, the power source voltage VPIX may be transmitted to the floating node FN41 through the reset transistor RX4 so that the floating node FN41 may be reset. When the floating node FN41 is reset, the floating node FN41 may have the voltage of the potential lower or higher than the power source voltage VPIX.

Hereinafter, when the floating node FN41 is reset, the voltage of the floating node FN41 is referred to as a reset voltage. The driving transistor DX4 may output the pixel voltage VOUT through the column line CL in response to the reset voltage of the floating node FN41. In addition, when the photo charge generated by the photoelectric element PD4 is stored in the floating node FN41, the voltage of the floating node FN41 is referred to as a signal voltage.

Meanwhile, for better understanding and ease of description, it is assumed that the control signal high level H is an enable signal higher than the threshold voltage of the transistors RX4, DX4, SX4, TX4, and SW41 and the control signal low level L is a disable signal lower than the threshold voltage of the transistors RX4, DX4, SX4, TX4, and SW41.

In addition, in the following, the boosting control signals FDB41 and FDB42 may operate with the first level and the second level, or the boosting control signals FDB41 and FDB42 may operate with the first level, the second level, and the third level. Here, the second level may be a voltage greater than the first level, and the third level may be a voltage greater than the second level.

Figure 26:
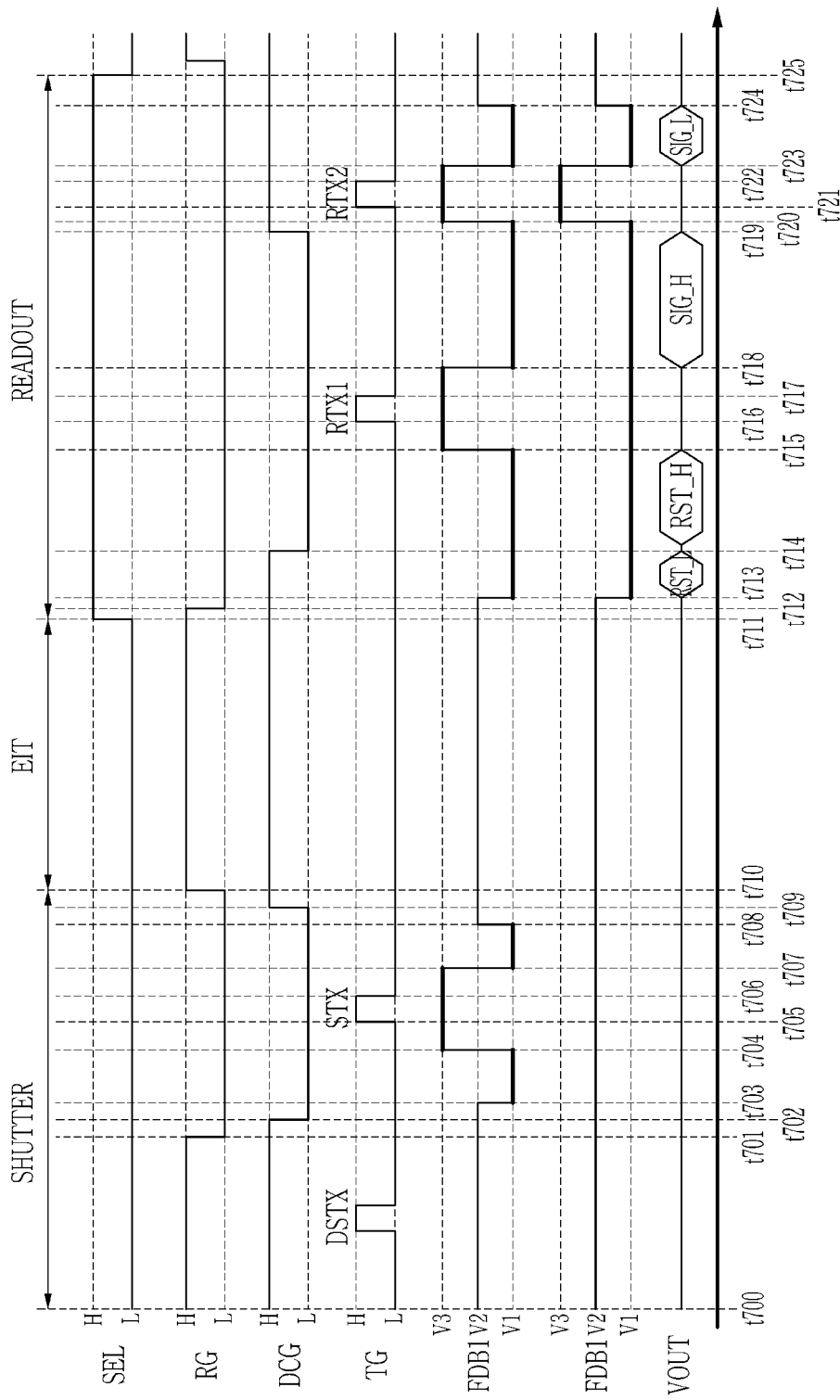
FIG. 26 is a timing diagram for explaining an operation of an image sensor according to FIG. 25.

FIG. 26 is a timing diagram for explaining an operation of an image sensor according to FIG. 25.

FIG. 26 shows a scan section for driving a plurality of pixels with a row line unit. One scan section may include a shutter section SHUTTER (t700 to t710), a charge accumulation section EIT (t710 to t711), and a read-out section READOUT (t711 to t725).

On the other hand, the waveforms of the selection signal SEL, the reset signal RG, the transmission signal TG, the gain control signal DCG, and the boosting control signal FDB41 in the shutter section SHUTTER and the charge accumulation section EIT of FIG. 26 are the same as the waveforms of the selection signal SEL, the reset signal RG, the transmission signal TG, the gain control signal DCG, and the boosting control signal FDB3 in the shutter section SHUTTER and the charge accumulation section EIT shown in FIG. 24 so that the description in FIG. 24 may also be applied to FIG. 26.

In the aforementioned FIG. 23 and FIG. 24, the voltage applied to the floating node FN31 was controlled using only one boosting control signal FDB3 connected to the floating node FN31. However, in FIG. 25 and FIG. 26, the voltage applied to the floating node FN41 may be controlled by simultaneously using the boosting control signal FDB41 and the boosting control signal FDB42.

The read-out section READOUT is a section in which the pixel voltage VOUT generated by the pixel PX4 is transmitted to the read-out circuit 150.

First, at section t711, the selection signal SEL may be transitioned to high level H. It is applied to the gate of the selection transistor SX4 of the high level H so that the selection transistor SX4 may be turned on.

In sections t711 to t712, the reset signal RG and the gain control signal DCG may maintain the high level H, the boosting control signal FDB41 and the boosting control signal FDB42 may maintain the second level V2, and the transmission signal TG may maintain the low level L.

At section t712, the reset signal RG may be transitioned from the high level H to the low level L. The reset signal RG of the low level L may be applied to the gate of the reset transistor RX3 to turn off the reset transistor RX4.

In sections t712 to t713, the gain control signal DCG may maintain the high level H, the reset signal RG and the transmission signal TG may maintain the low level L, and the boosting control signal FDB41 and the boosting control signal FDB42 may maintain the second level V2.

In sections t712 to t713, since the first floating diffuser FD41 and the second floating diffuser FD42 are both connected to the floating node FN41, the pixel PX4 may operate in the LCG mode.

At section t713, the boosting control signal FDB41 and the boosting control signal FDB42 may be transitioned to the first level V1.

In sections t713 to t714, the gain control signal DCG may maintain the high level H, the reset signal RG and the transmission signal TG may maintain the low level L, and the boosting control signal FDB41 and boosting control signal FDB42 may maintain the first level V1. Accordingly, the potential level of the floating node FN41 may be reduced more than the potential level of the power source voltage VPIX.

In sections t713 to t714, the voltage of the floating node FN41 may be the reset voltage of the pixel PX4 operating in the LCG mode.

The potential of the floating node FN41 when the boosting control signal FDB41 and the boosting control signal FDB42 of the first level V1 are applied may be lower than the potential of the floating node FN41 when the boosting control signal FDB41 and the boosting control signal FDB42 of the second level V2 are applied. Therefore, the lower voltage may be applied to the gate of the driving transistor DX4 when the boosting control signal FDB41 and the boosting control signal FDB42 of the first level V1 are applied than when the boosting control signal FDB41 and the boosting control signal FDB42 of the second level V2 are applied.

In sections t713 to t714, the voltage of floating node FN41 may be the reset voltage of the pixel PX4 operating in the LCG mode. The pixel voltage VOUT corresponding to the LCG reset voltage RST_L may be output to the column line CL through the driving transistor DX3.

Thereafter, at section t714, the gain control signal DCG may be transitioned to the low level L.

In sections t714 to t715, the gain control signal DCG, the reset signal RG, and the transmission signal TG may maintain the low level L, and the boosting control signal FDB41 and the boosting control signal FDB42 may maintain the first level V1. Since only the first floating diffuser FD41 is connected to the floating node FN41, the pixel PX2 may operate in the HCG mode.

In sections t714 to t715, the voltage of the floating node FN41 may be the reset voltage of the pixel PX4 operating in the HCG mode. The pixel voltage VOUT corresponding to the HCG reset voltage RST_H may be output to the column line CL through the driving transistor DX4.

At section t715, the boosting control signal FDB41 may be transitioned from the first level V1 to the third level V3. Accordingly, the potential level of the floating node FN41 may increase more than the potential level of the power source voltage VPIX.

In sections t715 to t716, the reset signal RG, the gain control signal DCG, and the transmission signal TG may maintain the low level L, the boosting control signal FDB41 may maintain the third level V3, and the boosting control signal FDB42 may maintain the first level V1.

At section t716, the transmission signal TG may be transitioned to the high level H in the form of the pulse RTX1.

In sections t716 to t717, the reset signal RG and the gain control signal DCG may maintain the low level L, transmission signal TG may maintain the high level H, the boosting control signal FDB41 may maintain the third level V3, and the boosting control signal FDB42 may maintain the first level V1.

Since the transmission transistor TX4 is turned on, the photo charge generated by the photoelectric element PD4 may be transmitted to the floating node FN41. At this time, since the switch transistor SW41 is turned off, all photo charges generated by the photoelectric element PD4 may be accumulated in the first floating diffuser FD41.

In addition, since the boosting control signal FDB41 has the third level V3, the potential level of the floating node FN41 may be increased more than the potential level of the power source voltage VPIX. Meanwhile, since the switch transistor SW1 is turned off, the boosting control signal FDB42 may not affect the potential of the floating node FN41. The photo charge transmission rate from the photoelectric element PD4 to the floating node FN41 when the boosting control signal FDB41 has the third level V3 may be higher than the photo charge transmission rate from the photoelectric element PD4 to the floating node FN41 when the boosting control signal FDB41 has the second level V2. Accordingly, most of the photo charge generated in the photoelectric element PD4 may be transmitted to the floating node FN41.

At section t717, the transmission signal TG may be transitioned to the low level L.

In sections t717 to t718, the reset signal RG, the gain control signal DCG, and the transmission signal TG may maintain the low level L, the boosting control signal FDB41 may maintain the third level V3, and the boosting control signal FDB42 may maintain first level V1.

At section t718, the boosting control signal FDB41 may be transitioned from the third level V3 to the first level V1.

In sections t718 to t719, the voltage of the floating node FN41 may be the signal voltage of the pixel PX4 operating in the HCG mode. The pixel voltage VOUT corresponding to the signal voltage SIG_H may be output to the column line CL through the driving transistor DX4.

At section t719, the gain control signal DCG may be transitioned to the high level H.

In sections t719 to t720, the reset signal RG and the transmission signal RG may maintain the low level L, the gain control signal DCG may maintain the high level H, and the boosting control signal FDB41 and the boosting control signal FDB42 may maintain the first level V1. Since both the first floating diffuser FD41 and the second floating diffuser FD42 are connected to the floating node FN41, the pixel PX4 may operate in the LCG mode.

At section t720, the boosting control signal FDB41 and the boosting control signal FDB42 may be transitioned from the first level V1 to the third level V3.

In sections t720 to t721, the reset signal RG and the transmission signal RG may maintain the low level L, the gain control signal DCG may maintain the high level H, and the boosting control signal FDB41 and the boosting control signal FDB42 may maintain the third level V3.

At this time, since the switch transistor SW41 is turned on, the photo charges generated by the photoelectric element PD4 may all be accumulated in the first floating diffuser FD41 and the second floating diffuser FD42.

In sections t715 to t716, the switch transistor SW41 is turned off, and only the first floating diffuser FD41 is connected to the floating node FN41. However, in sections t720 to t721, the switch transistor SW41 is turned on, and the first floating diffuser FD41 and the second floating diffuser FD42 are connected to the floating node FN41.

On the other hand, as the magnitude of the floating diffuser or the capacitor connected to the floating node FN41 increases, a larger voltage is required to change the voltage of the floating node FN41. The pixel PX4 may equally control the photo charge transmission rate from the photoelectric element PD4 to the floating node FN41 when operating in the HCG mode and the photo charge transmission rate from the photoelectric element PD4 to the floating node FN41 when operating in the LCG mode. That is, the row driver 130 may control the boosting control signal FDB41 and the boosting control signal FDB42 so that the same level of the potential level change occurs in the floating node FN41 when the pixel PX4 operates in HCG mode or the LCG mode. For example, the third level V3 of the boosting control signal FDB42 may be the higher level than the third level V3 of the boosting control signal FDB41. In FIG. 26, the third level V3 of the boosting control signal FDB41 and the third level V3 of the boosting control signal FDB42 are shown to be at the same level, but the third levels V3 of two signals may be at different levels.

At section t721, the transmission signal TG may be transitioned to the high level H in the form of the pulse RTX2.

In sections t721 to t722, the reset signal RG may maintain the low level L, the gain control signal DCG and the transmission signal TG may maintain the high level H, and the boosting control signal FDB41 and the boosting control signal FDB42 may maintain the third level V3.

Since the transmission transistor TX4 and the switch transistor SW41 are turned on, the photo charge generated in the photoelectric element PD4 may be accumulated in the floating diffuser FN41 and the floating diffuser FN42.

At the section t722, the transmission signal TG may be transitioned to the low level L.

In sections t722 to t723, the reset signal RG and the transmission signal TG may maintain the low level L, the gain control signal DCG may maintain the high level H, and the boosting control signal FDB41 and the boosting control signal FDB42 may maintain the third level V3.

At sections t723, the boosting control signal FDB41 and the boosting control signal FDB42 may be transitioned from the third level V3 to the first level V1.

In sections t723 to t724, the voltage of the floating node FN41 may be the signal voltage of the pixel PX4 operating in the LCG mode. The pixel voltage VOUT corresponding to the signal voltage SIG_L may be output to the column line CL through the driving transistor DX4.

At sections t724, the boosting control signal FDB41 and the boosting control signal FDB42 may be transitioned from the first level V1 to the second level V2.

At section t725, the selection signal SEL may be transitioned from the high level H to the low level L.

The waveform of the boosting control signal FDB41 and the boosting control signal FDB42 in the shutter section SHUTTER is not limited to the waveform shown in FIG. 26, and may have any suitable waveform to have the photo charge transfer amount similar to the photo charge transfer amount from the photoelectric element PD4 to the floating node FN41 in the read-out section READOUT.

The image sensor 100 may read the pixel voltage by repeating the above-described scan section a plurality of times.

Figure 27:
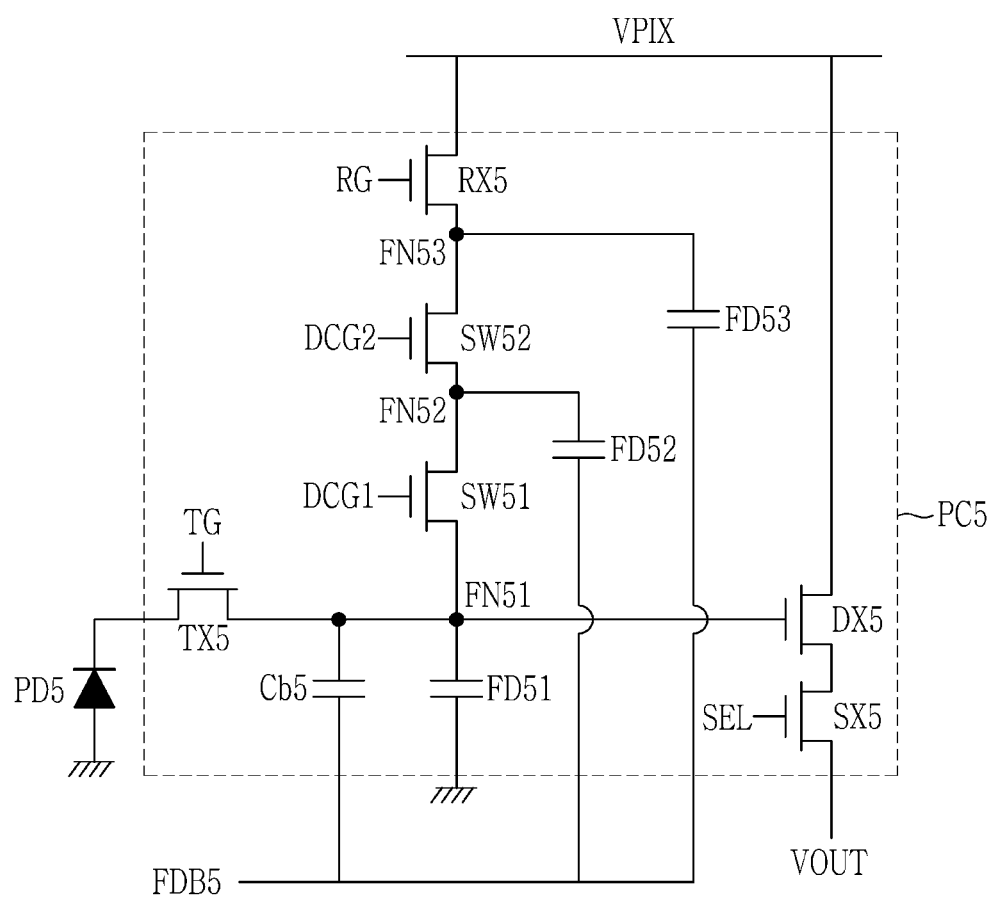
FIG. 27 is a circuit diagram of a pixel according to an exemplary embodiment.

FIG. 27 is a circuit diagram of a pixel according to an exemplary embodiment.

The pixel PX5 according to an exemplary embodiment may include a photoelectric element PD5 that generates a charge in response to light and a pixel circuit PC5 that processes the charge generated by the photoelectric element PD5 and outputs an electrical signal.

The photoelectric element PD5 may react with light to generate electrons or holes as main charge carriers. The cathode of the photoelectric element PD5 may be connected to the floating node FN51 through the transmission transistor TX5, and the anode of the photoelectric element PD5 may be grounded.

The pixel circuit PC5 may include a first floating diffuser FD51, a second floating diffuser FD52, a third floating diffuser FD53, a reset transistor RX5, a switch transistor SW51, a switch transistor SW52, a driving transistor DX5, a selection transistor SX5, a transmission transistor TX5, and the like. The transistors RX5, SW51, SW52, DX5, SX5, and TX5 in the pixel circuit PC5 may operate in response to control signals provided from the row driver 130, for example a reset signal RG, a first gain control signal DCG1, a second gain control signal DCG2, a transmission signal TG, and the selection signal SEL. Each of the first floating diffuser FD51, the second floating diffuser FD52, and the third floating diffuser FD53 may have a predetermined capacitance and store the charge generated by the photoelectric element PD5.

The transmission transistor TX5 may be connected between the photoelectric element PD5 and the floating node FN51, and controlled by the transmission signal TG. When the transmission transistor TX5 is turned on, the charge generated by the photoelectric element PD5 may be transmitted to the floating node FN51.

In the first floating diffuser FD51, the second floating diffuser FD52, and the third floating diffuser FD53, the charge corresponding to the reset voltage or the charge corresponding to the signal voltage may be accumulated, so the first floating diffuser FD51, the second floating diffuser FD52, and the third floating diffuser FD53 may be modeled as a kind of capacitor each having an arbitrary capacitance. The boosting capacitor Cb5 may be connected to the floating node FN51. The boosting control signal FDB5 may be output to one electrode of the boosting capacitor Cb5, and one terminal of the second floating diffuser FD52 and the third floating diffuser FD53. The boosting control signal FDB5 may control the voltage applied to the floating node FN51, the floating node FN52, and the floating node FN53.

The voltage of the floating node FN51 may be determined according to the charge accumulated in the first floating diffuser FD51.

The switch transistor SW51 is connected between the floating node FN51 and the floating node FN52, and may be controlled by a first gain control signal DCG1.

When the switch transistor SW51 is turned off, the floating node FN51 has the capacitance of the first floating diffuser FD51. At this time, since the size of the capacitance connected to the floating node FN51 is small, the image sensor 100 may generate the image signal in the HCG mode.

When the switch transistor SW51 is turned on and the switch transistor SW52 is turned off, the second floating diffuser FD52 may be connected to the floating node FN51. Since the first floating diffuser FD51 and the second floating diffuser FD52 are connected to the floating node FN51, the capacitance of the floating node FN51 may be increased by the capacitance of the second floating diffuser FD52 compared to a time before the switch transistor SW51 is turned on. At this time, since the magnitude of the capacitance connected to the floating node FN51 is larger than at a time before the switch transistor SW51 is turned on, the image sensor 100 may operate in the MCG mode with the larger amount of charge that may be processed in the pixel compared to the HCG mode to generate the image signal.

When the switch transistor SW51 and the switch transistor SW52 are turned on, the second floating diffuser FD52 and the third floating diffuser FD53 may be connected to the floating node FN51. Since the first floating diffuser FD51, the second floating diffuser FD52, and the third floating diffuser FD53 are connected to the floating node FN51, the capacitance of the floating node FN51 may increase as much as that of the second floating diffuser FD52 and the third floating diffuser FD53 compared to a time before the switch transistor SW51 is turned on. At this time, since the magnitude of the capacitance connected to the floating node FN51 is larger than at a time before the switch transistor SW51 is turned on, the image sensor 100 operates in the LCG mode with the larger amount of charge that may be processed in the pixel compared to the MCG mode to generate the image signal.

The gate of the driving transistor DX5 may be connected to the floating node FN51. The driving transistor DX5 may operate as a source-follower amplifier that outputs a voltage signal corresponding to the voltage of the floating node FN51. The driving transistor DX5 may output the pixel voltage VOUT to the column line CL through the selection transistor SX5 in response to the voltage of the floating node FN51.

The selection transistor SX5 may be connected between the driving transistor DX5 and the column line CL, and be controlled by the selection signal SEL. When the selection transistor SX5 is turned on, the pixel voltage VOUT output from the driving transistor DX5 may be output to the read-out circuit (150 in FIG. 1) through the column line CL connected to the selection transistor SX5.

The reset transistor RX5 is connected between the power source voltage line supplying the power source voltage VPIX and the floating node FN53, and may be controlled by the reset signal RG. When the switch transistor SW51 and the switch transistor SW52 are turned on and the reset transistor RX5 is turned on, the power source voltage VPIX may be transferred to the floating node FN51 through the reset transistor RX5 to reset the floating node FN51. When the floating node FN51 is reset, the floating node FN51 may have a voltage of a potential lower or higher than the power source voltage VPIX.

Hereinafter, when the floating node FN51 is reset, the voltage of the floating node FN51 is referred to as a reset voltage. The driving transistor DX5 may output the pixel voltage VOUT through the column line CL in response to the reset voltage of the floating node FN51. In addition, when the photo charge generated by the photoelectric element PD5 is stored in the floating node FN51, the voltage of the floating node FN51 is referred to as a signal voltage.

Meanwhile, for better understanding and ease of description, it is assumed that the control signal high level H is an enable signal higher than the threshold voltage of the transistors RX5, DX5, SX5, TX5, SW51, and SW52, and the control signal low level L is a disable signal lower than the threshold voltage of the transistors RX5, DX5, SX5, TX5, SW51, and SW52.

In addition, in the following, the boosting control signal FDB5 may operate with the first level and the second level, or the boosting control signal FDB5 may operate with the first level, the second level, and the third level. Here, the second level may be a voltage greater than the first level, and the third level may be a voltage greater than the second level.

Figure 28:
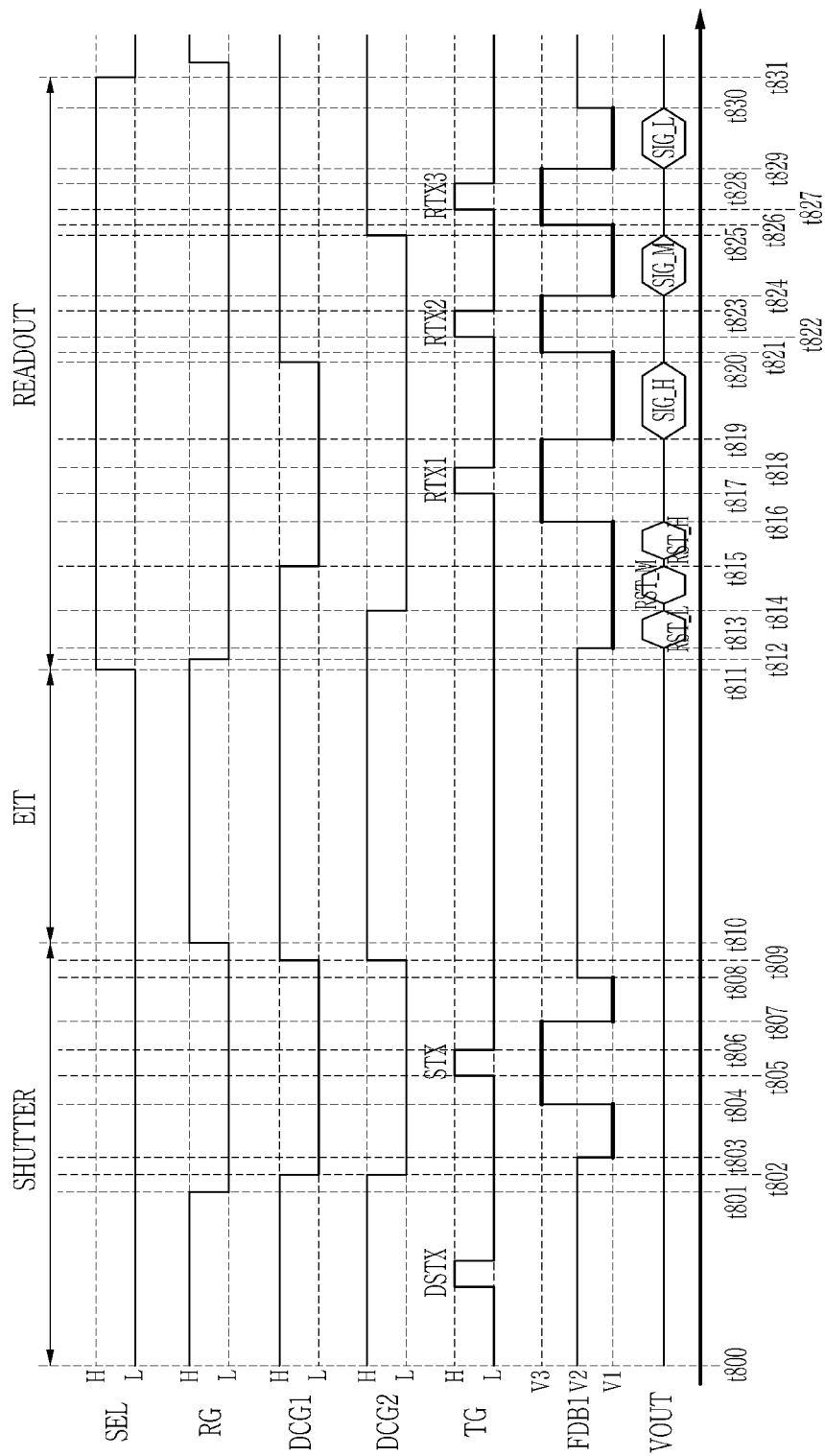
FIG. 28 is a timing diagram for explaining an operation of an image sensor according to FIG. 27.

FIG. 28 is a timing diagram for explaining an operation of an image sensor according to FIG. 27.

FIG. 28 shows a scan section for driving a plurality of pixels with a row line unit. One scan section may include a shutter section SHUTTER (t800 to t810), a charge accumulation section (Electron Integration Time, EIT) (t810 to t811), and a read-out section READOUT (t811 to t831).

In sections t800 to t801, the reset signal RG may be the high level H. The reset signal RG of the high level H may be applied to the gate of the reset transistor RX5, so that the reset transistor RX5 may be turned on. Also, the first gain control signal DCG1 and the second gain control signal DCG2 may be the high level H. The first gain control signal DCG1 of the high level H may be applied to the switch transistor SW51, and the second gain control signal DCG2 may be applied to the switch transistor SW52, so that the switch transistor SW51 and the switch transistor SW52 may be turned on. Accordingly, the first floating diffuser FD51, the second floating diffuser FD52, and the third floating diffuser FD53 are connected to the floating node FN51, and the power source voltage VPIX may be supplied to the floating node FN51.

In sections t800 to t801, the transmission signal TG may be transitioned to an arbitrary pulse DSTX form. When the transmission signal TG of the high level H is applied to the gate of the transmission transistor TX5, the transmission transistor TX5 may be turned on. Accordingly, the power source voltage VPIX may be supplied to the floating node FN51 and the photoelectric element PD5.

In sections t801 to t802, the reset signal RG may be transitioned to the low level L. The reset signal RG of the low level L may be applied to the gate of the reset transistor RX5, so that the reset transistor RX5 may be turned off. Accordingly, the supply of the power source voltage VPIX to the floating node FN51 is cut off.

At section t802, the first gain control signal DCG1 and the second gain control signal DCG2 may be transitioned to the low level L. Accordingly, only the first floating diffuser FD51 is connected to the floating node FN51.

At section t803, the boosting control signal FDB5 may be transitioned from the second level V2 to the first level V1. Accordingly, the floating node FN51 may have a potential lower than the potential of the power source voltage VPIX.

At section t804, the boosting control signal FDB5 may be transitioned from the first level V1 to the third level V3. The boosting control signal FDB5 may maintain the third level V3 from section t804 to section t807. Accordingly, the floating node FN51 may have a potential higher than the potential of the power source voltage VPIX.

At section t805, the transmission signal TG may be transitioned from the low level L to the high level H in the form of an arbitrary pulse STX. When the transmission signal TG of the high level H is applied to the gate of the transmission transistor TX5, the transmission transistor TX5 may be turned on. Accordingly, the charge accumulated in the photoelectric element PD5 may be transmitted to the floating node FN51.

At section t806, the transmission signal TG may be transitioned from the high level H to the low level L.

At section t807, the boosting control signal FDB5 may be transitioned from the third level V3 to the first level V1. Accordingly, the floating node FN51 may have a potential lower than the potential of the power source voltage VPIX.

Thereafter, at section t808, the boosting control signal FDB5 may be transitioned from the first level V1 to the second level V2.

Then, at section t809, the first gain control signal DCG1 and the second gain control signal DCG2 may be transitioned to the high level H. Accordingly, the first floating diffuser FD51, the second floating diffuser FD52, and the third floating diffuser FD53 may be connected to the floating node FN51.

At section t810, the reset signal RG may be transitioned to the high level H.

The charge accumulation section EIT is a section in which charges are accumulated in the photoelectric element PD5.

In sections t810 to t811, the charge may be accumulated in the photoelectric element PD5 by light incident on the pixel PX5.

In sections t810 to t611, the reset signal RG and the gain control signal DCG may maintain the high level H, and the boosting control signal FDB5 may maintain the second level V2. Accordingly, the first floating diffuser FD51, the second floating diffuser FD52, and the third floating diffuser FD53 are connected to the floating node FN51, and the power source voltage VPIX may be supplied to the floating node FN51.

The read-out section READOUT is a section in which the pixel voltage VOUT generated by the pixel PX5 is transmitted to the read-out circuit 150.

First, at section t811, the selection signal SEL may be transitioned to the high level H. It is applied to the gate of the selection transistor SX5 of the high level H so that the selection transistor SX5 may be turned on.

In sections t811 to t812, the reset signal RG, the first gain control signal DCG1, and the second gain control signal DCG2 may maintain the high level H, the boosting control signal FDB5 may maintain the second level V2, and the transmission signal TG may maintain the low level L.

At section t812, the reset signal RG may be transitioned from the high level H to the low level L. The reset signal RG of low level L may be applied to the gate of the reset transistor RX5 to turn off the reset transistor RX5.

In sections t812 to t813, the first gain control signal DCG1 and the second gain control signal DCG2 may maintain the high level H, and the reset signal RG, the transmission signal TG, and the boosting control signal FDB5 may maintain the low level L.

In sections t812 to t813, the first floating diffuser FD51, the second floating diffuser FD52, and the third floating diffuser FD53 are all connected to the floating node FN51, so the pixel PX5 may operate in the LCG mode.

At section t813, the boosting control signal FDB5 may be transitioned to the first level V1.

In sections t813 to t814, the first gain control signal DCG1 and the second gain control signal DCG2 may maintain the high level H, the reset signal RG and the transmission signal TG may maintain the low level L, and the boosting control signal FDB5 may maintain the first level V1. Accordingly, the potential level of the floating node FN51 may be reduced more than the potential level of the power source voltage VPIX.

In sections t813 to t814, the voltage of the floating node FN51 may be the reset voltage of the pixel PX5 operating in the LCG mode. The potential of the floating node FN51 when the boosting control signal FDB5 of the first level V1 is applied may be lower than the potential of the floating node FN51 when the boosting control signal FDB5 of the second level V2 is applied. Accordingly, the lower voltage may be applied to the gate of the driving transistor DX5 than when the boosting control signal FDB5 of the second level V2 is applied. The pixel voltage VOUT corresponding to the LCG reset voltage RST_L may be output to the column line CL through the driving transistor DX5.

Thereafter, at section t814, the second gain control signal DCG2 may be transitioned to the low level L.

In sections t814 to t815, the second gain control signal DCG2, the reset signal RG, and the transmission signal TG may maintain the low level L, and the boosting control signal FDB5 may maintain the first level V1. Since the first floating diffuser FD51 and the second floating diffuser FD52 are connected to the floating node FN51, the pixel PX5 may operate in the MCG mode.

In sections t814 to t815, the voltage of the floating node FN51 may be the reset voltage of the pixel PX5 operating in the MCG mode. The pixel voltage VOUT corresponding to the MCG reset voltage RST_M may be output to the column line CL through the driving transistor DX5.

At section t815, the first gain control signal DCG1 may be transitioned to the low level L.

In sections t815 to t816, the first gain control signal DCG1, the second gain control signal DCG2, the reset signal RG, and the transmission signal TG may maintain the low level L, and the boosting control signal FDB5 may maintain the first level V1. Since only the first floating diffuser FD51 is connected to the floating node FN51, the pixel PX5 may operate in the HCG mode.

In sections t815 to t816, the voltage of the floating node FN51 may be the reset voltage of the pixel PX5 operating in the HCG mode. The pixel voltage VOUT corresponding to the HCG reset voltage RST_H may be output to the column line CL through the driving transistor DX5.

At section t816, the boosting control signal FDB5 may be transitioned from the first level V1 to the third level V3. Accordingly, the potential level of the floating node FN51 may increase more than the potential level of the power source voltage VPIX.

In sections t816 to t817, the reset signal RG, the first gain control signal DCG1, the second gain control signal DCG2, and the transmission signal TG may maintain the low level L, and the boosting control signal FDB5 may maintain the third level V3.

At section t817, the transmission signal TG may be transitioned to the high level H in the form of the pulse RTX1.

In sections t817 to t818, the reset signal RG, the first gain control signal DCG1, and the second gain control signal DCG2 may maintain the low level L, the transmission signal TG may maintain the high level H, and the boosting control signal FDB5 may maintain the third level V3.

Since the transmission transistor TX5 is turned on, the photo charge generated in the photoelectric element PD5 may be transmitted to the floating node FN51. At this time, since the switch transistor SW51 is turned off, all photo charges generated in the photoelectric element PD5 may be accumulated in the first floating diffuser FD51.

In addition, since the boosting control signal FDB5 has the third level V3, the potential level of the floating node FN51 may be increased more than the potential level of the power source voltage VPIX. The photo charge transmission rate of the floating node FN51 from the photoelectric element PD5 may be higher than the photo charge transmission rate of the floating node FN51 from the photoelectric element PD5 when the boosting control signal FDB5 has the second level V2. Accordingly, most of the photo charge generated in the photoelectric element PD5 may be transmitted to the floating node FN51.

At section t818, the transmission signal TG may be transitioned to the low level L.

In sections t818 to t819, the reset signal RG, the transmission signal TG, the first gain control signal DCG1, and the second gain control signal DCG2 may maintain the low level L, and the boosting control signal FDB5 may maintain the third level V3.

At section t819, the boosting control signal FDB3 may be transitioned from the third level V3 to the first level V1.

In sections t819 to t820, the reset signal RG, the transmission signal TG, the first gain control signal DCG1, and the second gain control signal DCG2 may maintain the low level L, and the boosting control signal FDB5 may maintain the first level V1.

In sections t819 to t820, the voltage of the floating node FN51 may be the signal voltage of the pixel PX5 operating in the HCG mode. The pixel voltage VOUT corresponding to the signal voltage SIG_H may be output to the column line CL through the driving transistor DX5.

At section t820, the first gain control signal DCG1 may be transitioned to high level H.

In sections t820 to t821, the reset signal RG, the transmission signal TG, and the second gain control signal DCG2 may maintain the low level L, the first gain control signal DCG1 may maintain the high level H, and the boosting control signal FDB5 may maintain the first level V1.

At section t821, the boosting control signal FDB3 may be transitioned from the first level V1 to the third level V3.

At sections t822 and t621, the transmission signal TG may be transitioned to high level H in the form of the pulse RTX2.

In sections t822 to t823, the reset signal RG and the second gain control signal DCG2 may maintain the low level L, the first gain control signal DCG1 and the transmission signal TG may maintain the high level H, and the boosting control signal FDB5 may maintain the third level V3.

Since the transmission transistor TX5 and the switch transistor SW51 are turned on, the photo charge generated in the photoelectric element PD5 may be accumulated in the first floating diffuser FD51 and the second floating diffuser FD52.

At section t823, the transmission signal TG may be transitioned to low level L.

In sections t823 to t824, the reset signal RG, transmission signal TG and the second gain control signal DCG2 may maintain the low level L, the first gain control signal DCG1 may maintain the high level H, and the boosting control signal FDB5 may maintain the third level V3.

At section t824, the boosting control signal FDB3 may be transitioned from the third level V3 to the first level V1.

In sections t824 to t825, the voltage of the floating node FN51 may be the signal voltage of the pixel PX5 operating in the MCG mode. The pixel voltage VOUT corresponding to the signal voltage SIG_M may be output to the column line CL through the driving transistor DX5.

At section t825, the second gain control signal DCG2 may be transitioned to the high level H.

In sections t825 to t826, the reset signal RG and the transmission signal TG maintain the low level L, the first gain control signal DCG1 and the second gain control signal DCG2 maintain the high level H, and the boosting control signal FDB5 may maintain the second level V2.

At section t826, the boosting control signal FDB3 may be transitioned from the first level V1 to the third level V3.

At section t827, the transmission signal TG may be transitioned to high level H in the form of the pulse RTX3.

In sections t827 to t828, the reset signal RG may maintain the low level L, the first gain control signal DCG1, the second gain control signal DCG2, and the transmission signal TG may maintain the high level H, and the boosting control signal FDB5 may maintain the third level V3.

Since the transmission transistor TX5 and the switch transistor SW51 are turned on, the photo charge generated in the photoelectric element PD5 may be accumulated in the first floating diffuser FD51, the second floating diffuser FD52, and the third floating diffuser FD53.

At section t828, the transmission signal TG may be transitioned to low level L.

In sections t828 to t829, the reset signal RG and the transmission signal TG may maintain the low level L, the first gain control signal DCG1 and the second gain control signal DCG2 may maintain the high level H, and the boosting control signal FDB5 may maintain the third level V3.

At section t829, the boosting control signal FDB5 may be transitioned from the third level V3 to the first level V1.

In sections t829 to t830, the voltage of the floating node FN51 may be the signal voltage of the pixel PX5 operating in the LCG mode. The pixel voltage VOUT corresponding to the signal voltage SIG_L may be output to the column line CL through the driving transistor DX5.

At section t830, the boosting control signal FDB5 may be transitioned from the first level V1 to the second level V2.

At section t831, the selection signal SEL may be transitioned from the high level H to the low level L.

The waveform of the boosting control signal FDB51 in the shutter section SHUTTER is not limited to the waveform shown in FIG. 28, and may have an arbitrary suitable waveform to have a photo charge transfer amount similar to the photo charge transfer amount from the photoelectric element PD5 to the floating node FN51 in the read-out section READOUT.

The image sensor 100 may read the pixel voltage by repeating the above-described scan section a plurality of times.

Figure 29:
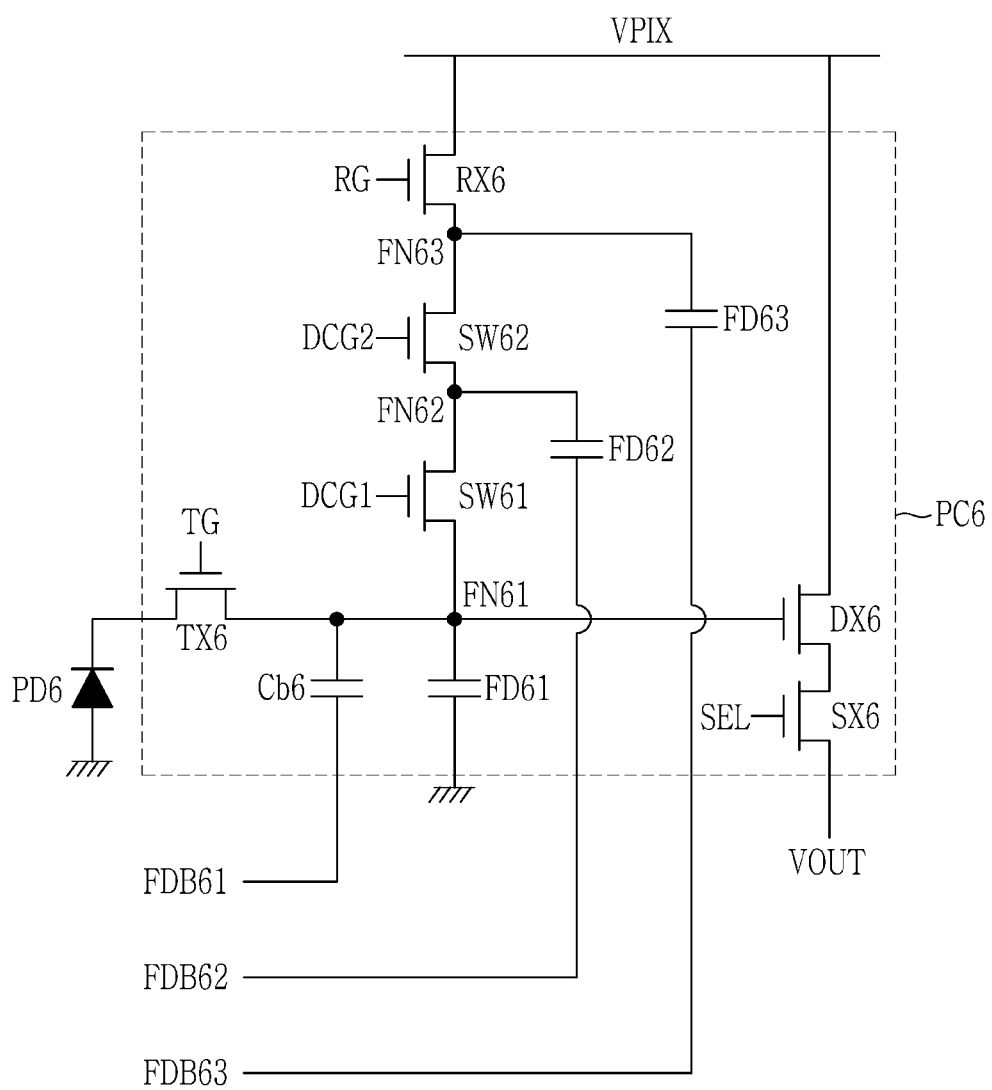
FIG. 29 is a circuit diagram of a pixel according to an exemplary embodiment.

FIG. 29 is a circuit diagram of a pixel according to an exemplary embodiment.

The pixel PX6 according to an exemplary embodiment may include a photoelectric element PD6 that generates a charge in response to light and a pixel circuit PC6 that processes the charge generated by the photoelectric element PD6 and outputs an electrical signal.

The photoelectric element PD6 may react with light to generate electrons or holes as main charge carriers. The cathode of the photoelectric element PD6 may be connected to the floating node FN61 through the transmission transistor TX6, and the anode of the photoelectric element PD6 may be grounded.

The pixel circuit PC6 may include a first floating diffuser FD61, a second floating diffuser FD62, a third floating diffuser FD63, a reset transistor RX6, a switch transistor SW61, a switch transistor SW62, a driving transistor DX6, a selection transistor SX6, a transmission transistor TX6, and the like. The transistors RX6, SW61, SW62, DX6, SX6, and TX6 in the pixel circuit PC6 may operate in response to control signals provided from the row driver 130, for example a reset signal RG, a first gain control signal DCG1, a second gain control signal DCG2, a transmission signal TG, and the selection signal SEL. Each of the first floating diffuser FD61, the second floating diffuser FD62, and the third floating diffuser FD63 may have a predetermined capacitance and store the charge generated by the photoelectric element PD6.

The transmission transistor TX6 may be connected between the photoelectric element PD6 and the floating node FN61 and be controlled by the transmission signal TG. When the transmission transistor TX6 is turned on, the charge generated by the photoelectric element PD6 may be transmitted to the floating node FN61.

Since the charge corresponding to the reset voltage or the charge corresponding to the signal voltage may be accumulated in the first floating diffuser FD61, the second floating diffuser FD62, and the third floating diffuser FD63, the first floating diffuser FD61, the second floating diffuser FD62, and the third floating diffuser FD63 may each be modeled as a kind of capacitor with an arbitrary capacitance.

The boosting capacitor Cb61 may be connected to the floating node FN61. The boosting control signal FDB61 may be output to one electrode of the boosting capacitor Cb61. The boosting control signal FDB61 may control the voltage applied to the floating node FN61. The boosting control signal FDB62 may be output to one terminal of the second floating diffusion FD62. The boosting control signal FDB62 may control the voltage applied to the floating node FN62. The boosting control signal FDB63 may be output to one terminal of the third floating diffuser FD63. The boosting control signal FDB63 may control the voltage applied to the floating node FN63.

The voltage of the floating node FN61 may be determined according to the charge accumulated in the first floating diffuser FD61. A conversion gain, which is the ratio that a charge is converted to a voltage, may be inversely proportional to the magnitude of the capacitance of the floating diffuser connected to the floating node FN61.

The switch transistor SW61 may be connected between the floating node FN61 and the floating node FN62 and be controlled by a first gain control signal DCG1.

When the switch transistor SW61 is turned off, the floating node FN61 has the capacitance of the first floating diffuser FD61. At this time, since the magnitude of the capacitance connected to the floating node FN61 is small, the image sensor 100 may generate the image signal in the HCG mode.

When the switch transistor SW61 is turned on and the switch transistor SW62 is turned off, the second floating diffuser FD62 may be connected to the floating node FN61. Since the first floating diffuser FD61 and the second floating diffuser FD62 are connected to the floating node FN61, the capacitance of the floating node FN61 may increase by the capacitance of the second floating diffuser FD62 compared to a time before the switch transistor SW61 is turned on. At this time, since the magnitude of the capacitance connected to the floating node FN61 is larger than at a time before the switch transistor SW61 is turned on, the image sensor 100 operates in the MCG mode with a larger amount of charge that may be processed in the pixel compared to the HCG mode to generate the image signal.

When the switch transistor SW61 and the switch transistor SW62 are turned on, the second floating diffuser FD62 and the third floating diffuser FD63 may be connected to the floating node FN61. Since the first floating diffuser FD61, the second floating diffuser FD62, and the third floating diffuser FD63 are connected to the floating node FN61, the capacitance of the floating node FN61 may increase by the capacitance of the second floating diffuser FD62 and the third floating diffuser FD63 compared to a time before the switch transistor SW61 is turned on. At this time, since the magnitude of the capacitance connected to the floating node FN61 is larger than at a time before the switch transistor SW61 is turned on, the image sensor 100 operates in the LCG mode with a larger amount of charge that may be processed in the pixel compared to the MCG mode to generate the image signal.

The gate of the driving transistor DX6 may be connected to the floating node FN61. The driving transistor DX6 may operate as a source-follower amplifier that outputs a voltage signal corresponding to the voltage of the floating node FN61. The driving transistor DX6 may output the pixel voltage VOUT to the column line CL through the selection transistor SX6 in response to the voltage of the floating node FN61.

The selection transistor SX6 may be connected between the driving transistor DX6 and the column line CL and be controlled by the selection signal SEL. When the selection transistor SX6 is turned on, the pixel voltage VOUT output from the driving transistor DX6 may be output to the read-out circuit (150 in FIG. 1) through the column line CL connected to the selection transistor SX6.

The reset transistor RX6 may be connected between the power source voltage line supplying the power source voltage VPIX and the floating node FN63, and may be controlled by the reset signal RG. When the switch transistor SW61 and the switch transistor SW62 are turned on and the reset transistor RX6 is turned on, the power source voltage VPIX may be transmitted to the floating node FN61 through the reset transistor RX6 to reset the floating node FN61. When the floating node FN61 is reset, the floating node FN61 may have a voltage of potential lower or higher than the power source voltage VPIX.

Hereinafter, when the floating node FN61 is reset, the voltage of the floating node FN61 is referred to as a reset voltage. The driving transistor DX6 may output the pixel voltage VOUT through the column line CL in response to the reset voltage of the floating node FN61. In addition, when the photo charge generated by the photoelectric element PD6 is stored in the floating node FN61, the voltage of the floating node FN61 is referred to as a signal voltage.

On the other hand, for better understanding and ease of description, it is assumed that the control signal of the high level H is a signal higher than the threshold voltage of the transistors RX6, DX6, SX6, TX6, SW61, and SW62, and the control signal of the low level L is a signal lower than the threshold voltage of the transistors RX6, DX6, SX6, TX6, SW61, and SW62.

In addition, in the following, the boosting control signals FDB61, FDB62, and FDB63 may operate with a first level and a second level, or the boosting control signals FDB61, FDB62, and FDB63 may operate with a first level, a second level, and a third level. Here, the second level may have a voltage greater than the first level, and the third level may have a voltage greater than the second level.

Figure 30:
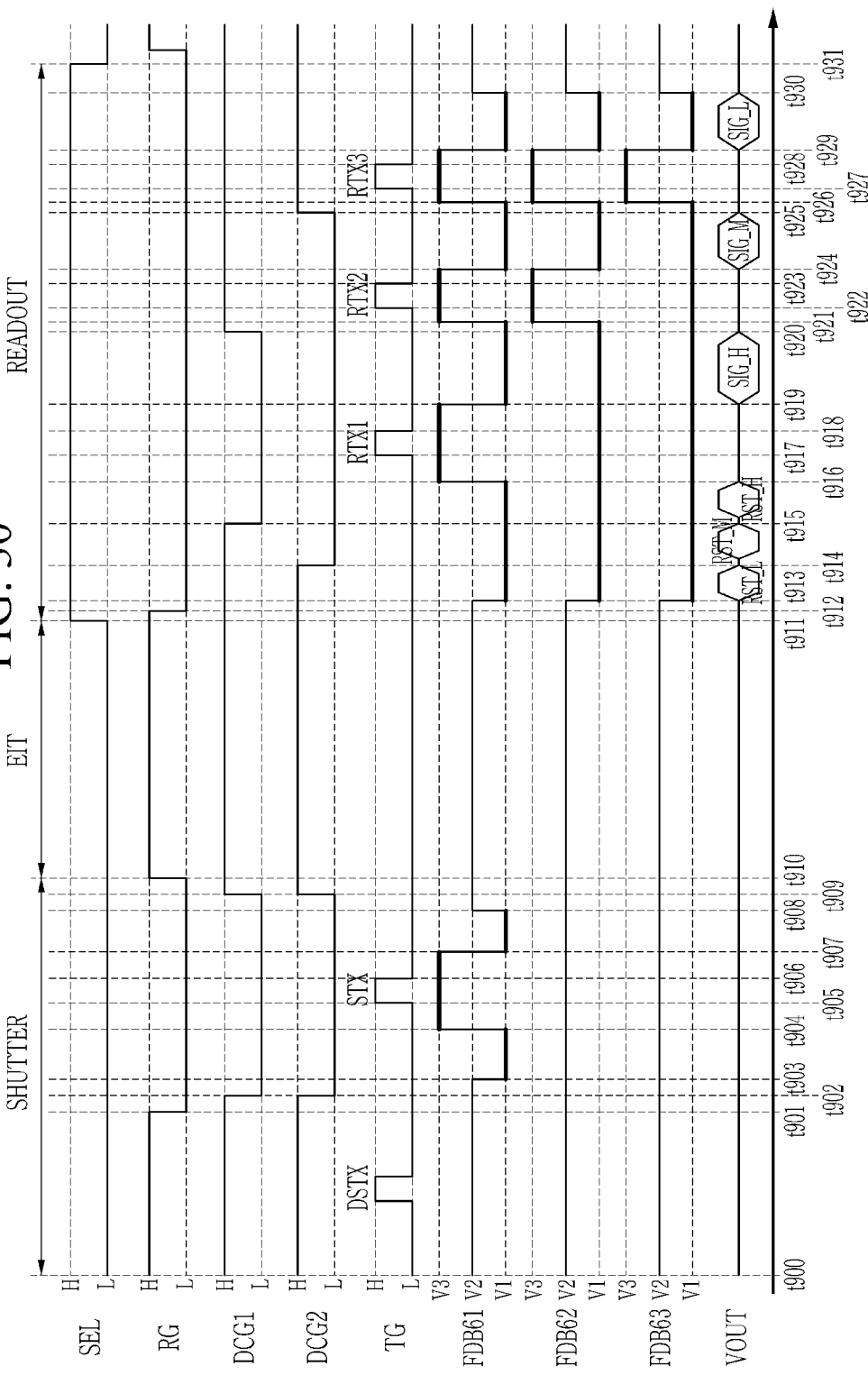
FIG. 30 is a timing diagram for explaining an operation of an image sensor according to FIG. 29.

FIG. 30 is a timing diagram for explaining an operation of an image sensor according to FIG. 29.

FIG. 30 shows a scan section for driving a plurality of pixels with a row line unit. One scan section may include a shutter section SHUTTER (t900 to t910), a charge accumulation section EIT (t910 to t911), and a read-out section READOUT (t911 to t931).

On the other hand, the waveforms of the selection signal SEL, the reset signal RG, the transmission signal TG, the gain control signal DCG, and the boosting control signal FDB61 in the shutter section SHUTTER and the charge accumulation section EIT of FIG. 30 is the waveform of the selection signal SEL, the reset signal RG, the transmission signal TG, the gain control signal DCG, and the boosting control signal FDB61 in the shutter section SHUTTER and the charge accumulation section EIT of FIG. 30, so that the description of FIG. 28 may be also applied to FIG. 30.

In the above-described FIG. 27 and FIG. 28, only one boosting control signal FDB5 connected to the floating node FN51 was used to control the voltage applied to the floating node FN51. However, in FIG. 29 and FIG. 30, the voltage applied to the floating node FN61 may be controlled by simultaneously using the boosting control signal FDB61, the boosting control signal FDB62, and the boosting control signal FDB63.

The read-out section READOUT is a section in which the pixel voltage VOUT generated by the pixel PX6 is transmitted to the read-out circuit 150.

First, at section t911, the selection signal SEL may be transitioned to the high level H. It is applied to the gate of the selection transistor SX5 of the high level H so that the selection transistor SX5 may be turned on.

In sections t911 to t912, the reset signal RG, the first gain control signal DCG1, and the second gain control signal DCG2 may maintain the high level H, the boosting control signal FDB61, the boosting control signal FDB62 and the boosting control signal FDB63 may maintain the second level V2, and the transmission signal TG may maintain the low level L.

At section t912, the reset signal RG may be transitioned from the high level H to the low level L. The reset signal RG of the low level L may be applied to the gate of the reset transistor RX6 to turn off the reset transistor RX6.

In sections t912 to t913, the first gain control signal DCG1 and the second gain control signal DCG2 may maintain the high level H, the reset signal RG and the transmission signal TG may maintain the low level L, and the boosting control signal FDB61, the boosting control signal FDB62, and the boosting control signal FDB63 may maintain the second level V2.

In sections t912 to t913, the first floating diffuser FD61, the second floating diffuser FD62, and the third floating diffuser FD63 are all connected to the floating node FN61, so the pixel PX6 may operate in the LCG mode.

At section t913, the boosting control signal FDB61, the boosting control signal FDB62, and the boosting control signal FDB63 may be transitioned to the first level V1.

In sections t913 to t914, the first gain control signal DCG1 and the second gain control signal DCG2 may maintain the high level H, the reset signal RG and the transmission signal TG maintain the low level L, and the boosting control signal FDB61, the boosting control signal FDB62, and the boosting control signal FDB63 may maintain the first level V1. Accordingly, the potential level of the floating node FN61 may be reduced more than the potential level of the power source voltage VPIX.

In section t913 to t914, the voltage of the floating node FN61 may be the reset voltage of the pixel PX6 operating in the LCG mode.

The potential of the floating node FN61 when the boosting control signal FDB61 of the first level V1 is applied may be lower than the potential of the floating node FN61 when the boosting control signal FDB61 of the second level V2 is applied. Accordingly, the lower voltage may be applied to the gate of the driving transistor DX6 when the boosting control signal FDB61 of the first level V1 is applied than when the boosting control signal FDB61 of the second level V2 is applied.

The pixel voltage VOUT corresponding to the LCG reset voltage RST_L may be output to the column line CL through the driving transistor DX6.

Thereafter, at section t914, the second gain control signal DCG2 may be transitioned to the low level L.

In sections t914 to t915, the second gain control signal DCG2, the reset signal RG, and the transmission signal TG may maintain the low level L, and the boosting control signal FDB61, the boosting control signal FDB62, and the boosting control signal FDB63 may maintain the first level V1. Since the first floating diffuser FD61 and the second floating diffuser FD62 are connected to the floating node FN61, the pixel PX6 may operate in the MCG mode.

In sections t914 to t915, the voltage of the floating node FN61 may be the reset voltage of the pixel PX6 operating in the MCG mode. The pixel voltage VOUT corresponding to the MCG reset voltage RST_M may be output to the column line CL through the driving transistor DX6.

At section t915, the first gain control signal DCG1 may be transitioned to the low level L.

In sections t915 to t916, the first gain control signal DCG1, the second gain control signal DCG2, the reset signal RG, and the transmission signal TG may maintain the low level L, and the boosting control signal FDB61, the boosting control signal FDB62, and the boosting control signal FDB63 may maintain the first level V1. Since only the first floating diffuser FD61 is connected to the floating node FN61, the pixel PX6 can operate in the HCG mode.

In sections t915 to t916, the voltage of the floating node FN61 may be the reset voltage of the pixel PX6 operating in the HCG mode. The pixel voltage VOUT corresponding to the HCG reset voltage RST_H may be output to the column line CL through the driving transistor DX6.

At section t916, the boosting control signal FDB61 may be transitioned from the first level V1 to the third level V3. Accordingly, the potential level of the floating node FN61 may increase more than the potential level of the power source voltage VPIX.

In sections t916 to t917, the reset signal RG, the first gain control signal DCG1, the second gain control signal DCG2, and the transmission signal TG may maintain the low level L, the boosting control signal FDB61 may maintain the third level V3, and the boosting control signal FDB62 and boosting control signal FDB63 may maintain the first level V1.

At section t917, the transmission signal TG may be transitioned to the high level H in the form of the pulse RTX1.

In sections t917 to t918, the reset signal RG, the first gain control signal DCG1, and the second gain control signal DCG2 may maintain the low level L, the transmission signal TG may maintain the high level H, the boosting control signal FDB61 may maintain the third level V3, and the boosting control signal FDB62 and the boosting control signal FDB63 may maintain the first level V1.

Since the transmission transistor TX6 is turned on, the photo charge generated in the photoelectric element PD6 may be transmitted to the floating node FN61. At this time, since the switch transistor SW61 is turned off, all photo charges generated in the photoelectric element PD6 may be accumulated in the first floating diffuser FD61.

In addition, since the boosting control signal FDB61 has the third level V3, the potential level of the floating node FN61 may be increased more than the potential level of the power source voltage VPIX. Meanwhile, since the switch transistor SW61 is turned off, the boosting control signal FDB62 and the boosting control signal FDB63 may not affect the potential of the floating node FN61. The photo charge transmission rate from the photoelectric element PD6 to the floating node FN61 when the boosting control signal FDB61 has the third level V3 may be higher than the photo charge transmission rate from the photoelectric element PD6 to the floating node FN61 when the boosting control signal FDB61 has the second level V2. Accordingly, most of the photo charge generated in the photoelectric element PD6 may be transferred to the floating node FN61.

At section t918, the transmission signal TG may be transitioned to the low level L.

In sections t918 to t919, the reset signal RG, the transmission signal TG, the first gain control signal DCG1, and the second gain control signal DCG2 may maintain the low level L, the boosting control signal FDB61 may maintain the third level V3, and the boosting control signal FDB62 and the boosting control signal FDB63 may maintain the first level V1.

At section t919, the boosting control signal FDB61 may be transitioned from the third level V3 to the first level V1.

In sections t919 to t920, the reset signal RG, the transmission signal TG, the first gain control signal DCG1, and the second gain control signal DCG2 may maintain the low level L, and the boosting control signal FDB61, the boosting control signal FDB62, and the boosting control signal FDB63 may maintain the first level V1.

In sections t919 to t920, the voltage of the floating node FN61 may be the signal voltage of the pixel PX6 operating in the HCG mode. The pixel voltage VOUT corresponding to the signal voltage SIG_H may be output to the column line CL through the driving transistor DX6.

At section t920, the first gain control signal DCG1 may be transitioned to the high level H.

In sections t920 to t921, the reset signal RG, the transmission signal TG, and the second gain control signal DCG2 may maintain the low level L, the first gain control signal DCG1 may maintain the high level H, and the boosting control signal FDB61, the boosting control signal FDB62, and the boosting control signal FDB63 may maintain the first level V1.

At section t921, the boosting control signal FDB61 and the boosting control signal FDB62 may be transitioned from the first level V1 to the third level V3.

At section t922, the transmission signal TG may be transitioned to the high level H in the pulse RTX2 form.

In sections t922 to t923, the reset signal RG and the second gain control signal DCG2 may maintain the low level L, the first gain control signal DCG1 and the transmission signal TG may maintain the high level H, the boosting control signal FDB61 and the boosting control signal FDB62 may maintain the third level V3, and the boosting control signal FDB63 may maintain the first level V1.

Since the transmission transistor TX6 and the switch transistor SW61 are turned on, the photo charge generated in the photoelectric element PD6 may be accumulated in the first floating diffuser FD61 and the second floating diffuser FD62.

At the section t923, the transmission signal TG may be transitioned to the low level L.

In sections t923 to t924, the reset signal RG, the transmission signal TG, and the second gain control signal DCG2 may maintain the low level L, the first gain control signal DCG1 may maintain the high level H, the boosting control signal FDB61 and the boosting control signal FDB62 may maintain the third level V3, and the boosting control signal FDB63 may maintain the first level V1.

At section t924, the boosting control signal FDB61 and the boosting control signal FDB62 may be transitioned from the third level V3 to the first level V1.

In sections t924 to t925, the voltage of the floating node FN61 may be the signal voltage of the pixel PX6 operating in the MCG mode. The pixel voltage VOUT corresponding to the signal voltage SIG_M may be output to the column line CL through the driving transistor DX6.

At section t925, the second gain control signal DCG2 may be transitioned to the high level H.

In sections t925 to t926, the reset signal RG and the transmission signal TG may maintain the low level L, the first gain control signal DCG1 and the second gain control signal DCG2 may maintain the high level H, and the boosting control signal FDB61, the boosting control signal FDB61, and the boosting control signal FDB62 may maintain the first level V1.

At section t926, the boosting control signal FDB61, the boosting control signal FDB61, and the boosting control signal FDB62 may be transitioned from the first level V1 to the third level V3.

At section t927, the transmission signal TG may be transitioned to the high level H in the form of the pulse RTX3.

In sections t927 to t928, the reset signal RG maintain the low level L, the first gain control signal DCG1, the second gain control signal DCG2, and the transmission signal TG may maintain the high level H, and the boosting control signal FDB61, the boosting control signal FDB61, and the boosting control signal FDB62 may maintain the third level V3.

Since the transmission transistor TX6 and the switch transistor SW61 are turned on, the photo charge generated in the photoelectric element PD6 may be accumulated in the first floating diffuser FD61, the second floating diffuser FD62, and the third floating diffuser FD63.

At section t928, the transmission signal TG may be transitioned to low level L.

In sections t928 to t929, the reset signal RG and the transmission signal TG may maintain the low level L, the first gain control signal DCG1 and the second gain control signal DCG2 may maintain the high level H, and the boosting control signal FDB61, the boosting control signal FDB61, and the boosting control signal FDB62 may maintain the third level V3.

At section t929, the boosting control signal FDB61, the boosting control signal FDB61, and the boosting control signal FDB62 may be transitioned from the third level V3 to the first level V1.

In sections t929 to t930, the voltage of the floating node FN61 may be the signal voltage of the pixel PX6 operating in the LCG mode. The pixel voltage VOUT corresponding to the signal voltage SIG_L may be output to the column line CL through the driving transistor DX6.

At section t930, the boosting control signal FDB61, the boosting control signal FDB61 and the boosting control signal FDB62 may be transitioned from the first level V1 to the second level V2.

At section t931, the selection signal SEL may be transitioned from the high level H to the low level L.

The waveforms of the boosting control signal FDB61, the boosting control signal FDB62, and the boosting control signal FDB63 in the shutter section SHUTTER are not limited to the waveform shown in FIG. 30, and may have an arbitrary appropriate waveform to have a photo charge transmission amount similar to the photo charge transmission amount from the photoelectric element PD6 to the floating node FN61.

The image sensor 100 may read the pixel voltage by repeating the above-described scan section a plurality of times.

Figure 31:
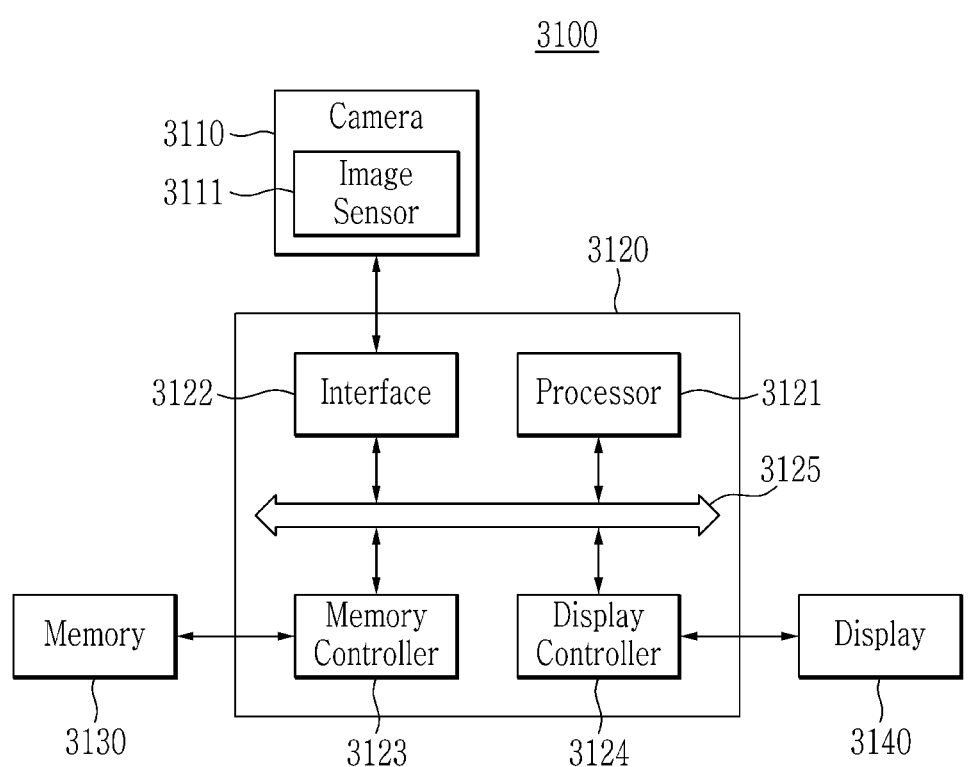
FIG. 31 is an example block diagram of a computer device according to an exemplary embodiment.

FIG. 31 is an example block diagram of a computer device according to an exemplary embodiment.

Referring to FIG. 31, a computing device 3100 may include a camera 3110, a controller 3120, a memory 3130, and a display 3140.

The camera 3110 may include an image sensor 3111. The image sensor 3111 may be implemented as the image sensor described with reference to FIG. 1 to FIG. 32. The camera 3110 may generate an image signal by using the image sensor 3111, perform an image signal processing on the image signal, and output the processed image signal to the controller 3120.

The controller 3120 may include a processor 3121. The processor 3121 may control the overall operation of each component of the computing device 3100. The processor 3121 may be implemented with at least one of various processing units such as a central processing unit (CPU), an application processor (AP), and a graphics processing unit (GPU). In some exemplary embodiments, the controller 3120 may be implemented as an integrated circuit or a system on chip (SoC).

In some exemplary embodiments, as shown in FIG. 31, the controller 3120 may further include an interface 3134, a memory controller 3123, a display controller 3124, and a bus 3125. In some other exemplary embodiments, at least some of the interface 3134, the memory controller 3123, the display controller 3124, and the bus 3125 may be provided externally to the controller 3120. In some further exemplary embodiments, the controller 3120 may further include an image signal processor.

The interface 3122 may transmit the image signal received from the image sensor 3111 to the memory controller 3123 or the display controller 3124 through the bus 3125.

The memory 3130 may store various data and instructions. The memory controller 3123 may control the transmission of data or instructions to and from the memory 3130.

The display controller 3124 may transmit a data to be displayed on the display 3140 to the display 3140 under the control of the processor 3121, and the display 3140 may display a screen according to the received data. In some exemplary embodiments, the display 3140 may further include a touch screen. The touch screen may transmit a user input for controlling an operation of the computing device 3100 to the controller 3120. The user input may be generated when the user touches the touch screen.

The bus 3125 may provide a communication function between constituent elements of the controller 3120. The bus 3125 may include at least one type of the bus according to a communication protocol between constituent elements.

While this invention has been described in connection with what is presently considered to be practical embodiments, it is to be understood that the invention is not limited to the disclosed exemplary embodiments. On the contrary, it is intended to cover various modifications, variations and equivalent arrangements within the purview of the skilled artisan that are included within the spirit and scope of the appended claims.

What is claimed is:

1. An image sensor comprising:
a pixel array including pixels including a photoelectric element and a boosting capacitor with one electrode connected to a first node to which a charge generated from the photoelectric element is transmitted, and outputting a pixel voltage according to a voltage of the first node;
a row driver outputting a reset signal that resets the voltage of the first node as a power source voltage, a boosting control signal applied to the other electrode of the boosting capacitor, and a transmission signal transmitting the charge to the first node;
a read-out circuit receiving the pixel voltage as a first input signal before the transmission signal is output to the pixel, receiving the pixel voltage as a second input signal after the transmission signal is output to the pixel, and outputting image data by using the first input signal and the second input signal; and
a controller controlling the row driver so as to change the boosting control signal from a first level to a second level lower than the first level after changing the reset signal from an enable level to a disable level, and controlling the read-out circuit so as to receive the first input signal and the second input signal within a section in which the boosting control signal is maintained as the second level.

2. The image sensor of claim 1, wherein
the controller controls the row driver so as to change the boosting control signal from the first level to the second level after changing the reset signal from the enable level to the disable level within a shutter section resetting a charge generated in the photoelectric element and a charge accumulated in the first node.

3. The image sensor of claim 1, wherein
the controller further controls the row driver so as to output the boosting control signal with a third level higher than the first level during which the transmission signal is output to the pixel.

4. The image sensor of claim 3, wherein
the controller further controls the row driver so as to output the boosting control signal as the third level during the transmission signal is output to the pixel within a shutter section resetting a charge generated in the photoelectric element and a charge accumulated in the first node.

5. The image sensor of claim 4, wherein
the controller controls the row driver so as to output the boosting control signal as the second level after changing the reset signal from the enable level to the disable level in the shutter section.

6. The image sensor of claim 3, wherein
the pixel further includes a floating diffuser connected to the first node,
the row driver further outputs a gain control signal controlling a capacitance of the floating diffuser, and
the controller controls the row driver so as to change the gain control signal from an enable level to a disable level within a section in which the boosting control signal is maintained as the second level after changing the reset signal from the enable level to the disable level.

7. The image sensor of claim 6, wherein
the read-out circuit receives the pixel voltage as a third input signal before the transmission signal is output to the pixel at a first section in which the gain control signal is an enable level, receives the pixel voltage as a fourth input signal after the transmission signal is output to the pixel at a second section in which the gain control signal is an enable level, and outputs image data by using the third input signal and the fourth input signal.

8. The image sensor of claim 7, wherein
the controller further controls the row driver to output the boosting control signal with the third level during which the second transmission signal is output to the pixel.

9. An image sensor comprising:
a photoelectric element;
a first transistor connecting the photoelectric element and a first node in response to a transmission signal;
a second transistor applying a power source voltage to the first node in response to a reset signal;
a first floating diffuser connected to the first node;
a first capacitor including one electrode connected to the first node and the other electrode to which a first boosting control signal is input; and
a third transistor generating a pixel signal and outputting the pixel signal in response to the voltage of the first node,
wherein the first boosting control signal is transitioned from a first level to a second level lower than the first level after the second transistor is turned off.

10. The image sensor of claim 9, wherein
the first boosting control signal is a third level higher than the first level in the section in which the first transistor is turned on.

11. The image sensor of claim 9, further comprising:
a first switch transistor connected between the first node and the second transistor; and
a second floating diffuser connected to a second node between the first switch transistor and the second transistor,
wherein the first boosting control signal is transitioned from the first level to the second level after the second transistor is turned off and before the first switch transistor is turned off.

12. The image sensor of claim 11, wherein
the first boosting control signal is a third level higher than the first level at the section in which the first transistor is turned on.

13. The image sensor of claim 11, wherein
one terminal of the second floating diffuser is connected to the second node, and the other terminal of the second floating diffuser to which a second boosting control signal is input, and
the second boosting control signal is transitioned from the first level to the second level after the second transistor is turned off and before the first switch transistor is turned off.

14. The image sensor of claim 13, wherein
the second boosting control signal is a third level higher than the first level in a section in which the first switch transistor is turned on.

15. The image sensor of claim 11, further comprising:
a second switch transistor connected between the second node and the second transistor; and
a third floating diffuser connected to a third node between the second switching transistor and the second transistor,
the first boosting control signal is transitioned to the second level after the second transistor is turned off and before the first switch transistor and the second switch transistor are turned off.

16. The image sensor of claim 15, wherein one terminal of the third floating diffuser is connected to the third node, and the other terminal of the third floating diffuser to which a third boosting control signal is input, and the third boosting control signal is transitioned from the first level to the second level after the second transistor is turned off and before the first switch transistor and the second switch transistor are turned off.

17. The image sensor of claim 16, wherein the third boosting control signal is a third level higher than the first level from the second level at a section in which the first transistor is turned on.

18. The image sensor of claim 16, wherein one terminal of the second floating diffuser is connected to the second node, and the other terminal of the second floating diffuser to which a second boosting control signal is input, and the second boosting control signal is transitioned from the first level to the second level after the second transistor is turned off and before the first switch transistor is turned off.

19. An image sensor comprising:

a photoelectric element;

a first transistor that connects the photoelectric element and a first node in response to a transmission signal;

a second transistor that applies a power source voltage to the first node in response to a reset signal;

a first floating diffuser connected to the first node;

a first switch transistor connected between the first node and the second transistor;

a second floating diffuser including one terminal connected to a second node between the first switch transistor and the second transistor, and the other terminal to which a boosting control signal is input; and a third transistor that generates a pixel signal in response to the voltage of the first node and outputs the pixel signal, wherein the boosting control signal is transitioned from a first level to a second level lower than the first level after the second transistor is turned off, before the first switch transistor is turned off.

20. The image sensor of claim 19, wherein the boosting control signal is transitioned from the second level to a third level higher than the first level during the section in which the first transistor is turned on after the first switch transistor is turned on.

\* \* \* \* \*